(12) United States Patent
Wu et al.

(10) Patent No.: US 12,170,975 B2
(45) Date of Patent: Dec. 17, 2024

(54) SIGNAL TRANSMISSION METHOD, AND RELATED DEVICE AND SYSTEM

(71) Applicant: HUAWEI TECHNOLOGIES CO., LTD., Guangdong (CN)

(72) Inventors: Ji Wu, Shanghai (CN); Jun Zhu, Shenzhen (CN); Qiong Jia, Shanghai (CN); Jiayin Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 7 days.

(21) Appl. No.: 17/023,672

(22) Filed: Sep. 17, 2020

(65) Prior Publication Data

US 2021/0007072 A1 Jan. 7, 2021

Related U.S. Application Data

(63) Continuation of application No. PCT/CN2019/073043, filed on Jan. 24, 2019.

(30) Foreign Application Priority Data

Mar. 26, 2018 (CN) .......................... 201810260959.7
Jan. 18, 2019 (WO) ................. PCT/CN2019/072416

(51) Int. Cl.
*H04W 56/00* (2009.01)
*H04L 5/00* (2006.01)
(Continued)

(52) U.S. Cl.
CPC ......... *H04W 56/006* (2013.01); *H04L 5/0051* (2013.01); *H04L 5/10* (2013.01);
(Continued)

(58) Field of Classification Search
CPC .. H04J 11/0076; H04J 11/0086; H04W 56/00; H04W 56/0015; H04B 7/2656;
(Continued)

(56) References Cited

U.S. PATENT DOCUMENTS

2017/0078998 A1 3/2017 Li
2018/0192383 A1* 7/2018 Nam ................... H04W 72/042
(Continued)

FOREIGN PATENT DOCUMENTS

CN 106211337 A 12/2016
CN 106550445 A 3/2017
(Continued)

OTHER PUBLICATIONS

Extended European Search Report issued in European Application No. 19774681.1 on Mar. 2, 2021, 11 pages.
(Continued)

*Primary Examiner* — Yee F Lam
(74) *Attorney, Agent, or Firm* — Fish & Richardson P.C.

(57) ABSTRACT

The present disclosure relates to signal transmission methods, devices, and systems. One example method includes sending, by a network device, a plurality of synchronization signal/physical broadcast channel (SS/PBCH) blocks in one or more burst set windows, where the one or more burst set windows include a plurality of candidate positions that are used to transmit the plurality of SS/PBCH blocks. SS/PBCH blocks sent at positions corresponding to at least two particular indexes have a quasi co-located (QCL) relationship.

21 Claims, 28 Drawing Sheets

(51) Int. Cl.
| | |
|---|---|
| *H04L 5/10* | (2006.01) |
| *H04W 72/30* | (2023.01) |
| *H04W 72/53* | (2023.01) |
| *H04W 76/27* | (2018.01) |

(52) U.S. Cl.
CPC ......... *H04W 56/001* (2013.01); *H04W 72/30* (2023.01); *H04W 72/53* (2023.01); *H04W 76/27* (2018.02)

(58) Field of Classification Search
CPC ..... H04B 7/0639; H04L 5/001; H04L 5/0048; H04L 27/2607
See application file for complete search history.

(56) References Cited

U.S. PATENT DOCUMENTS

| | | | | |
|---|---|---|---|---|
| 2018/0198659 | A1* | 7/2018 | Ko | H04L 27/2602 |
| 2018/0205585 | A1* | 7/2018 | Sadiq | H04B 7/088 |
| 2018/0242324 | A1* | 8/2018 | Luo | H04L 5/0053 |
| 2018/0279145 | A1* | 9/2018 | Jung | H04L 5/0051 |
| 2018/0279241 | A1* | 9/2018 | Lee | H04W 56/001 |
| 2018/0287683 | A1* | 10/2018 | Subramanian | H04B 7/0619 |
| 2018/0288755 | A1* | 10/2018 | Liu | H04W 72/0446 |
| 2018/0324843 | A1* | 11/2018 | Lee | H04W 48/04 |
| 2018/0324864 | A1* | 11/2018 | Jung | H04W 72/30 |
| 2018/0343156 | A1* | 11/2018 | Malik | H04J 11/0073 |
| 2018/0368054 | A1* | 12/2018 | Sheng | H04L 5/0048 |
| 2019/0037508 | A1* | 1/2019 | Sun | H04W 48/12 |
| 2019/0037509 | A1* | 1/2019 | Li | H04W 56/001 |
| 2019/0052443 | A1* | 2/2019 | Cheng | H04L 5/0023 |
| 2019/0082471 | A1* | 3/2019 | Tsai | H04L 5/0053 |
| 2019/0103931 | A1* | 4/2019 | Yi | H04L 5/001 |
| 2019/0261281 | A1* | 8/2019 | Jung | H04W 52/346 |
| 2020/0015197 | A1* | 1/2020 | Harada | H04W 72/0453 |
| 2020/0037230 | A1* | 1/2020 | Chen | H04J 11/0073 |
| 2020/0045662 | A1* | 2/2020 | Liu | H04W 48/12 |
| 2020/0221403 | A1* | 7/2020 | Gao | H04W 56/001 |
| 2020/0413356 | A1* | 12/2020 | Wang | H04W 72/046 |

FOREIGN PATENT DOCUMENTS

| | | | |
|---|---|---|---|
| CN | 107211281 | A | 9/2017 |
| CN | 110944376 | A | 3/2020 |
| CN | 111050394 | A | 4/2020 |
| WO | 2017079057 | A1 | 5/2017 |
| WO | 2017136458 | A2 | 8/2017 |
| WO | 2017142589 | A1 | 8/2017 |
| WO | WO-2019028882 | A1 * | 2/2019 ........... H01L 23/367 |

OTHER PUBLICATIONS

NTT Docomo, Inc., "Discussion on remaining details on RMSI delivery," 3GPP TSG RAN WG1 Meeting 90bis, R1-1718181, Prague, CZ, Oct. 9-13, 2017, 7 pages.

Samsung, "Remaining Details on RMSI," 3GPP TSG RAN WG1#91, R1-1720274, Reno, USA, Nov.-Dec. 1, 2017, 19 pages.

Samsung, "Remaining minimum system information delivery," 3GPP TSG RAN WG1 Meeting #90, R1-1713556, Prague, Czechia, Aug. 21-25, 2017, 5 pages.

Vivo, "Discussion on Remaining Minimum System Information," 3GPP TSG RAN WG1 Meeting #90bis, R1-1717461, Prague, Czech Republic, Oct. 9-13, 2017, 15 pages.

Nokia, Nokia Shanghai Bell, "Potential solutions and techniques for NR unlicensed." 3GPP TSG RAN WG1 Meeting #92, R1-1802526, Athens, Greece, Feb. 26-Mar. 2, 2018, 10 pages.

3GPP TS 38.213 V15.0.0 (Dec. 2017), 3rd Generation Partnership Project, Technical Specification Group Radio Access Network,NR,Physical layer procedures for control (Release 15), 56 pages.

InterDigital Inc., "On Remaining Details of Synchronization Signal Designs." 3GPP TSG RAN WG1 Meeting 91, R1-1720621, Reno, USA, Nov. 27-Dec. 1, 2017, 8 pages.

3GPP TS 38.212 V15.0.0 (Dec. 2017), 3rd Generation Partnership Project, Technical Specification Group Radio Access Network,NR,Multiplexing and channel coding(Release 15), 82 pages.

MCC Support, "Final Report of 3GPP TSG RAN WG1 #AH_NR3 v1.0.0. (Nagoya, Japan, Sep. 18-21, 2017)", 3GPP TSG RAN WG1 Meeting #90bis, R1-1716942, Prague, Czech Rep, Oct. 9-13, 2017, 91 pages.

[RAN WG1] Ericsson, "[Draft]Reply LS on multiple SSBs within a wideband carrier." 3GPP TSG RAN WG1 NR Ad-hoc#3, R1-1716835, Nagoya, Japan, Sep. 18-21, 2017, 1 page.

PCT International Search Report and Written Opinion in International Application No. PCT/CN2019/072,416, dated Mar. 22, 2019, 17 pages (With English Translation).

PCT International Search Report and Written Opinion in International Application No. PCT/CN2019/073,043, dated Mar. 28, 2019, 17 pages(With English Translation).

Office Action issued in Chinese Application No. 201810260959.7 on Mar. 2, 2020, 20 pages (With English Translation).

Office Action issued in Chinese Application No. 201980021403.5 on Mar. 23, 2021, 7 pages.

Office Action issued in Chinese Application No. 201810260959.7 on Feb. 23, 2021, 6 pages (with English Translation).

* cited by examiner

SIGNAL TRANSMISSION METHOD, AND RELATED DEVICE AND SYSTEM

CROSS-REFERENCE TO RELATED APPLICATIONS

This application is a continuation of International Application No. PCT/CN2019/073043, filed on Jan. 24, 2019, which claims priority to International Patent Application No. PCT/CN2019/072416, filed on Jan. 18, 2019, which claims priority to Chinese Patent Application No. 201810260959.7, filed on Mar. 26, 2018. The disclosures of the aforementioned applications are hereby incorporated by reference in their entireties.

TECHNICAL FIELD

This application relates to the field of wireless communications technologies, and in particular, to a signal transmission method, and a related device and system.

BACKGROUND

A synchronization signal burst set (SS burst set) is defined in new radio (NR). The synchronization signal burst set is mainly used by a terminal (including user equipment (UE)) to perform initial access/system message update/beam management. A sending period of the SS burst set may be 5/10/20/40/80/100 ms. Duration of the SS burst set is related to a quantity of actually sent synchronization signal/physical broadcast channel blocks (SS/PBCH block) and a subcarrier spacing. However, in any configuration, the duration of the SS burst set is less than the duration of an SS burst set window-5 ms. FIG. 1 shows a possible structure of an SS burst set. The SS burst set includes several SS/PBCH blocks. The SS/PBCH block is a signal structure, and is applicable to a 5G communications system and a subsequent communications system. The SS/PBCH block may also be referred to as a synchronization signal block (SSB), or may have another name. This is not limited in this application. The synchronization signal block may usually include a primary synchronization signal (PSS), a secondary synchronization signal (SSS), and a physical broadcast channel (PBCH). In an example of FIG. 1, each SSB lasts for four orthogonal frequency division multiplexing (OFDM) symbols. The PSS and the SSS are mainly used to help the UE identify a cell and synchronize with the cell. The PBCH includes most basic system information such as a system frame number or intra-frame timing information. A terminal accesses the cell under the premise that the terminal successfully receives a synchronization signal block. When a carrier frequency is less than 6 GHz, each SS burst set includes a maximum of eight SS/PBCH blocks. When the carrier frequency is greater than 6 GHz, each SS burst set includes a maximum of 64 SS/PBCH blocks. Each SS/PBCH block may correspond to beams in different directions.

In addition, in a particular subcarrier spacing (SCS) (for example, the SCS=15 kHz), a preset time position at which an SS/PBCH block may be sent in an SS burst set window is also defined in an NR standard. The preset time position corresponding to the SS/PBCH block is indicated by a time index on a PBCH. When a terminal detects an SS/PBCH block, the terminal may determine, based on a time index carried on a PBCH in the SS/PBCH block, a time position of the SS/PBCH block in an SS burst set window, to determine a symbol (that is, a PSS symbol and an SSS symbol in the SS/PBCH block) occupied by system timing information in the SS burst set window. In addition, the terminal may determine, based on half-frame indication information carried on the PBCH in the SS/PBCH block, whether the SS burst set window in which the SS/PBCH block is located is the first 5 ms or the last 5 ms of a radio frame of 10 ms. In this way, the terminal can correctly receive system timing information sent by a network device (such as a gNB), to complete synchronization between the terminal and the network device.

However, due to the impact of a listen before talk (LBT) mechanism, for an NR (NRU) system working in an unlicensed frequency band, the network device may fail to send an SS/PBCH block at a preset time position corresponding to the SS/PBCH block. Therefore, a solution is urgently needed to resolve a problem of sending the SS/PBCH block in the NRU system.

SUMMARY

This application provides a signal transmission method, and a related device and system, to resolve a problem of sending an SS/PBCH block and an RMSI CORESET in an NRU system.

According to a first aspect, this application provides a signal transmission method, applied to a network device side. The method may include: sending, by a network device, a synchronization signal block SS/PBCH block after LBT succeeds, where an actual time position at which the SS/PBCH block is sent is a preset time position corresponding to the SS/PBCH block in a synchronization signal burst set window, and the synchronization signal burst set window includes a plurality of preset time positions respectively corresponding to at least one SS/PBCH block. The at least one SS/PBCH block is a to-be-sent SS/PBCH block.

According to a second aspect, this application provides a signal transmission method, applied to a terminal side. The method may include: receiving, by a terminal, an SS/PBCH block, where an actual time position at which the SS/PBCH block is received is a preset time position corresponding to the SS/PBCH block in a synchronization signal burst set window, and the synchronization signal burst set window includes a plurality of preset time positions respectively corresponding to at least one SS/PBCH block. The at least one SS/PBCH block is a to-be-sent SS/PBCH block.

According to the methods described in the first aspect and the second aspect, a probability that the SS/PBCH block is successfully sent at the preset time position can be increased.

In summary, in the solutions described in the first aspect and the second aspect, a plurality of preset time positions are configured in the SS burst set window for each to-be-sent SS/PBCH block. The network device sends the SS/PBCH block after LBT succeeds. The actual time position at which the SS/PBCH block is sent is the preset time position corresponding to the SS/PBCH block in the SS burst set window. Specifically, the actual time position at which the SS/PBCH block is sent is a time position that is in the plurality of preset time positions corresponding to the SS/PBCH block and that is later than a preset time position at which LBT succeeds.

Herein, the SS/PBCH block may be any to-be-sent SS/PBCH block.

With reference to the first aspect or the second aspect, in some optional embodiments, an offset between the plurality of preset time positions corresponding to the to-be-sent SS/PBCH block may be indicated by a second offset. In other words, the second offset may be used to indicate a case in which the plurality of preset time positions corresponding to the to-be-sent SS/PBCH block repeatedly appear in the SS burst set window (periodically or aperiodically). For example, it is assumed that the first preset time position is used as a reference. In a case a, positions 1, 3, 5, and 7 all correspond to an SS/PBCH block 1, and then, a possible offset is 2, 4, or 6. In other words, the SS/PBCH block 1 may be actually sent at a position that is offset from the position 1 by the offset. 2 represents an offset of the position 3 from the position 1, 4 represents an offset of the position 5 from the position 1, and 6 represents an offset of the position 7 from the position 1. In this way, the terminal may determine, based on the offset, a possible position at which the SS/PBCH block 1 is actually sent.

Specifically, indication information of the second offset may be carried in at least one of the following messages: an RMSI CORESET an RMSI PDSCH, RRC signaling (such as a message 4 in a random access process), or a broadcast channel.

With reference to the first aspect or the second aspect, in some optional embodiments, the plurality of preset time positions corresponding to the to-be-sent SS/PBCH block may repeatedly appear in the SS burst set window periodically. Indication information of a period in which the plurality of preset time positions corresponding to the SS/PBCH block repeatedly appear in the synchronization signal burst set window may be carried in at least one of the following messages: the remaining minimum system information control resource set RMSI CORESET, a remaining minimum system information physical downlink shared channel RMSI PDSCH, radio resource control RRC signaling, or a physical broadcast channel PBCH in the SS/PBCH block.

With reference to the first aspect or the second aspect, in some optional embodiments, position mapping relationships of the to-be-sent SS/PBCH blocks in Q (Q is a positive integer) SS burst set windows are that the to-be-sent SS/PBCH blocks appear for a same quantity of times in the Q adjacent SS burst set windows. In this way, it can be ensured that the SS/PBCH blocks appear with a same probability.

Optionally, the network device may further notify the terminal of Q. In this way, the terminal can learn of preset time positions that are in the Q adjacent SS burst set windows and that correspond to a same SS/PBCH block.

With reference to the first aspect or the second aspect, in some optional embodiments, the network device further sends an RMSI CORESET after LBT succeeds. Correspondingly, the terminal further receives the RMSI CORESET sent by the network device. An actual sending time of the RMSI CORESET is related to an actual sending time of an SS/PBCH block corresponding to the RMSI CORESET. Specifically, the actual sending time of the RMSI CORESET may be determined by using the following formulas. To be specific, in a radio frame in which the synchronization signal burst set window is located, an index S of a starting slot of the RMSI CORESET corresponding to the SS/PBCH block is:

$$S=\mod(X*n+f(i), N_{slot});$$

$f(i)=\mathrm{floor}(i*M)$, where floor represents rounding down, i represents a time index of the SS/PBCH block, $N_{slot}$ represents a quantity of slots in the radio frame, n is equal to a subcarrier spacing of the RMSI CORESET/15 kHz, a value of X is one of a plurality of values included in a first set, a value of M is one of a plurality of values included in a second set, and M represents a quantity of RMSI CORESETs included in one slot.

Optionally, the first set may be a set {0, 2, 5, 7} defined in NR, and the second set may be a set {0.5, 1, 2} defined in NR. Optionally, the value of M may be 0.5. To be specific, the RMSI CORESET corresponding to the SS/PBCH block and the SS/PBCH block are actually in a same slot.

With reference to the first aspect or the second aspect, in some optional embodiments, use of 16 bits that are in an RMSI PDSCH and that are used to indicate an actual sending status of the SS/PBCH block in an NRU system may be extended in the following two manners.

Manner 1: The 16 bits in the RMSI PDSCH may be divided into two parts (which may be referred to as a first part and a second part). The first part (such as the first eight bits) indicates a quantity of to-be-sent SS/PBCH blocks, and the second part (such as the last eight bits) indicates a group in which the to-be-sent SS/PBCH block is located. Herein, the 16 bits in the RMSI PDSCH may be referred to as a first bit sequence.

Manner 2: The 16 bits in the RMSI PDSCH may be divided into two parts (which may be referred to as a third part and a fourth part). Each bit in the fourth part (such as the last 14 bits) indicates whether J consecutive SS/PBCH blocks are sent, and the third part (such as the first two bits) indicates a value of J. J is obtained from one of $2^K$ values, K<L, L represents a sequence length of the first bit sequence, K represents a sequence length of the third part, and J, K. and L are all positive integers. Herein, the 16 bits in the RMSI PDSCH may be referred to as a first bit sequence.

Not limited to the foregoing two manners, in some optional embodiments, another bit in the RMSI PDSCH may be further used to indicate the actual sending status of the SS/PBCH block. Not limited to the foregoing two manners, the 16 bits that indicate the actual sending status of the SS/PBCH block and other indication information in the RMSI PDSCH may be used for joint indication.

With reference to the first aspect or the second aspect, in some optional embodiments, the synchronization signal burst set window may include a first slot, and the first slot does not carry the SS/PBCH block. In other words, the first slot is a blank slot.

In consideration of the blank slot and a correlation between an actual sending time of an RMSI CORESET and an actual sending time of an SS/PBCH block corresponding to the RMSI CORESET, the actual sending time of the RMSI CORESET satisfies the following formulas. To be specific, in a radio frame, an index S of a starting slot of an RMSI CORESET corresponding to an SS/PBCH block is:

$$S=\mod(\mathrm{floor}(i*7.5/k)*(k/60)+\mathrm{offset1}+X*n+(i), N_{slot})$$

$f(i)=\mathrm{floor}(i*M)$, where k=120 kHz or 240 kHz, and represents a subcarrier spacing of the RMSI CORESET offset1 represents the first offset, i represents a time index of the SS/PBCH block, $N_{slot}$ represents a quantity of slots in the radio frame, n is equal to the subcarrier spacing of the RMSI CORESET/15 kHz, a value of X is one of a plurality of values included in a first set, a value of M is one of a plurality of values included in a second set, and M represents a quantity of RMSI CORESETs included in one slot.

A factor floor(i*7.5/k)*(k/60) is an offset introduced to ensure that the RMSI CORESET does not fall into a blank slot (that is, a slot in which the SS/PBCH block is not sent).

With reference to the first aspect or the second aspect, in some optional embodiments, indication information of the plurality of preset time positions corresponding to the SS/PBCH block may be carried in at least one of the following: the RMSI CORESET, an RMSI PDSCH, RRC signaling, or a PBCH in the SS/PBCH block.

According to a third aspect, this application provides a signal transmission method, applied to a network device side. The method may include: sending, by a network device, an SS/PBCH block after LBT succeeds, where the SS/PBCH block carries first indication information, the first indication information indicates a first offset of the SS/PBCH block, the first offset is an offset between an actual time position at which the SS/PBCH block is sent and a preset time position corresponding to the SS/PBCH block in a first synchronization signal burst set window, and the first synchronization signal burst set window is a first half of a radio frame.

According to a fourth aspect, this application provides a signal transmission method, applied to a terminal side. The method may include: receiving, by a terminal, an SS/PBCH block, where the SS/PBCH block carries first indication information, the first indication information indicates a first offset of the SS/PBCH block, the first offset is an offset between an actual time position at which the SS/PBCH block is received and a preset time position corresponding to the SS/PBCH block in a first synchronization signal burst set window, and the first synchronization signal burst set window is a first half of a radio frame.

According to the methods described in the third aspect and the fourth aspect, correct sending and receiving of the SS/PBCH block can be ensured after LBT succeeds.

In summary, in the solutions described in the third aspect and the fourth aspect, a corresponding preset time position is configured in the SS burst set window for each to-be-sent SS/PBCH block. For details, refer to related implementations in an NR standard. However, due to impact of LBT, the SS/PBCH block may not be sent at the preset time position corresponding to the SS/PBCH block. In other words, the actual time position of the SS/PBCH block in the radio frame may not be the preset time position corresponding to the SS/PBCH block in the SS burst set window. The network device needs to notify the terminal of a time offset (which may be referred to as a first offset) between the actual time position of the SS/PBCH block in the radio frame and the preset time position corresponding to the SS/PBCH block.

Herein, the SS burst set window including the preset time position is the first half-frame of the radio frame, to ensure that the actual time position at which the SS/PBCH block is sent after being offset does not exceed a boundary of the radio frame. The SS burst set window may be referred to as a first SS burst set window.

Herein, compared with the preset time position, an actual time position of each SS/PBCH block included in an SS burst set may be delayed by a maximum of 5 ms, that is, the first offset is less than or equal to 5 ms. After being delayed as a whole, the SS burst set cannot cross the boundary of the radio frame. In this way, it can be ensured that system frame numbers (SFN) carried on PBCHs in all SS/PBCH blocks in the entire SS burst set are consistent.

With reference to the third aspect or the fourth aspect, in some optional embodiments, the first offset is less than or equal to duration of the first synchronization signal burst set window. The network device may specifically send the SS/PBCH block after a delay of the first offset based on the preset time position corresponding to the SS/PBCH block in the first synchronization signal burst set window. Correspondingly, the terminal may specifically receive the SS/PBCH block after a delay of the first offset based on the preset time position corresponding to the SS/PBCH block in the first synchronization signal burst set window.

With reference to the third aspect or the fourth aspect, in some optional embodiments, the first offset is equal to duration of the first synchronization signal burst set window. Specifically, if the preset time position corresponding to the SS/PBCH block in the first synchronization signal burst set window is later than a time position at which LBT succeeds, the network device may send the SS/PBCH block at the preset time position corresponding to the SS/PBCH block; otherwise, the network device may send the SS/PBCH block after a delay of the first offset based on the preset time position corresponding to the SS/PBCH block.

With reference to the third aspect or the fourth aspect, in some optional embodiments, the first indication information may be carried in at least one of the following: a PBCH, a PSS, an SSS, and a PBCH Demodulation Reference Signal (DMRS) sequence in the SS/PBCH block.

Optionally, when the first offset is equal to the duration of the first synchronization signal burst set window, the first indication information may be half-frame indication information carried on a PBCH in the SS/PBCH block. Optionally, the first indication information may alternatively be a bit in a time index on the PBCH in the SS/PBCH block.

With reference to the third aspect or the fourth aspect, in some optional embodiments, the network device further sends an RMSI CORESET after LBT succeeds. Correspondingly, the terminal further receives the RMSI CORESET sent by the network device. An actual sending time of the RMSI CORESET is related to an actual sending time of an SS/PBCH block corresponding to the RMSI CORESET. Specifically, the actual sending time of the RMSI CORESET may be determined by using the following formulas. To be specific, in a radio frame in which the synchronization signal burst set window is located, an index S of a starting slot of the RMSI CORESET corresponding to the SS/PBCH block is:

$$S = \mathrm{mod}(X*n + f(i), N_{slot});$$

$$f(i) = \mathrm{floor}(i*M), \text{ where}$$

floor represents rounding down, i represents a time index of the SS/PBCH block, $N_{slot}$ represents a quantity of slots in the radio frame, n is equal to a subcarrier spacing of the RMSI CORESET/15 kHz, a value of X is one of a plurality of values included in a first set, a value of M is one of a plurality of values included in a second set, and M represents a quantity of RMSI CORESETs included in one slot.

Optionally, the first set may be a set $\{0, 2, 5, 7\}$ defined in NR, and the second set may be a set $\{0.5, 1, 2\}$ defined in NR. Optionally, the value of M may be 0.5. To be specific, the RMSI CORESET corresponding to the SS/PBCH block and the SS/PBCH block are actually in a same slot.

With reference to the third aspect or the fourth aspect, in some optional embodiments, the synchronization signal burst set window may include a first slot, and the first slot does not carry the SS/PBCH block. In other words, the first slot is a blank slot.

In consideration of the blank slot and a correlation between an actual sending time of an RMSI CORESET and an actual sending time of an SS/PBCH block corresponding to the RMSI CORESET, the actual sending time of the RMSI CORESET satisfies the following formulas. To be specific, in a radio frame, an index S of a starting slot of an RMSI CORESET corresponding to an SS/PBCH block is:

$$S = \mathrm{mod}(\mathrm{floor}(i*7.5/k)*(k/60)+\mathrm{offset1}+X*n+f(i), N_{slot})$$

$$f(i) = \mathrm{floor}(i*M),\ \text{where}$$

k=120 kHz or 240 kHz, and represents a subcarrier spacing of the RMSI CORESET, offset represents the first offset, i represents a time index of the SS/PBCH block, $N_{slot}$ represents a quantity of slots in the radio frame, n is equal to the subcarrier spacing of the RMSI CORESET/15 kHz, a value of X is one of a plurality of values included in a first set, a value of M is one of a plurality of values included in a second set, and M represents a quantity of RMSI CORESETs included in one slot.

A factor floor(i*7.5/k)*(k/60) is an offset introduced to ensure that the RMSI CORESET does not fall into a blank slot (that is, a slot in which the SS/PBCH block is not sent).

With reference to the third aspect or the fourth aspect, in a possible case, when the offset between the actual time position and the preset time position of the SS/PBCH block is greater than 10 ms, that is, the actual sending time and the preset time position of the SS/PBCH block are in different radio frames, there is an offset between a radio frame in which the SS/PBCH block is actually located and a preset radio frame configured for the SS/PBCH block. Herein, the offset may be referred to as a third offset of the SS/PBCH block.

Optionally, the RMSI CORESET and/or the SS/PBCH block may carry second indication information, the second indication information indicates a third offset of the SS/PBCH block, and the third offset is a difference between an index of a radio frame in which the SS/PBCH block is actually located and an index of a preset radio frame configured for the SS/PBCH block.

In the foregoing possible case, a time position of the RMSI CORESET may be determined by a time offset (that is, the first offset) and the third offset of the SS/PBCH block in the radio frame, and the RMSI CORESET satisfies the following formulas. To be specific, in a radio frame, an index S of a starting slot of an RMSI CORESET corresponding to an SS/PBCH block is:

$$S = \mathrm{mod}(\mathrm{offset2}*N_{slot}+\mathrm{offset1}+X*n+f(i), N_{slot})$$

$$f(i) = \mathrm{floor}(i*M),\ \text{where}$$

offset2 represents the third offset, offset1 represents the first offset, i represents a time index of the SS/PBCH block, $N_{slot}$ represents a quantity of slots of RMSI in the radio frame, n is equal to a subcarrier spacing of the RMSI CORESET/15 kHz, a value of X is one of a plurality of values included in a first set, a value of M is one of a plurality of values included in a second set, and M represents a quantity of RMSI CORESETs included in one slot.

According to a fifth aspect, this application provides a signal transmission method, applied to a network device side. The method may include: sending, by a network device, an RMSI CORESET after LBT succeeds, where an actual time position at which the RMSI CORESET is sent is related to an actual time position of an SS/PBCH block corresponding to the RMSI CORESET. The actual time position of the SS/PBCH block is a preset time position corresponding to the SS/PBCH block in a synchronization signal burst set window. The synchronization signal burst set window includes a plurality of preset time positions respectively corresponding to at least one SS/PBCH block. The at least one SS/PBCH block is a to-be-sent SS/PBCH block.

According to a sixth aspect, this application provides a signal transmission method, applied to a terminal side. The method may include: receiving, by a terminal, an RMSI CORESET, where an actual time position at which the RMSI CORESET is received is related to an actual time position at which an SS/PBCH block corresponding to the RMSI CORESET is received. The actual time position of the SS/PBCH block is a preset time position corresponding to the SS/PBCH block in a synchronization signal burst set window, and the synchronization signal burst set window includes a plurality of preset time positions respectively corresponding to at least one SS/PBCH block. The at least one SS/PBCH block is a to-be-sent SS/PBCH block.

According to the methods described in the fifth aspect and the sixth aspect, an actual time position of RMSI may be determined by using the actual time position of the SS/PBCH block, so that the RMSI CORESET can be correctly received.

Specifically, for a correlation between the actual time position of the RMSI CORESET and the actual time position at which the SS/PBCH block corresponding to the RMSI CORESET is received, refer to content in the first aspect and the second aspect. Details are not described herein again.

Specifically, for specific implementations of the actual time position of the SS/PBCH block corresponding to the RMSI CORESET, refer to content in the first aspect and the second aspect. Details are not described herein again.

According to a seventh aspect, this application provides a signal transmission method, applied to a network device side. The method may include: sending, by a network device, an RMSI CORESET after LBT succeeds, where an actual time position at which the RMSI CORESET is sent is related to an actual time position at which an SS/PBCH block corresponding to the RMSI CORESET is sent. The SS/PBCH block carries first indication information, the first indication information indicates a first offset of the SS/PBCH block, the first offset is an offset between the actual time position at which the SS/PBCH block is sent and a preset time position corresponding to the SS/PBCH block in a first synchronization signal burst set window, and the first synchronization signal burst set window is a first half of a radio frame.

According to an eighth aspect, this application provides a signal transmission method, applied to a terminal side. The method may include: receiving, by a terminal, an RMSI CORESET, where an actual time position at which the RMSI CORESET is received is related to an actual time position at which an SS/PBCH block corresponding to the RMSI CORESET is received. The SS/PBCH block carries first indication information, the first indication information indicates a first offset of the SS/PBCH block, the first offset is an offset between the actual time position at which the SS/PBCH block is received and a preset time position corresponding to the SS/PBCH block in a first synchronization signal burst set window, and the first synchronization signal burst set window is a first half of a radio frame.

According to the methods described in the seventh aspect and the eighth aspect, an actual time position of RMSI may be determined by indicating an offset (that is, the first offset) between the actual time position of the SS/PBCH block and the preset time position corresponding to the SS/PBCH block, so that the RMSI CORESET can be correctly received.

Specifically, for a correlation between the actual time position of the RMSI CORESET and the actual time position at which the SS/PBCH block corresponding to the RMSI CORESET is received, refer to content in the first aspect and the second aspect. Details are not described herein again.

Specifically, for specific implementations of the actual time position of the SS/PBCH block corresponding to the RMSI CORESET and an indication manner of the first offset, refer to content in the third aspect and the fourth aspect. Details are not described herein again.

According to a ninth aspect, a network device is provided. The network device includes a plurality of functional units, configured to correspondingly perform the method provided in any one of the possible implementations of the first aspect, the third aspect, the fifth aspect, or the seventh aspect.

According to a tenth aspect, a terminal is provided. The terminal includes a plurality of functional units, configured to correspondingly perform the method provided in any one of the possible implementations of the second aspect, the fourth aspect, the sixth aspect, or the eighth aspect.

According to an eleventh aspect, a network device is provided. The network device is configured to perform the signal transmission method described in the first aspect, the third aspect, the fifth aspect, or the seventh aspect. The network device may include a memory, and a processor, a transmitter, and a receiver that are coupled to the memory. The transmitter is configured to send a signal to another wireless communications device, for example, a terminal. The receiver is configured to receive the signal sent by the another wireless communications device, for example, the terminal. The memory is configured to store implementation code of the signal transmission method described in the first aspect, the third aspect, the fifth aspect, or the seventh aspect. The processor is configured to execute program code stored in the memory, in other words, perform the signal transmission method described in any one of the possible implementations of the first aspect, the third aspect, the fifth aspect, or the seventh aspect.

According to a twelfth aspect, a terminal is provided. The terminal is configured to perform the signal transmission method described in the second aspect, the fourth aspect, the sixth aspect, or the eighth aspect. The terminal may include a memory, and a processor, a transmitter, and a receiver that are coupled to the memory. The transmitter is configured to send a signal to another wireless communications device, for example, a network device. The receiver is configured to receive the signal sent by the another wireless communications device, for example, the network device. The memory is configured to store implementation code of the signal transmission method described in the second aspect, the fourth aspect, the sixth aspect, or the eighth aspect. The processor is configured to execute program code stored in the memory, in other words, perform the signal transmission method described in any one of the possible implementations of the second aspect, the fourth aspect, the sixth aspect, or the eighth aspect.

According to a thirteenth aspect, a communications system is provided. The communications system includes a network device and a terminal, where the network device may be the network device described in the first aspect, the third aspect, the fifth aspect, or the seventh aspect, and the terminal may be the terminal described in the second aspect, the fourth aspect, the sixth aspect, or the eighth aspect.

According to a fourteenth aspect, a computer-readable storage medium is provided. The readable storage medium stores an instruction, and when the instruction is run on a computer, the computer is enabled to perform the signal transmission method described in the first aspect, the third aspect, the fifth aspect, or the seventh aspect.

According to a fifteenth aspect, another computer-readable storage medium is provided. The readable storage medium stores an instruction, and when the instruction is run on a computer, the computer is enabled to perform the signal transmission method described in the second aspect, the fourth aspect, the sixth aspect, or the eighth aspect.

According to a sixteenth aspect, a computer program product including an instruction is provided. When the computer program product runs on a computer, the computer is enabled to perform the signal transmission method described in the first aspect, the third aspect, the fifth aspect, or the seventh aspect.

According to a seventeenth aspect, another computer program product including an instruction is provided. When the computer program product runs on a computer, the computer is enabled to perform the signal transmission method described in the second aspect, the fourth aspect, the sixth aspect, or the eighth aspect.

BRIEF DESCRIPTION OF DRAWINGS

To describe the technical solutions in embodiments of this application or in the background more clearly, the following describes the accompanying drawings required for describing the embodiments of this application or the background.

DESCRIPTION OF EMBODIMENTS

Terms used in embodiments of this application are merely used to explain specific embodiments of this application, but are not intended to limit this application.

Figure 1:
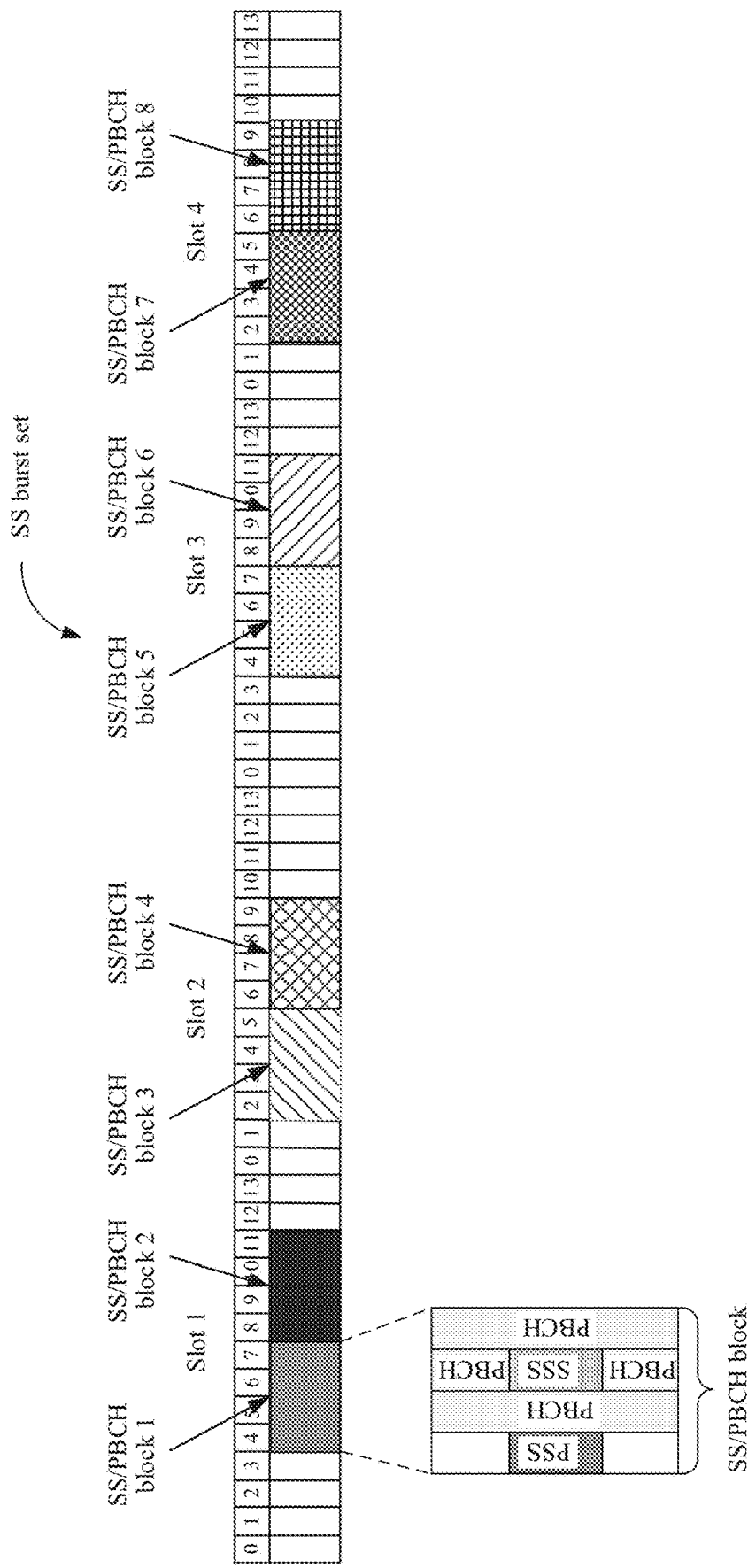
FIG. 1 is a schematic composition diagram of an SS burst set defined in an NR standard.
Figure 2:
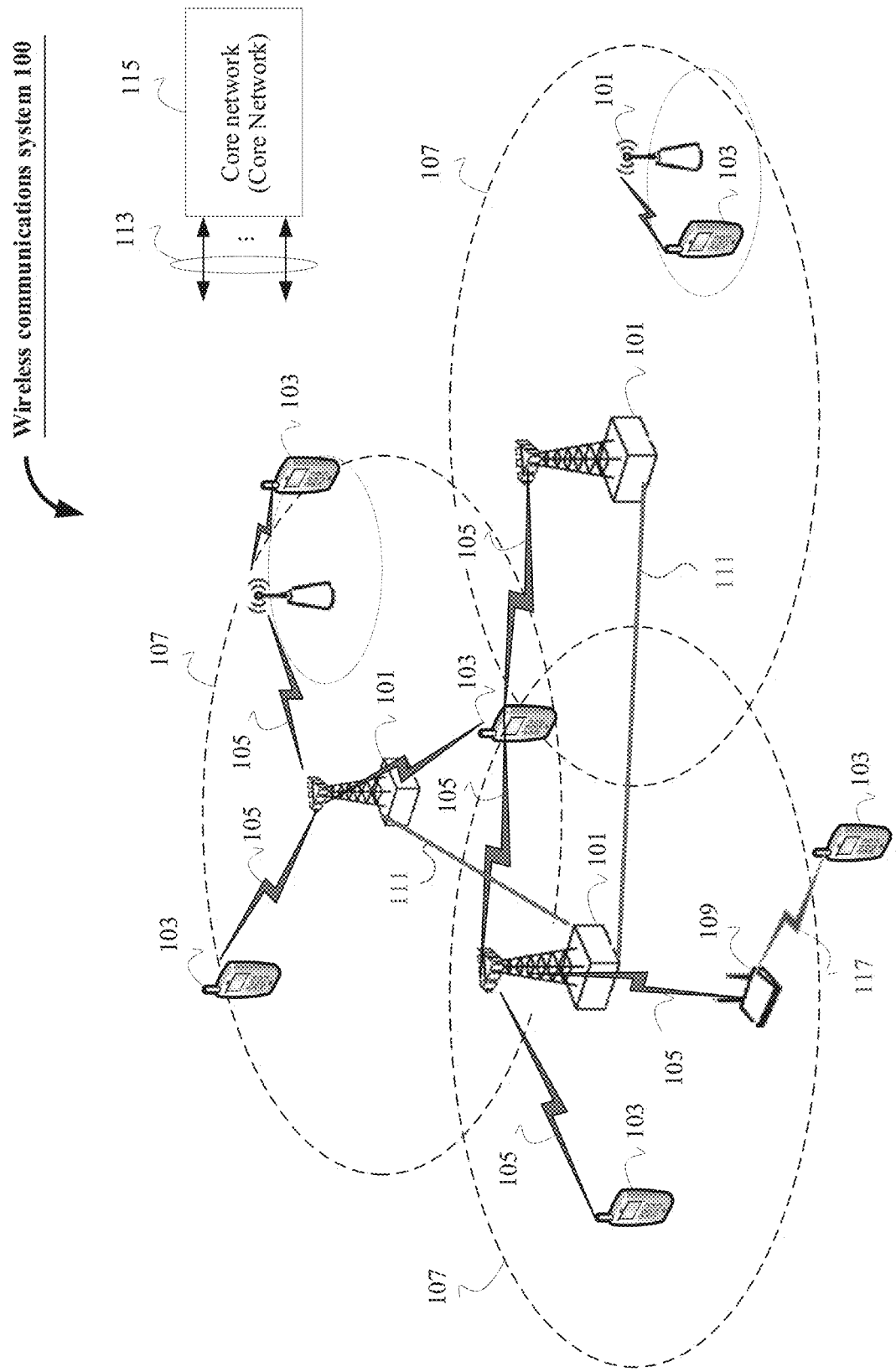
FIG. 2 is a schematic architecture diagram of a wireless communications system according to this application.

FIG. 2 shows a wireless communications system 100 in this application. The wireless communications system 100 may work in a licensed frequency band, or may work in an unlicensed frequency band. It may be understood that use of the unlicensed frequency band can increase a system capacity of the wireless communications system 100. As shown in FIG. 2, the wireless communications system 100 includes one or more network devices (base station) 101, for example, a network device (such as a gNB), an eNodeB, or a WLAN access point, one or more terminals 103, and a core network 115.

The network device 101 may be configured to communicate with the terminal 103 under control of a network device controller (such as a base station controller) (not shown). In some embodiments, the network device controller may be a part of the core network 115, or may be integrated into the network device 101.

The network device 101 may be configured to transmit control information or user data to the core network 115 through a backhaul interface (such as an S1 interface) 113.

The network device 101 may perform wireless communication with the terminal 103 through one or more antennas. Each network device 101 is capable of providing communication coverage for coverage 107 corresponding to the network device 101. The coverage 107 corresponding to an access point may be divided into a plurality of sectors, and one sector corresponds to a part of the coverage (not shown).

Network devices 101 may communicate with each other through a backhaul link 111 directly or indirectly. The backhaul link 111 herein may be a wired communication connection or a wireless communication connection.

In some embodiments of this application, the network device 101 may include a base transceiver station, a radio transceiver, a basic service set (BSS), an extended service set (ESS), a NodeB, an eNodeB, a network device (such as a gNB), and the like. The wireless communications system 100 may include several different types of network devices 101, for example, a macro base station and a micro base station. Different wireless technologies, for example, a cell radio access technology or a WLAN radio access technology, may be applied to the network device 101.

The terminal 103 may be distributed in the wireless communications system 100, may be static, or may be mobile. In some embodiments of this application, the terminal 103 may include a mobile device, a mobile station, a mobile unit, a radio unit, a remote unit, a user agent, a mobile client, and the like. In this application, the terminal may also be understood as a terminal device.

In this application, the wireless communications system 100 may be an LTE communications system that can work in an unlicensed frequency band, for example, an LTE-U system, or may be a new radio communications system that can work in an unlicensed frequency band, for example, an NRU system, or may be another communications system that can work in an unlicensed frequency band in the future.

In addition, the wireless communications system 100 may further include a Wi-Fi network.

Figure 6A:
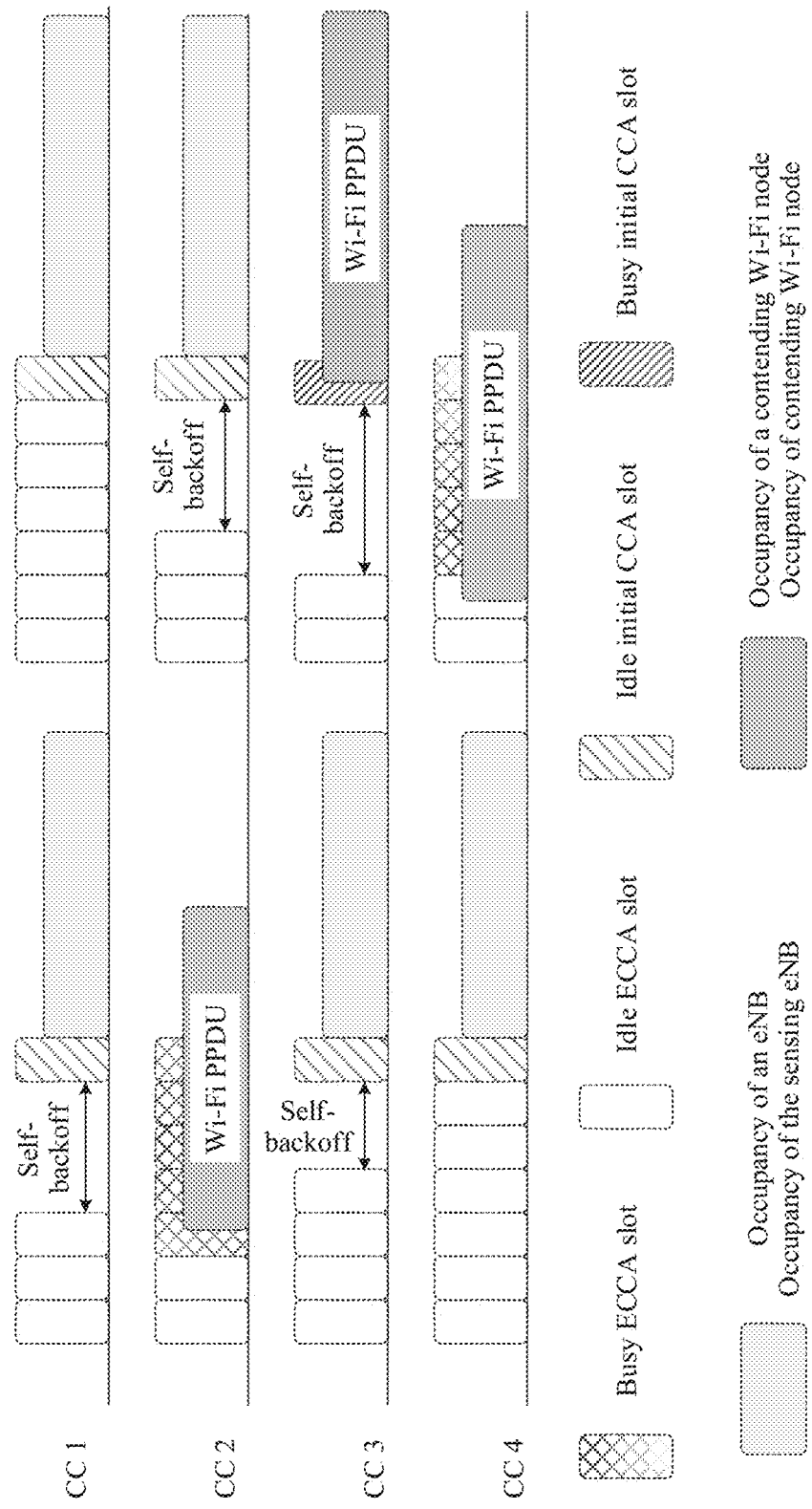
FIG. 6A and FIG. 6B are schematic diagrams of a type A/type B multi-carrier LBT mechanism in this application.
Figure 6B:
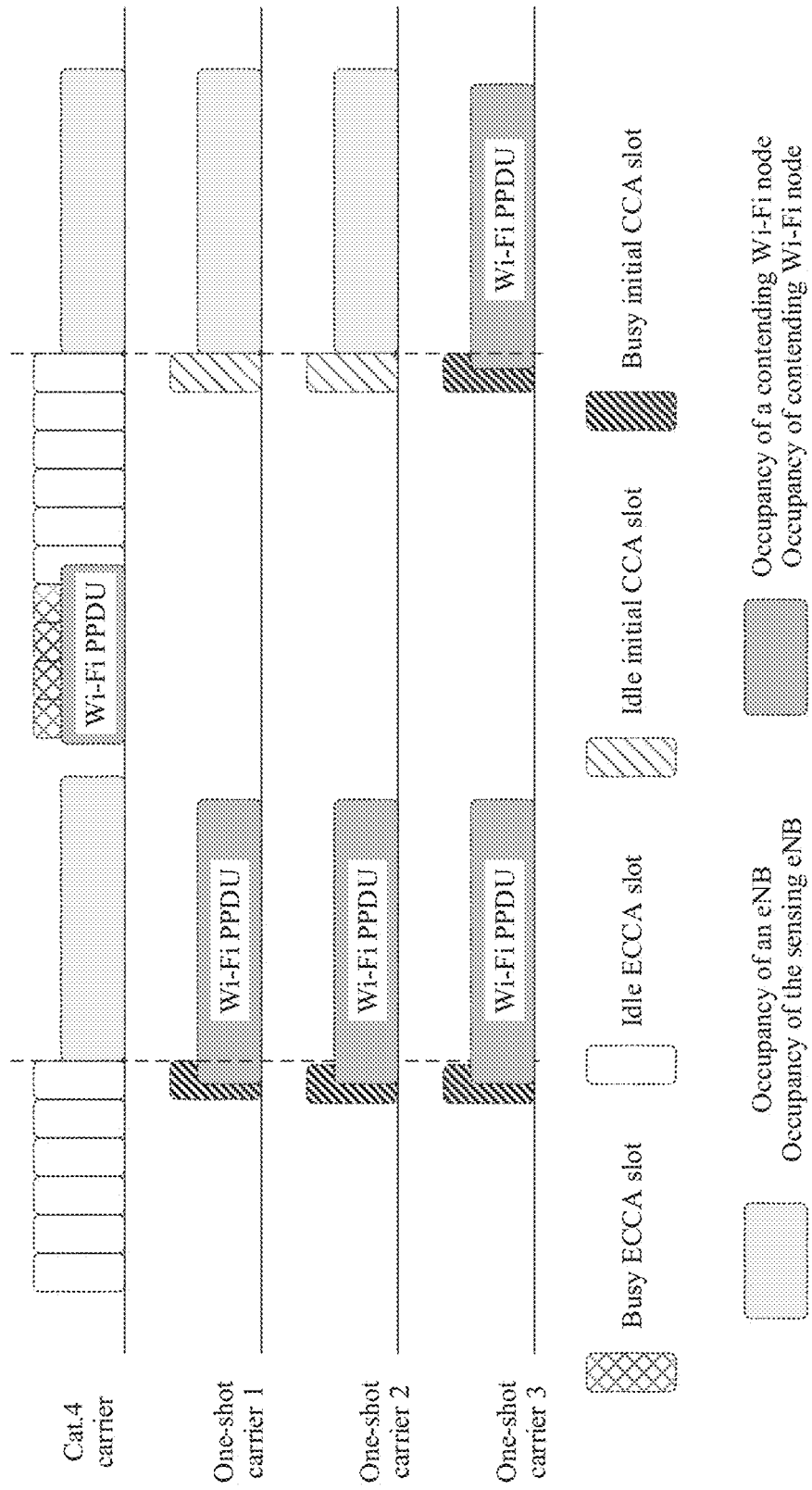

To ensure coexistence with another device working in an unlicensed frequency band, the NRU system uses a channel contention access mechanism of LBT, and specifies a procedure and a parameter of LBT in 3GPP Release R13. FIG. 6A and FIG. 6B show two types of LBT listening mechanisms.

As shown in FIG. 6A, a type-A LBT device may perform independent backoff on a plurality of component carriers (CC), and after backoff on a carrier is completed, delay transmission to wait for another component carrier on which backoff is still performed. After backoff on all carriers on which LBT is performed is completed, the device needs to perform additional one-shot CCA (25 us clear channel assessment) to ensure that all the carriers are idle. If all the carriers are idle, the eNB simultaneously performs transmission on the idle carriers.

As shown in FIG. 6B, a type-B LBT device performs backoff only on a selected component carrier, performs one-shot CCA (25 us clear channel assessment) review on another component carrier when backoff ends, performs data transmission if the component carrier is idle, and cannot perform data transmission on the component carrier this time if the component carrier is not idle.

As shown in FIG. 6A and FIG. 6B, a device for performing LBT may be a communications device working in an unlicensed frequency band that supports LTE LAA, Wi-Fi, or NRU standards or others. In the figure, interference caused to the device by performing LBT comes from a Wi-Fi system. In an actual scenario, interference caused to the device for performing LBT may alternatively come from an LTE LAA system, an NRU system, or another communications system working in an unlicensed frequency band. This is not limited in this application.

Not limited to what is shown in FIG. 6A and FIG. 6B, the LBT listening mechanism used in the NRU system may also change, and this does not affect implementation of this application.

In this application, the network device 101 may transmit radio signals by using beams with different directions, for example, an SS/PBCH block, a remaining minimum system information (RMSI) control resource set (CORESET), and an RMSI PDSCH. An RMSI PDSCH indicated by an RMSI CORESET corresponding to one SS/PBCH block and the SS/PBCH block jointly carry system configuration information used by a user to perform random access. One SS/PBCH block and an RMSI CORESET corresponding to the SS/PBCH block correspond to a same user. In other words, the SS/PBCH block and the RMSI CORESET corresponding to the SS/PBCH block correspond to a same beam. A time index carried on a PBCH in the SS/PBCH block is used to indicate a time position of the SS/PBCH block in an SS burst set window. In addition, the PBCH carried in the SS/PBCH block further carries information used to indicate a time-frequency resource position of the RMSI CORESET. The terminal may receive and demodulate the RMSI CORESET through the information, then obtain a time-frequency resource position of an RMSI PDSCH through indication information carried in the RMSI CORESET, finally obtain system information carried in the RMSI PDSCH, and finally obtain resource configuration information of a physical random access channel (PRACH).

The resource configuration information of the PRACH is used by the terminal to perform a subsequent initial access procedure.

Figure 3:
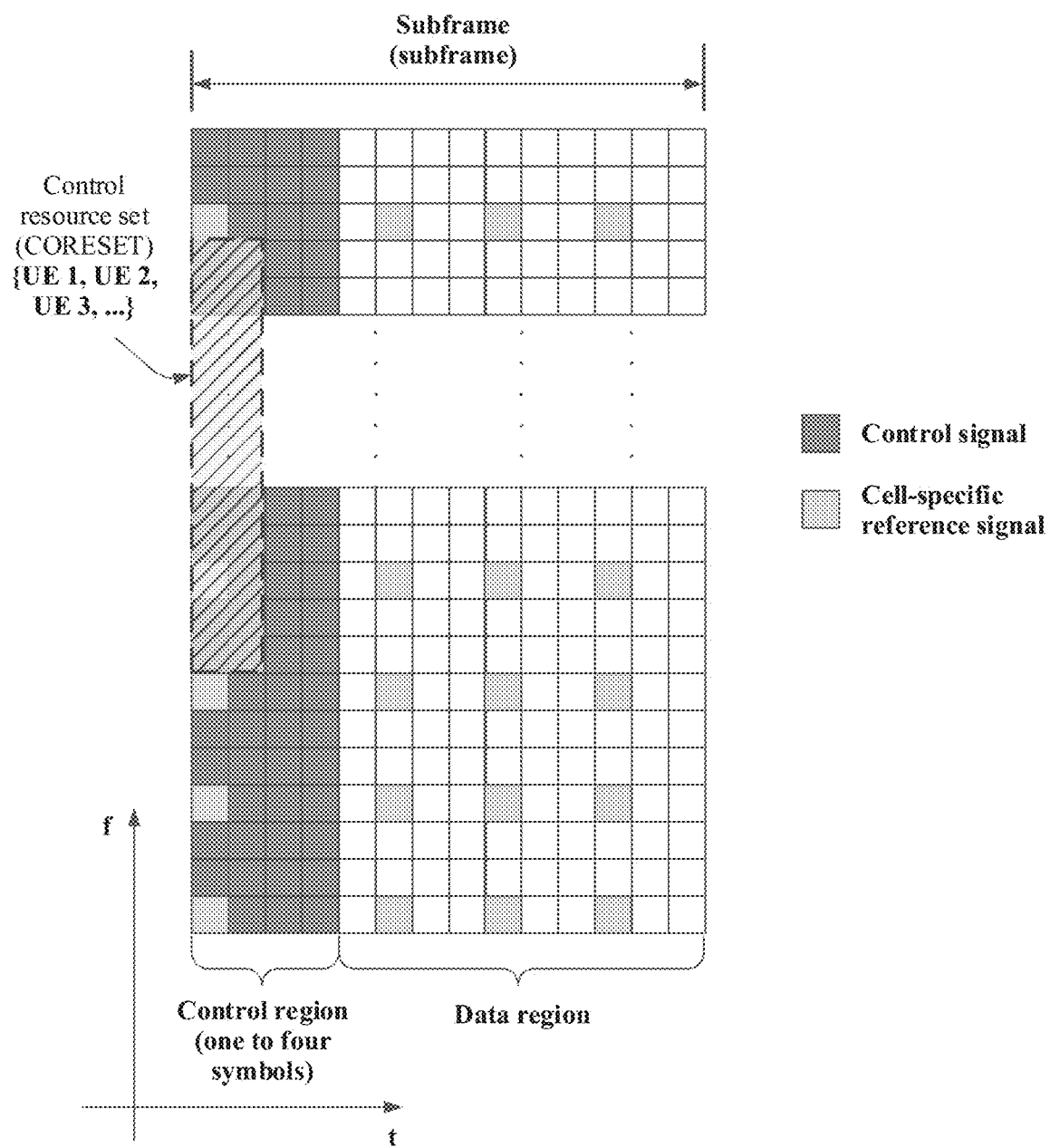
FIG. 3 is a schematic diagram of a control resource set in this application.

FIG. 3 shows an example of a control resource set (CORESET) in this application. As shown in FIG. 3, one CORESET is one time-frequency resource including a plurality of resource elements (RE). One CORESET corresponds to one group of terminals (such as UE 1, UE 2, and UE 3). A physical downlink control channel (PDCCH) of the group of UE is sent on the CORESET. On one CORESET, each UE has one search space, and a size of a resource in the search space is less than or equal to a size of a resource in the CORESET. The search space is a set of candidate PDCCHs that need to be monitored by a user. The PDCCH candidate is a position at which a PDCCH in a control region (such as the first four symbols in one subframe) may appear.

Figure 4:
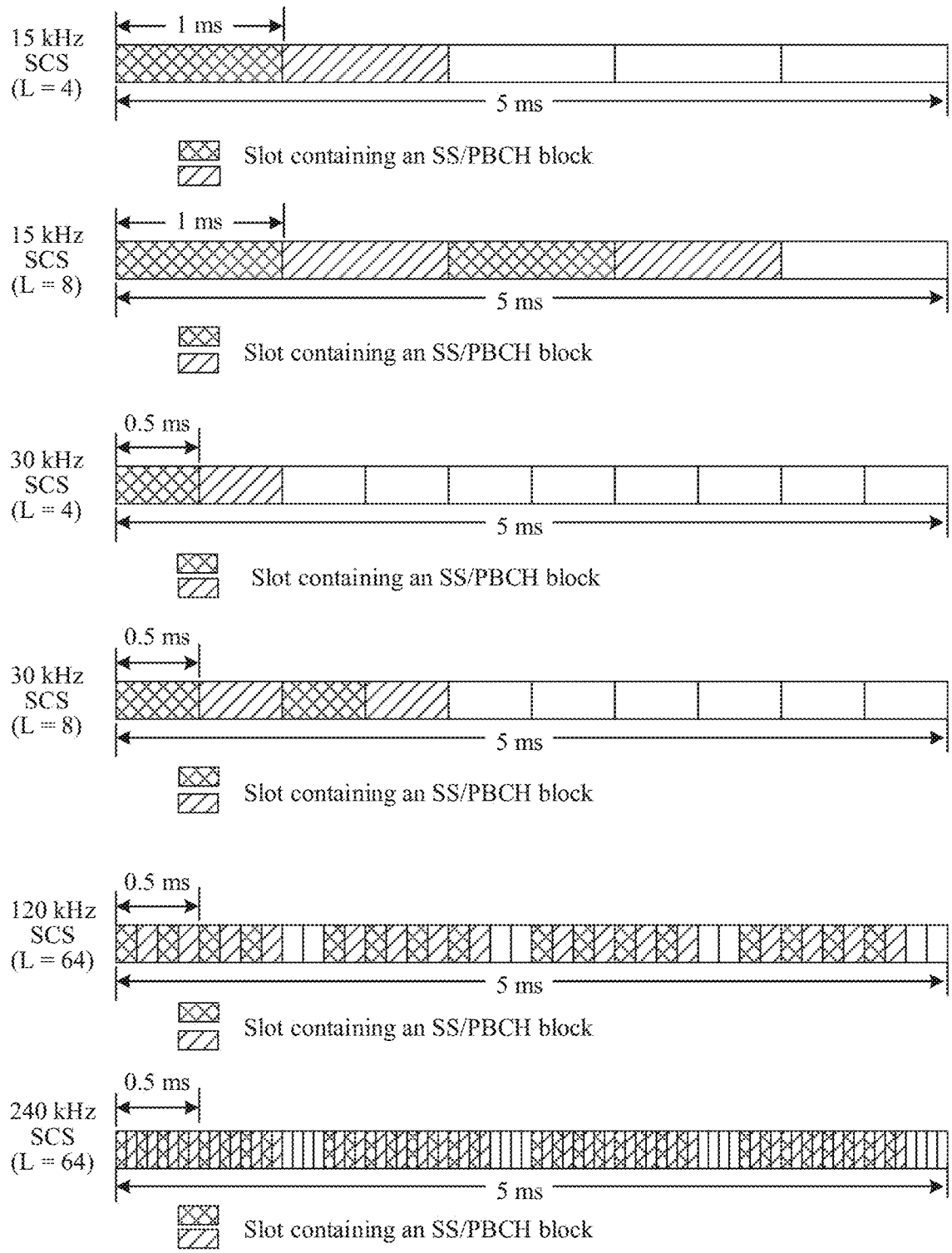
FIG. 4 is a schematic diagram of a position mapping relationship of SS/PBCH blocks in an SS burst set window defined in an NR standard.

As shown in FIG. 4, a time domain resource mapping pattern of an SS/PBCH block has been defined in an NR system working in a licensed frequency band. This pattern indicates a time position at which the SS/PBCH block may appear in an SS burst set window. Herein, a series of time positions at which the SS/PBCH block may appear may be referred to as time positions of candidate SS/PBCH blocks.

Specifically, for a half-frame (duration of the half-frame is an SS burst set window) carrying the SS/PBCH block, a quantity of candidate SS/PBCH blocks (SS/PBCH block candidate) and indexes of starting symbols of the candidate SS/PBCH blocks are determined by a subcarrier spacing (SCS) of the SS/PBCH block as follows:

1. The SCS=15 kHz: The indexes of the starting symbols of the candidate SS/PBCH blocks include {2, 8}+14*n. When a carrier frequency is less than 3 GHz, n=0 or 1. When the carrier frequency is greater than 3 GHz and less than 6 GHz, n=0, 1, 2, or 3.
2. The SCS=30 kHz: The indexes of the starting symbols of the candidate SS/PBCH blocks include {4, 8, 16, 20}+28*n. When the carrier frequency is less than 3 GHz, n=0. When the carrier frequency is greater than 3 GHz and less than 6 GHz, n=0 or 1.
3. The SCS=30 kHz: The indexes of the starting symbols of the candidate SS/PBCH blocks include {2, 8}+14*n. When the carrier frequency is less than 3 GHz, n=0 or 1. When the carrier frequency is greater than 3 GHz and less than 6 GHz, n=0, 1, 2, or 3.
4. The SCS=120 kHz: The indexes of the starting symbols of the candidate SS/PBCH blocks include {4, 8, 16, 20}+28*n. When the carrier frequency is greater than 6 GHz, n=0, 1, 2, 3, 5, 6, 7, 8, 10, 11, 12, 13, 15, 16, 17, or 18.
5. The SCS=240 kHz: The indexes of the starting symbols of the candidate SS/PBCH blocks include (8, 12, 16, 20, 32, 36, 40, 44)+56*n. When the carrier frequency is greater than 6 GHz, n=0, 1, 2, 3, 5, 6, 7, or 8.

The candidate SS/PBCH blocks in the SS burst set window are numbered from 0 to L−1 in ascending order of time. L is a positive integer, and a value of L may be equal to 4 or greater than 4 (but not greater than 64). These numbers are also referred to as time indexes.

It can be learned that for a particular SCS (for example, the SCS=15 kHz), a preset time position (that is, the candidate SS/PBCH block) that is used to send the SS/PBCH block in the SS burst set window is specified in NR.

In an NR system, when a terminal detects an SS/PBCH block, the terminal may determine, based on a time index carried on a PBCH in the SS/PBCH block, a preset time position corresponding to the SS/PBCH block in an SS burst set window, to determine a symbol (that is, a PSS symbol or an SSS symbol in the SS/PBCH block) occupied by system timing information in the SS burst set window. In addition, the terminal may determine, based on half-frame indication information carried on the PBCH in the SS/PBCH block, whether the SS burst set window in which the SS/PBCH block is located is first 5 ms or last 5 ms of a 10 ms radio frame. In this way, the terminal can correctly receive system timing information sent by a network device (such as a gNB), to complete synchronization between the terminal and the network device.

Figure 5:
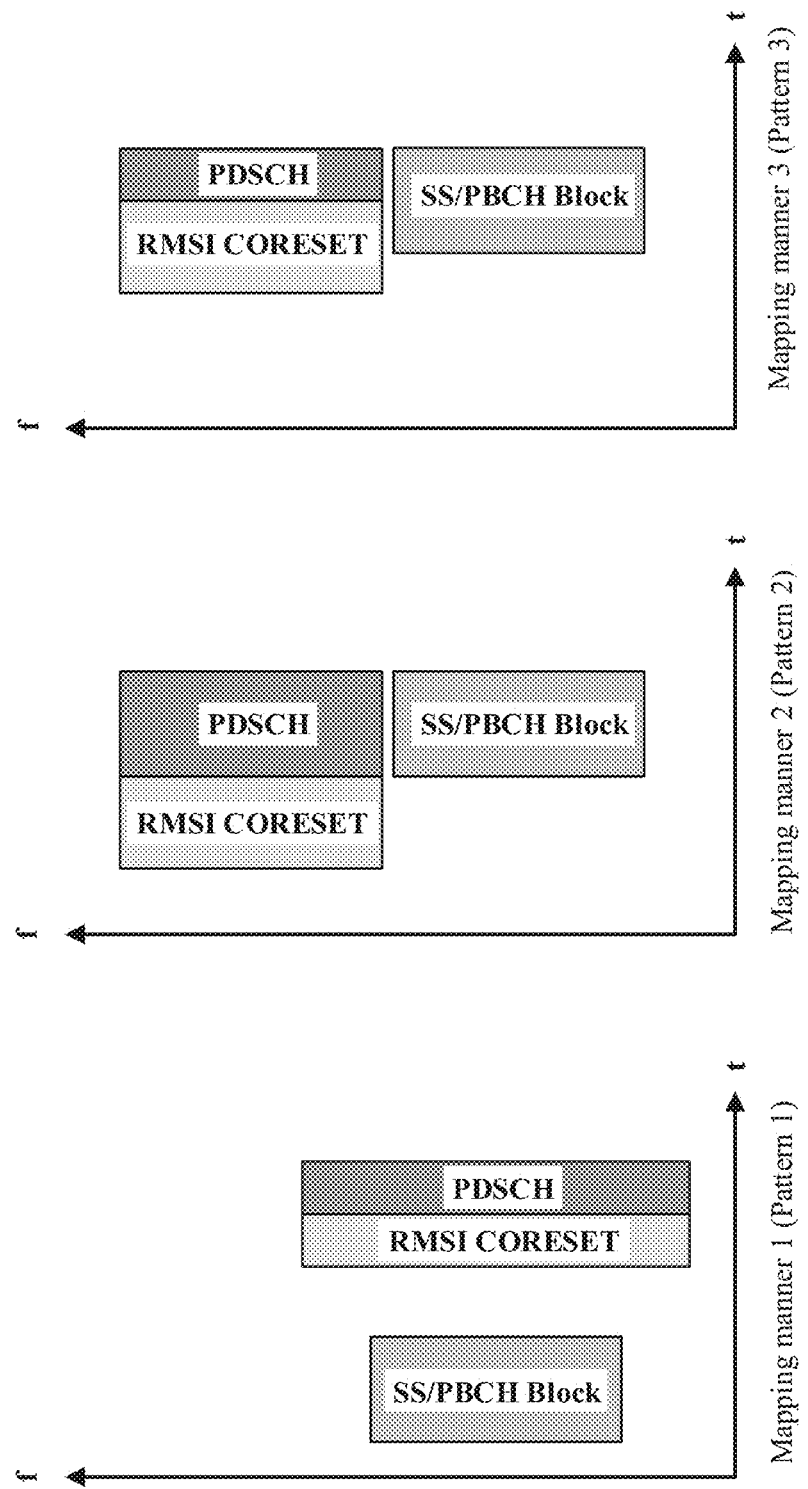
FIG. 5 is a schematic diagram of a time-frequency mapping relationship between an RMSI CORESET and a corresponding SS/PBCH block in this application.

As shown in FIG. 5, there are three resource mapping manners between an SS/PBCH block and an RMSI CORESET corresponding to the SS/PBCH block. This application mainly discusses a first resource mapping manner (Pattern 1). To be specific, the SS/PBCH block and the RMSI CORESET corresponding to the SS/PBCH block use a time division multiplexing (TDM) resource multiplexing manner. In the first resource mapping manner, a time position at which an RMSI CORESET corresponding to an SS/PBCH block is sent is related to a time position at which the SS/PBCH block is sent. The time positions may be specifically represented by using the following algorithms (formulas (1) and (2)).

It is assumed that a time index of the SS/PBCH block is i (i is a positive integer), and an SS/PBCH block i is an $i^{th}$ SS/PBCH block in an SS burst set. Therefore, in a radio frame, an index S of a starting slot of the RMSI CORESET corresponding to the SS/PBCH block is:

$$S = \mathrm{mod}(X*n + f(i), N_{slot}); \quad (1)$$

$$f(i) = \mathrm{floor}(i*M); \quad (2)$$

$N_{slot}$ is a quantity of slots in the radio frame (10 ms), and the quantity of slots is related to an SCS of the RMSI CORESET. When the subcarrier spacing of the RMSI CORESET is 15 kHz, there are 10 slots within 10 ms. When the subcarrier spacing of the RMSI CORESET is 30 kHz, there are 20 slots within 10 ms. When the subcarrier spacing of the RMSI CORESET is 60 kHz, there are 40 slots within 10 ms. When the subcarrier spacing of the RMSI CORESET is 120 kHz, there are 80 slots within 10 ms.

n=(RMSI CORESET SCS)/(15 kHz), and RMSI CORESET SCS is the subcarrier spacing of the RMSI CORESET.

X may be configured as any one of a set {0, 2, 5, 7}. A value of M may be any one of a set {0.5, 1, 2}, and a reciprocal N of M represents a quantity of RMSI CORESETs that can be included in one slot.

Table 1 shows resource mapping statuses between the SS/PBCH block and the RMSI CORESET in the case of different values of X/M/N.

TABLE 1

| {SS/PBCH block SCS, RMSI SCS} = {30 kHz, 30 kHz}, X = 0, M = 0.5, N = 2 | | | | |
|---|---|---|---|---|
| Time index | 0 | 1 | 2 | 3 |
| SS/PBCH block slot index | 0 | 0 | 1 | 1 |
| RMSI CORESET slot index | 0 | 0 | 1 | 1 |

| {SS/PBCH block SCS, RMSI SCS} = {30 kHz, 30 kHz}, X = 0, M = 1 N = 1 | | | | |
|---|---|---|---|---|
| Time index | 0 | 1 | 2 | 3 |
| SS/PBCH block slot index | 0 | 0 | 1 | 1 |
| RMSI CORESET slot index | 0 | 1 | 2 | 3 |

Time index indicates the time index of the SS/PBCH block, SS/PBCH block slot index indicates an index of a slot in which the SS/PBCH block is located, and RMSI CORESET slot index indicates an index of a starting slot of the RMSI CORESET.

It can be learned from Table 1 that when X=0, M=0.5, and N=2, an SS/PBCH block 0 and an RMSI CORESET corresponding to the SS/PBCH block 0 are both located in a slot 0, an SS/PBCH block 1 and an RMSI CORESET corresponding to the SS/PBCH block 1 are both located in the slot 0, an SS/PBCH block 2 and an RMSI CORESET corresponding to the SS/PBCH block 2 are both located in a slot 1, and an SS/PBCH block 3 and an RMSI CORESET corresponding to the SS/PBCH block 3 are both located in the slot 1. In other words, when X=0, M=0.5, and N=2, the SS/PBCH block and the RMSI CORESET corresponding to the SS/PBCH block are in a same slot.

It can be learned from Table 1 that when X=0, M=1, and N=1, the SS/PBCH block 0 and the RMSI CORESET corresponding to the SS/PBCH block 0 are both located in the slot 0. However, the SS/PBCH block 1 and the RMSI CORESET corresponding to the SS/PBCH block 1 are not in a same slot. The SS/PBCH block 1 is located in the slot 0, and the RMSI CORESET corresponding to the SS/PBCH block 1 is located in the slot 1. Similarly, the SS/PBCH block 2 and the RMSI CORESET corresponding to the SS/PBCH block 2 are not in a same slot, and the SS/PBCH block 3 and the RMSI CORESET corresponding to the SS/PBCH block 3 are not in a same slot. In addition, a time offset between a subsequent SS/PBCH block and an RMSI CORESET corresponding to the subsequent SS/PBCH block increases.

Based on the foregoing analysis, it can be learned that a correlation between a time position of the RMSI CORESET and a time position of the SS/PBCH block corresponding to the RMSI CORESET may be reflected as follows:

1. The RMSI CORESET and the SS/PBCH block corresponding to the RMSI CORESET are in a same slot. Specifically, when the RMSI CORESET and the SS/PBCH block corresponding to the RMSI CORESET are in a same slot (for example, X=0, and M=1), positions i of starting symbols of the SS/PBCH blocks in the case of different SCSs are defined in NR (referring to FIG. 4), and positions S of starting symbols of the RMSI CORESETs corresponding to the SS/PBCH blocks may be determined according to the foregoing formulas (1) and (2).

2. Time positions of the RMSI CORESET and the SS/PBCH block corresponding to the RMSI CORESET are in different slots. Specifically, a difference between a slot in which the RMSI CORESET is located and a slot in which the SS/PBCH block corresponding to the RMSI CORESET is located is an integer quantity of slots. Herein, the difference may mean that the slot in which the RMSI CORESET is located is earlier or later than the slot in which the SS/PBCH block corresponding to the RMSI CORESET is located. For example, referring to Table 1, the SS/PBCH block 1 is in the slot 0, and the RMSI CORESET corresponding to the SS/PBCH block 1 is in the slot 1. The slot in which the RMSI CORESET corresponding to the SS/PBCH block 1 is located is delayed by one slot relative to the slot in which the SS/PBCH block 1 is located. In the slot 1, the position S of the starting symbol of the RMSI CORESET may be determined by using the foregoing formulas (1) and (2).

In a possible case, the position S of the starting symbol of the RMSI CORESET may be a symbol 0 or 1 in a slot in which the RMSI CORESET is located, that is, the first two symbols. Duration of the RMSI CORESET may be a case corresponding to a value in a set {1, 2, 3}, and an element in the set represents a quantity of symbols.

It may be understood that an excessively large time offset between the SS/PBCH block and the RMSI CORESET corresponding to the SS/PBCH block does not help send the SS/PBCH block and the RMSI CORESET corresponding to the SS/PBCH block in an NRU system. This is because a maximum channel occupancy time (MCOT) allowed by one time of successful LBT listening is limited. For example, the MCOT is 10 ms. If the time offset is greater than the MCOT, after sending the SS/PBCH block through one time of successful LBT listening, the network device 101 cannot send the RMSI CORESET corresponding to the SS/PBCH block until a next time of successful LBT listening. There may be an interval of one or more radio frames between two times of LBT listening. In this way, after receiving the SS/PBCH block, a terminal device may fail to obtain complete system configuration information used for random access, and cannot perform random access in time.

In addition, in the NRU system, due to impact of the LBT mechanism, the network device may fail to send the SS/PBCH block at the preset time position based on a mapping rule of an SS burst set defined in an NR standard. Therefore, this application provides a technical solution of sending, in an NRU system, an SS/PBCH block and an RMSI CORESET corresponding to the SS/PBCH block.

Figure 7:
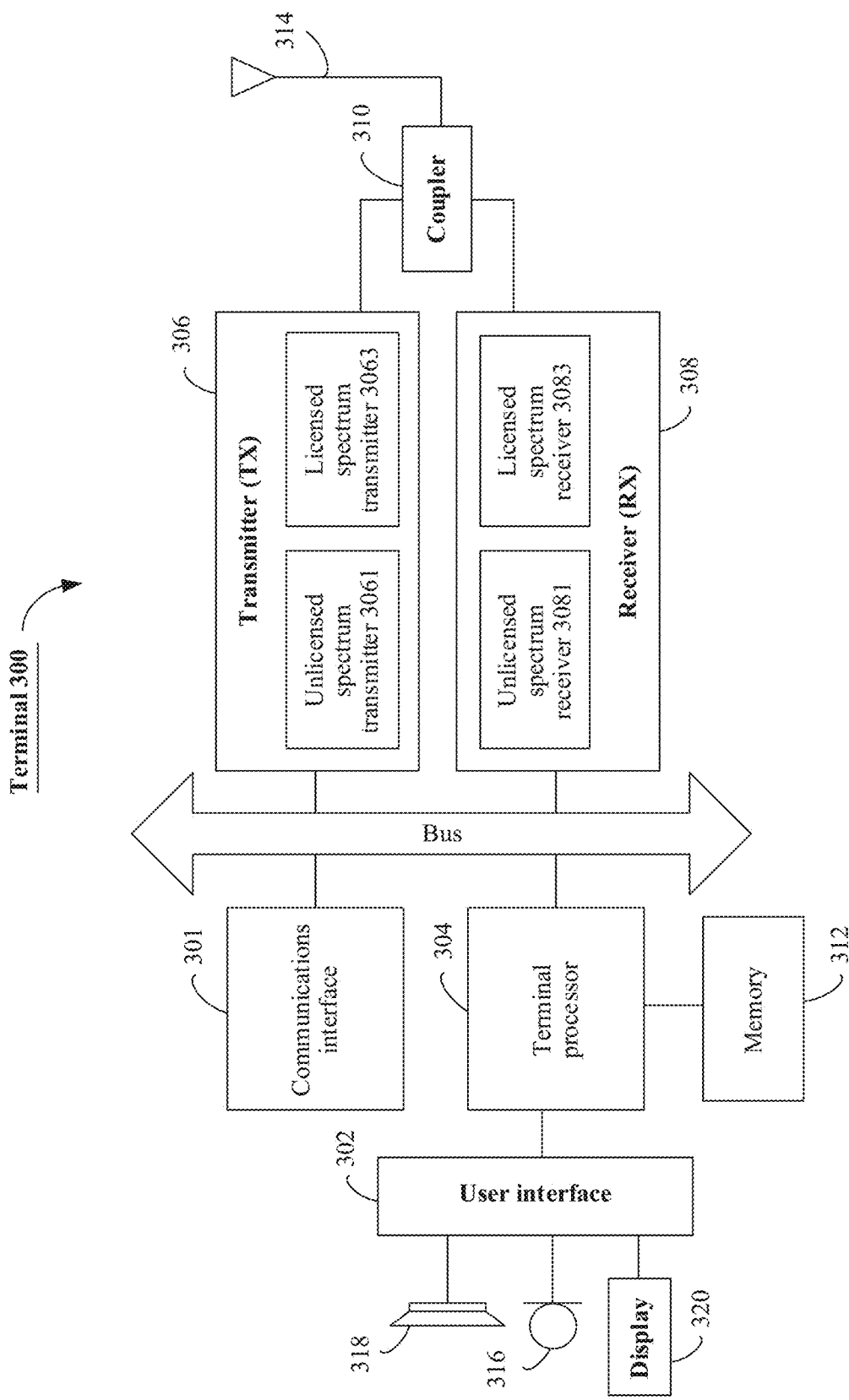
FIG. 7 is a schematic diagram of a hardware architecture of a terminal device according to an embodiment of this application.

FIG. 7 shows a terminal 300 provided in some embodiments of this application. As shown in FIG. 7, the terminal 300 may include input/output modules (including an audio input/output module 318, a key input module 316, a display 320, and the like), a user interface 302, one or more terminal processors 304, a transmitter 306, a receiver 308, a coupler 310, an antenna 314, and a memory 312. These components may be connected via a bus or in another manner. In FIG. 7, an example in which the components are connected via the bus is used.

A communications interface 301 may be used by the terminal 300 to communicate with another communications device, for example, a base station. Specifically, the base station may be a network device 400 shown in FIG. 8. The communications interface 301 is an interface between the terminal processor 304 and a transceiver system (including the transmitter 306 and the receiver 308), for example, an X1 interface in LTE. In a specific implementation, the communications interface 301 may include one or more of a global system for mobile communications (GSM) (2G) communications interface, a wideband code division multiple access (WCDMA) (3G) communications interface, a long term evolution (LTE)(4G) communications interface, and the like, or may be a 4.5G, 5G, or future new radio communications interface. Not limited to the wireless communications interface, the terminal 300 may be further configured with a wired communications interface 301, for example, a local area network (LAN) interface.

The antenna 314 may be configured to convert electromagnetic energy in a transmission line into an electromagnetic wave in free space, or convert an electromagnetic wave in free space into electromagnetic energy in a transmission line. The coupler 310 is configured to divide a mobile communication signal received by the antenna 314 into a plurality of signals, and allocate the plurality of signals to a plurality of receivers 308.

The transmitter 306 may be configured to perform transmission processing on a signal output by the terminal processor 304, for example, modulate the signal in a licensed frequency band or modulate the signal in an unlicensed frequency band. In some embodiments of this application, the transmitter 306 may include an unlicensed spectrum transmitter 3061 and a licensed spectrum transmitter 3063. The unlicensed spectrum transmitter 3061 may support the terminal 300 in transmitting signals in one or more unlicensed spectrums, and the licensed spectrum transmitter 3063 may support the terminal 300 in transmitting signals in one or more licensed spectrums.

The receiver 308 may be configured to perform receiving processing on the mobile communication signal received by the antenna 314. For example, the receiver 308 may demodulate a received signal that has been modulated in an unlicensed frequency band or demodulate a received signal that has been modulated in a licensed frequency band. In some embodiments of this application, the receiver 308 may include an unlicensed spectrum receiver 3081 and a licensed spectrum receiver 3083. The unlicensed spectrum receiver 3081 may support the terminal 300 in receiving a signal that is modulated on in unlicensed spectrum, and the licensed spectrum receiver 3083 may support the terminal 300 in receiving a signal that is modulated in a licensed spectrum.

In some embodiments of this application, the transmitter 306 and the receiver 308 may be considered as a wireless modem. In the terminal 300, there may be one or more transmitters 306 and one or more receivers 308.

In addition to the transmitter 306 and the receiver 308 shown in FIG. 7, the terminal 300 may further include other communications components such as a GPS module, a bluetooth module, and a wireless fidelity (Wi-Fi) module. In addition to the wireless communication signal stated above, the terminal 300 may further support other wireless communication signals, for example, a satellite signal and a short-wave signal. Not limited to wireless communication, the terminal 300 may be further configured with a wired network interface (such as a LAN interface) to support wired communication.

The input/output modules may be configured to implement interaction between the terminal 300 and a user/an external environment, and may mainly include the audio input/output module 318, the key input module 316, the display 320, and the like. In a specific implementation, the input/output modules may further include a camera, a touchscreen, a sensor, and the like. The input/output modules all communicate with the terminal processor 304 through the user interface 302.

The memory 312 is coupled to the terminal processor 304, and configured to store various software programs and/or a plurality of sets of instructions. In a specific implementation, the memory 312 may include a high-speed random access memory, and may also include a nonvolatile memory, such as one or more disk storage devices, a flash memory device, or another nonvolatile solid-state storage device. The memory 312 may store an operating system (referred to as a "system" for short below), for example, an embedded operating system such as Android, iOS, Windows, or Linux. The memory 312 may further store a network communications program. The network communications program may be configured to communicate with one or more additional devices, one or more terminal devices, and one or more network devices. The memory 312 may further store a user interface program. The user interface program may use a graphical operation interface to visually display content of an application program, and use input controls such as menus, dialog boxes, and keys to receive control operations of a user on the application program.

In some embodiments of this application, the memory 312 may be configured to store a program for implementing, on a side of the terminal 300, a signal transmission method provided in one or more embodiments of this application. For an implementation of the signal transmission method provided in the one or more embodiments of this application, refer to the following embodiments.

The terminal processor 304 may be configured to read and execute a computer-readable instruction. Specifically, the terminal processor 304 may be configured to invoke a program stored in the memory 312, for example, the program for implementing, on the side of the terminal 300, the signal transmission method provided in the one or more embodiments of this application, and execute an instruction included in the program.

It may be understood that the terminal 300 may be the terminal 103 in the wireless communications system 100 shown in FIG. 2, and may be implemented as a mobile device, a mobile station, a mobile unit, a radio unit, a remote unit, a user agent, a mobile client, or the like.

It should be noted that the terminal 300 shown in FIG. 7 is merely an implementation of this application. In an actual application, the terminal 300 may alternatively include more or fewer components. This is not limited herein.

Figure 8:
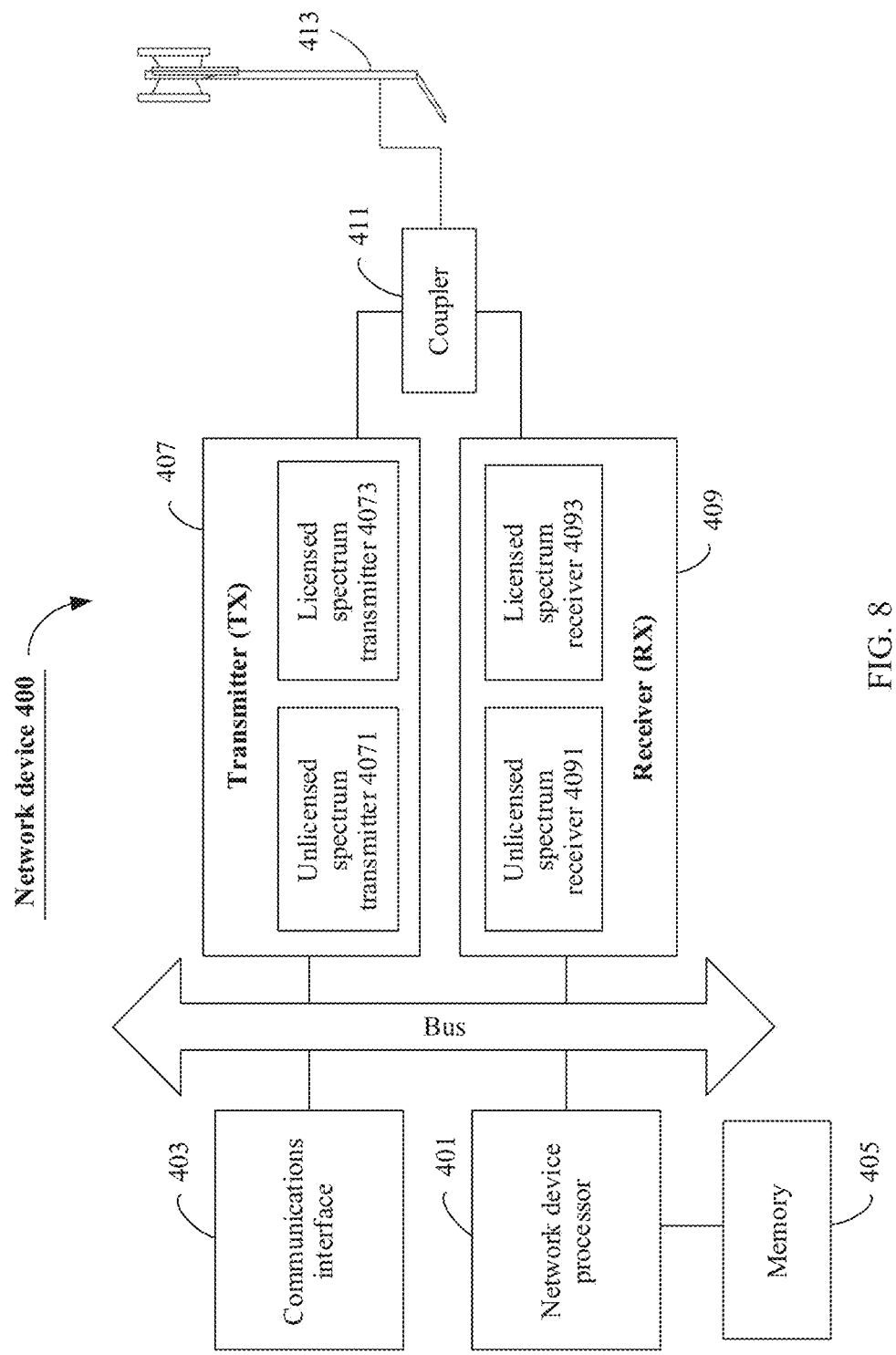
FIG. 8 is a schematic diagram of a hardware architecture of a network device according to an embodiment of this application.

FIG. 8 shows a network device 400 provided in some embodiments of this application. As shown in FIG. 8, the network device 400 may include a communications interface 403, a network device processor 401, a transmitter 407, a receiver 409, a coupler 411, an antenna 413, and a memory 405. These components may be connected via a bus or in another manner. In FIG. 8, an example in which the components are connected via the bus is used.

The communications interface 403 may be used by the network device 400 to communicate with another communications device, for example, a terminal device or another base station. Specifically, the terminal device may specifically be the terminal 300 shown in FIG. 7. The communications interface 403 is an interface between the network device processor 401 and a transceiver system (including the transmitter 407 and the receiver 409), for example, an S1 interface in LTE. In a specific implementation, the communications interface 403 may include one or more of a global system for mobile communications (GSM)(2G) communications interface, a wideband code division multiple access (WCDMA) (3G) communications interface, a long term evolution (LTE) (4G) communications interface, or the like, or may be a 4.5G, 5G, or future new radio communications interface. Not limited to a wireless communications interface, the network device 400 may be further configured with a wired communications interface 403 to support wired communication. For example, a backhaul connection between the network device 400 and another network device 400 may be a wired communication connection.

The antenna 413 may be configured to convert electromagnetic energy in a transmission line into an electromagnetic wave in free space, or convert an electromagnetic wave in free space into electromagnetic energy in a transmission line. The coupler 411 may be configured to divide the mobile communication signal into a plurality of signals, and allocate the plurality of signals to a plurality of receivers 409.

The transmitter 407 may be configured to perform transmission processing on a signal output by the network device processor 401, for example, modulate the signal in a licensed frequency band or modulate the signal in an unlicensed frequency band. In some embodiments of this application, the transmitter 407 may include an unlicensed spectrum transmitter 4071 and a licensed spectrum transmitter 4073. The unlicensed spectrum transmitter 4071 may support the network device 400 in transmitting signals in one or more unlicensed spectrums, and the licensed spectrum transmitter 4073 may support the network device 400 in transmitting signals in one or more licensed spectrums.

The receiver 409 may be configured to perform receiving processing on the mobile communication signal received by the antenna 413. For example, the receiver 409 may demodulate a received signal that has been modulated in an unlicensed frequency band or demodulate a received signal that has been modulated in a licensed frequency band. In some embodiments of this application, the receiver 409 may include an unlicensed spectrum receiver 4091 and a licensed spectrum receiver 4093. The unlicensed spectrum receiver 4091 may support the network device 400 in receiving a signal that is modulated in an unlicensed spectrum, and the licensed spectrum receiver 4093 may support the network device 400 in receiving a signal that is modulated in a licensed spectrum.

In some embodiments of this application, the transmitter 407 and the receiver 409 may be considered as a wireless modem. The network device 400 may include one or more transmitters 407 and one or more receivers 409.

The memory 405 is coupled to the network device processor 401, and configured to store various software programs and/or a plurality of sets of instructions. In a specific implementation, the memory 405 may include a high-speed random access memory, and may also include a nonvolatile memory, such as one or more disk storage devices, a flash memory device, or another nonvolatile solid-state storage device. The memory 405 may store an operating system (referred to as a system for short below), for example, an embedded operating system such as uCOS, VxWorks, or RTLinux. The memory 405 may further store a network communications program. The network communications program may be configured to communicate with one or more additional devices, one or more terminal devices, and one or more network devices.

The network device processor 401 may be configured to manage a radio channel, establish or tear down a call or communications link, and control cross-region handover of user equipment in a local control region. In a specific implementation, the network device processor 401 may include: an administration module/communications module (AM/CM) (a center for speech channel switching and information exchange), a basic module (BM) (configured to implement call processing, signaling processing, radio resource management, radio link management, and circuit maintenance functions), a transcoder and submultiplexer (TCSM) (configured to implement multiplexing/demultiplexing and transcoding functions), and the like.

In this application, the network device processor 401 may be configured to read and execute a computer readable instruction. Specifically, the network device processor 401 may be configured to invoke a program stored in the memory 405, for example, a program for implementing, on a side of the network device 400, a signal transmission method provided in one or more embodiments of this application, and execute an instruction included in the program.

It may be understood that the network device 400 may be the network device 101 in the wireless communications system 100 shown in FIG. 2, and may be implemented as a base transceiver station, a wireless transceiver, a basic service set (BSS), an extended service set (ESS), a NodeB, an eNodeB, or the like. The network device 400 may be implemented as several different types of base stations, for example, a macro base station or a micro base station. Different wireless technologies, for example, a cell radio access technology or a WLAN radio access technology, may be applied to the network device 400.

It should be noted that the network device 400 shown in FIG. 8 is merely an implementation of this application. In an actual application, the network device 400 may further include more or fewer components. This is not limited herein.

Based on the foregoing embodiments respectively corresponding to the wireless communications system 100, the terminal 300, and the network device 400, this application provides a signal transmission method, and provides technical solutions of sending an SS/PBCH block and an RMSI CORESET in a communications system (an NRU system is used as an example in subsequent content) working in an unlicensed frequency band. The technical solutions mainly include the following solutions.

Solution 1: With reference to a preset time position in an SS burst set window defined in an NR standard, in the NRU system, a plurality of preset time positions may be configured in the SS burst set window for to-be-sent SS/PBCH blocks. In this way, a probability that the SS/PBCH block is successfully sent at the preset time position can be increased.

Solution 2: In the NRU system, due to impact of LBT, an SS/PBCH block may not be sent at a preset time position (as shown in FIG. 4) defined in an NR standard. A network device needs to notify a terminal of a time offset (that is, a first offset) between an actual time position and the preset time position of the SS/PBCH block. In addition, the network device may send an RMSI CORESET corresponding to the SS/PBCH block after delaying the RMSI CORESET by a same time offset, to ensure that the SS/PBCH block and the RMSI CORESET corresponding to the SS/PBCH block are sent within a maximum channel occupancy time (MCOT).

In this application, the preset time position in the SS burst set window may be a position of a starting symbol of a candidate SS/PBCH block defined in the NR standard. The actual time position is a time position (such as a slot in which the starting symbol is located) at which the SS/PBCH block is actually sent in a radio frame. Not limited to the candidate SS/PBCH block defined in the NR standard, the preset time position in the SS burst set window may change in an evolution process of a future communications standard. This does not affect implementation of this application.

Figure 9:
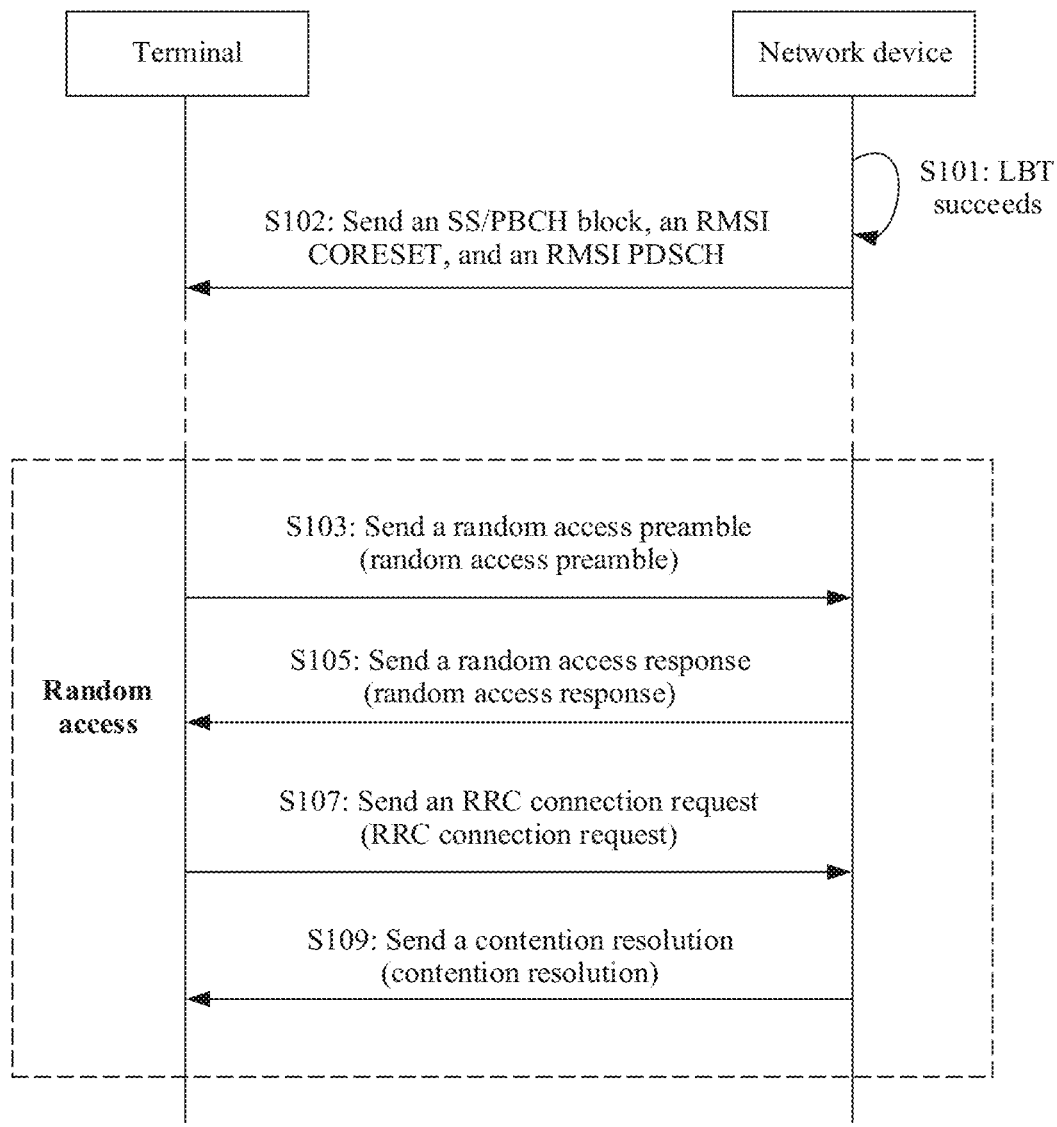
FIG. 9 is an overall schematic flowchart of two SS/PBCH block sending solutions according to this application.

FIG. 9 shows an overall process involved in both the solution 1 and the solution 2. The process specifically includes the following steps.

S101 and S102: After LBT succeeds, a network device sends an SS/PBCH block, an RMSI CORESET, and an RMSI PDSCH.

Specifically, a PBCH carried in the SS/PBCH block is used to indicate information about a time-frequency resource position corresponding to the RMSI CORESET, indication information carried in the RMSI CORESET is used to indicate a time-frequency resource position of the RMSI PDSCH, and system information carried on the RMSI PDSCH is used to indicate resource configuration information of a PRACH. In this way, a terminal may receive and demodulate the RMSI CORESET based on the PBCH in the SS/PBCH block, then obtain the time-frequency resource position of the RMSI PDSCH through the indication information carried in the RMSI CORESET, finally obtain the system information carried in the RMSI PDSCH, and finally obtain the resource configuration information of the PRACH. The resource configuration information of the PRACH is used by the terminal to perform a subsequent initial access procedure.

An RMSI PDSCH indicated by an RMSI CORESET corresponding to one SS/PBCH block and the SS/PBCH block jointly carry system configuration information used by a user to perform random access. One SS/PBCH block and an RMSI CORESET corresponding to the SS/PBCH block correspond to a same user. In other words, the SS/PBCH block and the RMSI CORESET corresponding to the SS/PBCH block correspond to a same beam. Methods for sending an SS/PBCH block and an RMSI CORESET in the solution 1 and the solution 2 are described in detail in subsequent embodiments. Details are not described herein.

S103 to S109: Random access process (contention-based random access is used as an example). Specifically, the following procedure may be included.

S103: The terminal sends a random access preamble.

S105: The network device sends a random access response.

S107: The terminal sends a radio resource control (RRC) connection request.

S109: The network device sends a contention resolution.

For the random access process, refer to a chapter about initial access in 3GPP 38.213. Details are not described herein.

FIG. 9 is merely used to show an application scenario of sending solutions of the SS/PBCH block and the RMSI CORESET provided in this application, that is, a random access scenario in a communications system working in an unlicensed frequency band. Not limited to what is shown in FIG. 9, before the random access process, another procedure, for example, random access preparation, may be further performed between the network device and the terminal.

The solution 1 and the solution 2 provided in this application are described in detail below by using a plurality of embodiments.

(1) Embodiment 1

The solution 1 is used in this embodiment. To be specific, a plurality of preset time positions are configured in an SS burst set window for one or more to-be-sent SS/PBCH blocks. A network device sends the SS/PBCH block after LBT succeeds. An actual time position at which the SS/PBCH block is sent is the preset time position corresponding to the SS/PBCH block in the SS burst set window. Specifically, the actual time position at which the SS/PBCH block is sent is a time position that is in the plurality of preset time positions corresponding to the SS/PBCH block and that is later than a preset time position at which LBT succeeds. Herein, the SS/PBCH block may be any to-be-sent SS/PBCH block.

In Embodiment 1, the plurality of preset time positions corresponding to the SS/PBCH block may periodically appear in the SS burst set window.

Figure 10:
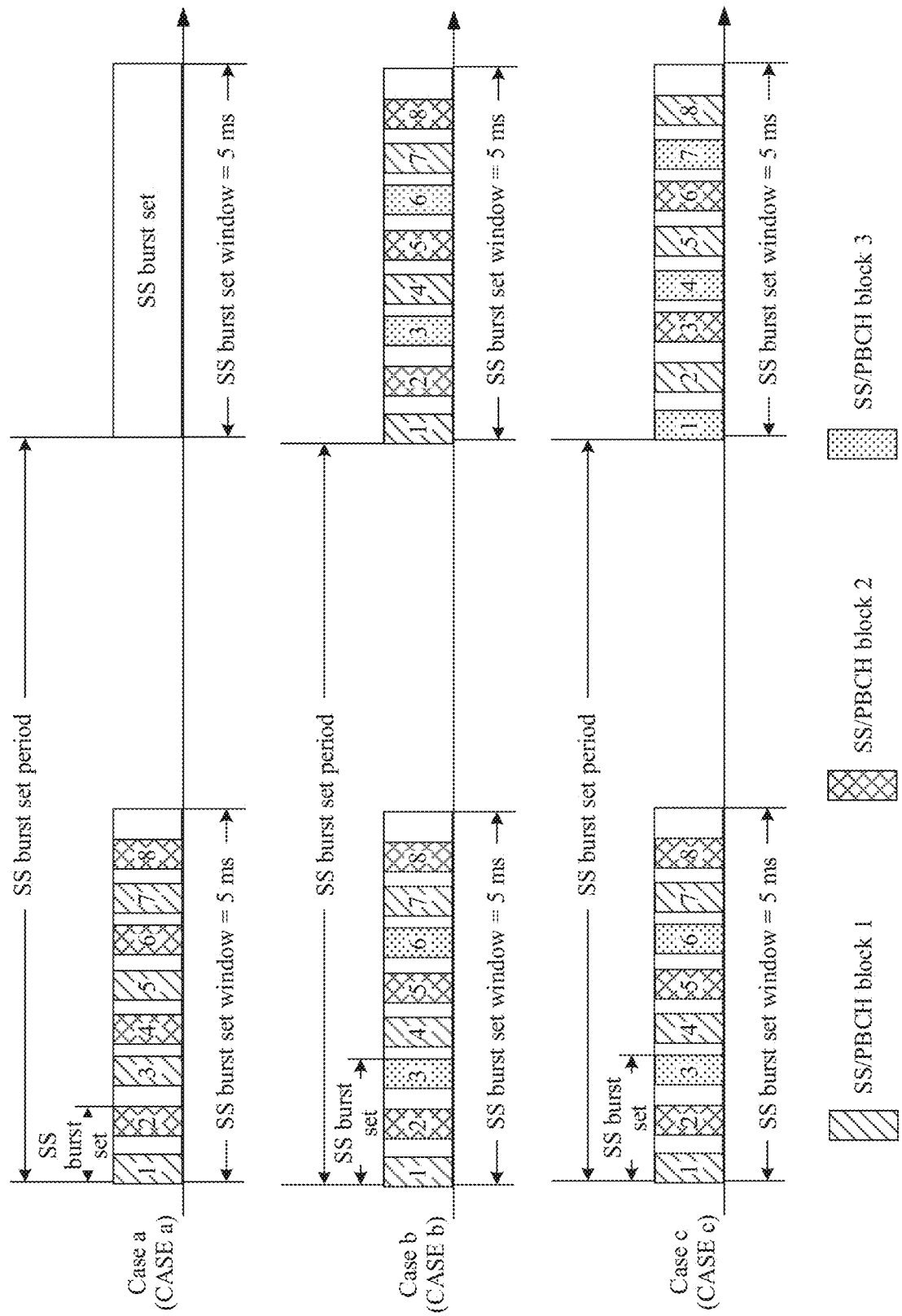
FIG. 10 is a schematic diagram of an SS/PBCH block sending manner according to this application.

FIG. 10 shows examples of several cases of Embodiment 1.

(1) In a case a, it is assumed that eight preset time positions are configured in an SS burst set window of 5 ms, and the network device (such as a gNB) needs to send only two different SS/PBCH blocks (for example, corresponding to two beam directions). In this case, a preset position mapping relationship of the to-be-sent SS/PBCH blocks in the SS burst set window may be: Positions 1, 3, 5, and 7 correspond to an SS/PBCH block 1, and positions 2, 4, 6, and 8 correspond to an SS/PBCH block 2. In addition, a plurality of preset time positions (the positions 1, 3, 5, and 7) corresponding to the SS/PBCH block 1 repeatedly appear in the SS burst set window periodically, and a period in which the plurality of preset time positions repeatedly appear is 2. To be specific, a preset time position corresponding to the SS/PBCH block 1 appears once in every two preset time positions. Similarly, a plurality of preset time positions corresponding to the SS/PBCH block 2 also repeatedly appear in the SS burst set window periodically, and a period in which the plurality of preset time positions repeatedly appear is also 2. It can be learned that the SS/PBCH block 1/2 may appear for a plurality of times in the SS burst set window. In other words, the SS/PBCH block 1/2 has a plurality of chances of being sent in the SS burst set window. In this way, the network device (such as a gNB) can send the SS/PBCH block 1/2 at a plurality of possible positions after LBT succeeds. In this way, a probability that the SS/PBCH block is successfully sent at the corresponding preset time position can be increased.

In a possible case, the network device (such as a gNB) succeeds in LBT before the position 5. In this case, although the network device cannot respectively send the SS/PBCH blocks 1 and 2 at the positions 1 and 2, and cannot respectively send the SS/PBCH blocks 1 and 2 at the positions 3 and 4, the network device may respectively send the SS/PBCH blocks 1 and 2 at the positions 5 and 6, or may respectively send the SS/PBCH blocks 1 and 2 at the positions 7 and 8. The network device may further repeatedly send the SS/PBCH block at remaining positions (that is, the positions 5, 6, 7, and 8) in the SS burst set window. For example, the network device repeatedly sends the SS/PBCH block 1 at the positions 5 and 7, and repeatedly sends the SS/PBCH block 2 at the positions 6 and 8.

In the case a, the network device (such as a gNB) may notify a terminal of a period in which the plurality of preset time positions corresponding to the SS/PBCH block repeatedly appear in the SS burst set window, and the terminal may learn of preset time positions corresponding to a same SS/PBCH block. For example, the terminal may learn that the positions 1, 3, 5, and 7 correspond to a same SS/PBCH block, and the positions 2, 4, 6, and 8 correspond to a same SS/PBCH block.

Specifically, indication information of the period may be carried in at least one of the following messages: an RMSI CORESET, an RMSI PDSCH, RRC signaling (such as a message 4 in a random access process), or a broadcast channel.

Optionally, in a case b, an offset may be used to indicate a case in which the plurality of preset time positions corresponding to the to-be-sent SS/PBCH block repeatedly appear in the SS burst set window periodically or aperiodically. Herein, the offset is used to indicate an offset between the plurality of preset time positions corresponding to the to-be-sent SS/PBCH block. For example, it is assumed that the first preset time position is used as a reference. In the case a, the positions 1, 3, 5, and 7 all correspond to the SS/PBCH block 1, and then, a possible offset is 2, 4, or 6. In other words, the SS/PBCH block 1 may be actually sent at a position that is offset from the position 1 by the offset. 2 represents an offset of the position 3 from the position 1, 4 represents an offset of the position 5 from the position 1, and 6 represents an offset of the position 7 from the position 1. In this way, the terminal may determine, based on the offset, a possible position at which the SS/PBCH block 1 is actually sent.

In this application, the offset may be referred to as a second offset. Specifically, indication information of the second offset may be carried in at least one of the following messages: an RMSI CORESET, an RMSI PDSCH, RRC signaling (such as a message 4 in a random access process), or a broadcast channel.

(2) In the case b, it is assumed that eight preset time positions are configured in an SS burst set window of 5 ms, and the network device (such as a gNB) needs to send three different SS/PBCH blocks (for example, corresponding to three beam directions). In this case, a preset position mapping relationship of the to-be-sent SS/PBCH blocks in the SS burst set window may be: Positions 1, 4, and 7 correspond to an SS/PBCH block 1, positions 2, 5, and 8 correspond to an SS/PBCH block 2, and positions 3 and 6 correspond to an SS/PBCH block 3. In addition, a plurality of preset time positions (the positions 1, 4, and 7) corresponding to the SS/PBCH block 1 repeatedly appear in the SS burst set window periodically, and a period in which the plurality of preset time positions repeatedly appear is 3. To be specific, a preset time position corresponding to the SS/PBCH block 1 appears once in every three preset time positions. Similarly, a plurality of preset time positions corresponding to the SS/PBCH block 2/3 also repeatedly appear in the SS burst set window periodically, and a period in which the plurality of preset time positions repeatedly appear is also 3. It can be learned that the SS/PBCH block 1/2 may appear for a plurality of times in the SS burst set window. In other words, the SS/PBCH block 1/2 has a plurality of chances of being sent in the SS burst set window. Both the SS/PBCH blocks 1 and 2 have three chances of being sent, and the SS/PBCH block 3 has two chances of being sent. In this way, the network device (such as a gNB) can send the SS/PBCH block 1/2/3 at a plurality of possible positions after LBT succeeds. In this way, a probability that the SS/PBCH block is successfully sent at the corresponding preset time position can be increased.

In a possible case, the network device (such as a gNB) succeeds in LBT before the position 3 of the SS/PBCH block. In this case, although the network device cannot respectively send the SS/PBCH blocks 1 and 2 at the positions 1 and 2, the network device may respectively send the SS/PBCH blocks 3, 1, and 2 at the positions 3, 4, and 5, or may respectively send the SS/PBCH blocks 1, 2, and 3 at the positions 4, 5, and 6. The network device may further repeatedly send the SS/PBCH block at remaining positions (that is, the positions 3, 4, 5, 6, 7, and 8) in the SS burst set window. For example, the network device repeatedly sends the SS/PBCH block 3 at the positions 3 and 6, repeatedly sends the SS/PBCH block 1 at the positions 4 and 7, and repeatedly sends the SS/PBCH block 2 at the positions 5 and 8.

Optionally, in the case b, the network device (such as a gNB) may notify a terminal of a period in which the plurality of preset time positions corresponding to the SS/PBCH block repeatedly appear in the SS burst set window, and the terminal may learn of preset time positions corresponding to a same SS/PBCH block. For example, the terminal may learn that the positions 1, 4, and 7 correspond to a same SS/PBCH block, the positions 2, 5, and 8 correspond to a same SS/PBCH block, and the positions 3 and 6 correspond to a same SS/PBCH block. In addition, the network device (such as a gNB) may further notify the terminal that a position mapping relationship of SS/PBCH blocks in each SS burst set window is the same.

Specifically, indication information of the period may be carried in at least one of the following messages: an RMSI CORESET, an RMSI PDSCH, RRC signaling (such as a message 4 in a random access process), or a broadcast channel.

Optionally, in the case b, an offset may be used to indicate a case in which the plurality of preset time positions corresponding to the to-be-sent SS/PBCH block repeatedly appear in the SS burst set window. Herein, the offset is used to indicate an offset between the plurality of preset time positions corresponding to the to-be-sent SS/PBCH block. For example, it is assumed that the first preset time position is used as a reference. In the case b, the positions 1, 4, and 7 all correspond to an SS/PBCH block 1, and then, a possible offset is 3 or 6. In other words, the SS/PBCH block 1 may be actually sent at a position that is offset from the position 1 by the offset. 3 represents an offset of the position 4 from the position 1, and 6 represents an offset of the position 7 from the position 1. In this way, the terminal may determine, based on the offset, a possible position at which the SS/PBCH block 1 is actually sent.

In this application, the offset may be referred to as a second offset. Specifically, indication information of the second offset may be carried in at least one of the following messages: an RMSI CORESET, an RMSI PDSCH, RRC signaling (such as a message 4 in a random access process), or a broadcast channel.

(3) In a case c, a difference from the case b is that preset position mapping relationships of SS/PBCH blocks in different SS burst set windows may be different. Specifically, an SS/PBCH block corresponds to a position 1 in the first SS burst set window, and the SS/PBCH block 1 corresponds to a position 2 in the second SS burst set window, and the SS/PBCH block 1 corresponds to a position 3 (not shown) in the second SS burst set window. The rest can be deduced by analogy. Position mapping relationships of the SS/PBCH blocks 1 in the first to the third SS burst set windows are repeated in the following three SS burst set windows (that is, the fourth to the sixth SS burst set windows). In other words, position mapping relationships of to-be-sent SS/PBCH blocks in every three adjacent SS burst set windows are repeated, and quantities of times of appearance of the to-be-sent SS/PBCH blocks in the three SS burst set windows are the same.

The case c is merely an example provided in this application, and should not constitute a limitation. A case shown in the case c may be extended to position mapping relationships of the to-be-sent SS/PBCH blocks in Q (Q is a positive integer) SS burst set windows. In other words, the to-be-sent SS/PBCH blocks appear for a same quantity of times in the Q adjacent SS burst set windows. In this way, it can be ensured that the SS/PBCH blocks appear with a same probability.

Optionally, in the case c, the network device (such as a gNB) may notify a terminal of a period in which the plurality of preset time positions corresponding to the SS/PBCH block repeatedly appear in the SS burst set window. In addition, the network device (such as a gNB) may further notify the terminal of Q. In this way, the terminal can learn of preset time positions that are in the Q adjacent SS burst set windows and that correspond to a same SS/PBCH block.

In Embodiment 1, the network device further sends an RMSI CORESET after LBT succeeds. An actual sending time of the RMSI CORESET is related to an actual sending time of an SS/PBCH block corresponding to the RMSI CORESET. Specifically, the actual sending time of the RMSI CORESET may be determined by using the foregoing formulas (1) and (2). To be specific, in a radio frame, an index S of a starting slot of an RMSI CORESET corresponding to an SS/PBCH block is:

$$S = \mod(X^* n + f(i), N_{slot});$$

$f(i)=\mathrm{floor}(i*M)$, where i is a time index of the SS/PBCH block, $N_{slot}$ is a quantity of slots in the radio frame, n is equal to a subcarrier spacing of the RMSI CORESET/15 kHz, a value of X is any one in a set {0, 2, 5, 7}, a value of M is any one in a set {0.5, 1, 2}, and M represents a quantity of RMSI CORESETs included in one slot. Optionally, when M=0.5, the RMSI CORESET and the SS/PBCH block corresponding to the RMSI CORESET are located in a same slot, so that it can be ensured that the SS/PBCH block and the RMSI CORESET corresponding to the SS/PBCH block are sent in an MCOT.

In this application, the set {0, 2, 5, 7} may be referred to as a first set, and X may be one of a plurality of values included in the first set. The set {0.5, 1, 2} may be referred to as a second set, and M may be one of a plurality of values included in the second set. Not limited to the set {0, 2, 5, 7} defined in an NR standard, a value in the first set may further change in a future communications system. This change does not affect implementation of this application. Not limited to the set {0.5, 1, 2} defined in the NR standard, a value of the second set may further change in a future communications system. This change does not affect implementation of this application.

In Embodiment 1, to notify the terminal of the position mapping relationship of the to-be-sent SS/PBCH blocks in the SS burst set window, the network device may carry the position mapping relationship of the to-be-sent SS/PBCH blocks in the SS burst set window in at least one of the following: an RMSI CORESET, an RMSI PDSCH, RRC signaling (such as a message 4 in a random access process), or a PBCH in the SS/PBCH block.

It may be understood that in Embodiment 1, the network device (such as a gNB) can send the to-be-sent SS/PBCH block at a plurality of possible positions after LBT succeeds. In this way, a probability that the to-be-sent SS/PBCH block is successfully sent at the preset time position can be increased. In addition, because the to-be-sent SS/PBCH block can be sent at the preset position, an actual sending position of the to-be-sent SS/PBCH block does not need to be indicated by using additional signaling.

Related Extension Solution of Embodiment 1

In the NR standard, the network device (such as a gNB) supports sending of a maximum of 64 SS/PBCH blocks, and indicates, in the RMSI PDSCH, that a total of 8+8, namely, 16, bits are used to indicate actual sending statuses of the SS/PBCH blocks. In other words, 64 SS/PBCH blocks are divided into eight groups, each group includes eight SS/PBCH blocks, and an 8-bit bitmap is used to determine, in a one-to-one correspondence, whether each SS/PBCH block in the group is sent. The network device (such as a gNB) may further use the remaining eight bits to indicate actual sending statuses of the eight SS/PBCH block groups. In conclusion, for NR, after 16-bit indication information is determined, whether SS/PBCH blocks at 64 positions (corresponding to a time index on the PBCH) are sent is completely determined.

In this extension solution, use of the 16 bits that are in the RMSI PDSCH and that are used to indicate the actual sending status of the SS/PBCH block in the NRU system is mainly extended in the following two manners (1) and (2).

(1) For NRU, the 16 bits in the RMSI PDSCH may be reused for the actual sending status of the to-be-sent SS/PBCH block.

As shown in the case a, the network device (such as a gNB) needs to send two SS/PBCH blocks. In this case, the 16 bits may be set to "1100000010000000". The first eight bits "11000000" indicate that the gNB needs to send only two SS/PBCH blocks, and the last eight bits indicate that all actually sent SS/PBCH blocks are included in a first group (that is, a quantity of to-be-sent SS/PBCH blocks≤8). Similarly, when the network device (such as a gNB) needs to send 16 SS/PBCH blocks, the 16 bits may be set to "1111111111000000".

Different from the 16 bits used in the NR standard, in NRU, the 16 bits are used to indicate only a quantity of SS/PBCH blocks that need to be sent, and do not indicate a specific position (that is, the time index of the SS/PBCH block) at which the SS/PBCH block is sent. The actual sending position of the SS/PBCH block is related to LBT, and an actual sending position of the SS/PBCH block in each SS burst set window may be different.

For example, the 16 bits in the RMSI PDSCH in the case a may be set to "1100000010000000". The first 8 bits indicate that the gNB needs to send only two SS/PBCH blocks, the last eight bits indicate that all actually sent SS/PBCH blocks are included in the first group (that is, the quantity of to-be-sent SS/PBCH blocks≤8). However, the actual sending status may be that after succeeding in LBT before the position 3, the network device (such as a gNB) respectively sends the SS/PBCH blocks 1 and 2 at the positions 3 and 4, or sends the SS/PBCH blocks 1 and 2 at the positions 7 and 8, or may send the SS/PBCH block 1 at all the positions 3, 5, and 7, and send the SS/PBCH block 2 at all the positions 4, 6, and 8. Further, the two SS/PBCH blocks that need to be sent by the gNB may be different (corresponding to different beam directions), or may be the same (corresponding to a same beam direction).

For example, the 16 bits in the RMSI PDSCH in the case b may be set to "1110000010000000". The first 8 bits indicate that the gNB needs to send only three SS/PBCH blocks, the last eight bits indicate that all actually sent SS/PBCH blocks are included in the first group (that is, the quantity of to-be-sent SS/PBCH blocks≤8). However, the actual sending status may be that after succeeding in LBT before the position 3, the network device (such as a gNB) respectively sends the SS/PBCH blocks 3, 1, and 2 at the positions 3, 4, and 5, or sends the SS/PBCH blocks 1, 2, and 3 at the positions 4, 5, and 6, or may respectively send the SS/PBCH blocks 2, 3, and 1 at the positions 5, 6, and 7. Further, the three SS/PBCH blocks that need to be sent by the gNB may be different (corresponding to different beam directions), or may be the same (corresponding to a same beam direction).

For another example, the 16 bits in the RMSI PDSCH may alternatively be set to "1100110010000000". The first 8 bits indicate that the gNB needs to send only four SS/PBCH blocks, the last eight bits indicate that all actually sent SS/PBCH blocks are included in the first group (that is, the quantity of to-be-sent SS/PBCH blocks≤8). However, the actual sending status may be that after succeeding in LBT before the position 1, the network device (such as a gNB) respectively sends the SS/PBCH blocks 1, 2, 1, and 2 at the positions 1, 2, 3, and 4, and sends the SS/PBCH blocks 3, 4, 3, and 4 at the positions 5, 6, 7, and 8. If succeeding in LBT before the position 5, the network device (such as a gNB) may respectively send the SS/PBCH blocks 3, 4, 3, and 4 at the positions 5, 6, 7, and 8. Further, the four SS/PBCH blocks that need to be sent by the gNB may be different (corresponding to different beam directions), or may be the same (corresponding to a same beam direction).

The foregoing examples are merely used to explain this application, and shall not constitute a limitation.

In this application, the 16 bits in the RMSI PDSCH may be referred to as a first bit sequence. The first bit sequence includes two parts (which may be referred to as a first part and a second part). The first part (the first eight bits) indicates a quantity of to-be-sent SS/PBCH blocks, and the second part (the last eight bits) indicates a group in which the to-be-sent SS/PBCH blocks are located.

(2) In this application, in another possible indication manner of the 16 bits in the RMSI PDSCH, SS/PBCH block groups may not be considered, and a 16-bit bitmap is directly used to indicate the SS/PBCH block repeatedly sent by the gNB. It may be understood that when a quantity of SS/PBCH blocks that need to be sent by the gNB is greater than 16, the 16-bit bitmap cannot be used for complete indication. For example, when the gNB needs to send 32 SS/PBCH blocks (the 32 SS/PBCH blocks are repeated twice in total at 64 sending positions), the 16-bit bitmap cannot be used for complete indication. In this case, the 16 bits may be divided into two parts. One part uses X bits to indicate an indication granularity of each of remaining 16-X bits, and the other part uses the remaining 16-X bits to indicate the actual sending status of the SS/PBCH block. Herein, the indication granularity of each bit refers to a quantity of consecutive SS/PBCH blocks whose actual sending statuses can be indicated by one bit.

For example, two bits are used to indicate the indication granularity. '00' indicates that each bit in a remaining-16-X-bit bitmap indicates an actual sending status of one SS/PBCH block. '01' indicates that each bit in the remaining-16-X-bit bitmap indicates actual sending statuses of two consecutive SS/PBCH blocks. '10' indicates that each bit in the remaining-16-X-bit bitmap indicates actual sending statuses of three consecutive SS/PBCH blocks. '11' indicates that each bit in the remaining-16-X-bit bitmap indicates actual sending statuses of four consecutive SS/PBCH blocks. In this case, a remaining-14-bit bitmap may indicate actual sending statuses of a maximum of 56 SS/PBCH blocks. The example is merely used to explain this application and shall not constitute a limitation.

Herein, the first bit sequence may include two parts: two bits and 14 remaining bits. The two bits may be referred to as a third part, and the remaining 14 bits may be referred to as a fourth part. Each bit in the fourth part indicates actual sending statuses of J consecutive SS/PBCH blocks, and the third part indicates a value of J (that is, the indication granularity). J is obtained from one of $2^K$ values, K<L, L represents a sequence length of the first bit sequence, K represents a sequence length of the third part, and J, K, and L are all positive integers. Herein, the actual sending statuses mean whether the J consecutive SS/PBCH blocks are sent.

Not limited to the foregoing example, the sequence lengths of the third part and the fourth part may alternatively be other values, and should not constitute a limitation.

Not limited to the foregoing manners (1) and (2), in some optional embodiments, another bit in the RMSI PDSCH may be further used to indicate the actual sending status of the SS/PBCH block.

Not limited to the foregoing manners (1) and (2), in some optional embodiments, the 16 bits that indicate the actual sending status of the SS/PBCH block and other indication information in the RMSI PDSCH may be further used for joint indication. For example, as shown in Table 2, PRACH configuration information (4 bits) in the RMSI PDSCH and the 16 bits that indicate the actual sending status of the SS/PBCH block may be used for joint indication, and there are 20 bits in total. The 20 bits may form a table containing 1,048,576 options.

TABLE 2

| Configuration index | PRACH starting symbol (PRACH starting slot) | PRACH period | Indication information of the actual sending status of the SS/PBCH block (actual transmitted SS/PBCH block indication) |
|---|---|---|---|
| 1 | 0 | 5 ms | "1110000010000000" |
| 2 | 10 | 5 ms | "1110000010000000" |
| 3 | 20 | 10 ms | "1100110010000000" |
| 4 | 30 | 10 ms | "1100110010000000" |

In the example joint indication manner shown in Table 2, a configuration parameter (including the PRACH starting symbol, the actual sending status of the SS/PBCH block, and the like) specifically used by a system may be determined through indication information (a value of 20 bits) actually carried on the RMSI PDSCH. For example, when a configuration index is 1 (that is, the value of 20 bits is "00000000000000000001"), the PRACH starting symbol is the first slot in every 5 ms; in this case, a quantity of actually sent SS/PBCH blocks is 3. The example is merely used to explain this application and shall not constitute a limitation.

(2) Embodiment 2

The solution 2 is used in this embodiment. A corresponding preset time position is configured in an SS burst set window for each to-be-sent SS/PBCH block. For details, refer to related implementations in an NR standard. However, due to impact of LBT, the SS/PBCH block may not be sent at the preset time position corresponding to the SS/PBCH block. In other words, an actual time position of the SS/PBCH block in a radio frame may not be the preset time position corresponding to the SS/PBCH block in the SS burst set window. A network device needs to notify a terminal of a time offset (which may be referred to as a first offset) between the actual time position of the SS/PBCH block in the radio frame and the preset time position corresponding to the SS/PBCH block. In addition, the network device may send an RMSI CORESET corresponding to the SS/PBCH block after delaying the RMSI CORESET by a same time offset, to ensure that the SS/PBCH block and the RMSI CORESET corresponding to the SS/PBCH block are sent within a maximum channel occupancy time (MCOT). Herein, the SS/PBCH block may be any to-be-sent SS/PBCH block.

In this embodiment, the SS burst set window including the preset time position is in a first half-frame of the radio frame, to ensure that the actual time position at which the SS/PBCH block is sent after being offset does not exceed a boundary of the radio frame. The SS burst set window may be referred to as a first SS burst set window.

In this embodiment, compared with the preset time position, an actual time position of each SS/PBCH block included in an SS burst set may be delayed by a maximum of 5 ms, that is, the first offset is less than or equal to 5 ms. After being delayed as a whole, the SS burst set cannot cross the boundary of the radio frame. In this way, it can be ensured that system frame numbers (SFN) carried on PBCHs in all SS/PBCH blocks in the entire SS burst set are consistent.

The following describes several SS/PBCH block sending manners.

(1) Manner 1

Figure 11A:
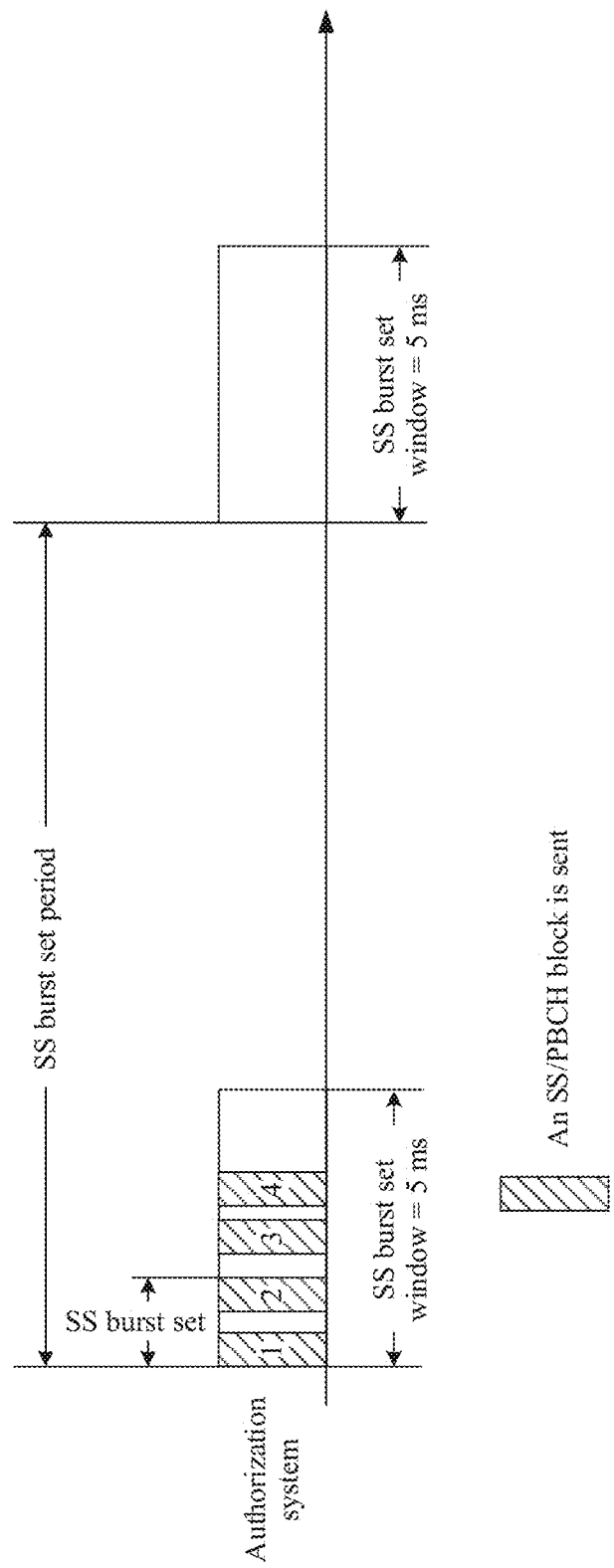
FIG. 11A and FIG. 11B are schematic diagrams of another SS/PBCH block sending manner according to this application.

As shown in FIG. 11A, a first SS burst set window is a first half of a radio frame. A preset position mapping relationship of to-be-sent SS/PBCH blocks in the first SS burst set window is: Positions 1, 2, 3, and 4 respectively correspond to an SS/PBCH block 1, an SS/PBCH block 2, an SS/PBCH block 3, and an SS/PBCH block 4.

Figure 11B:
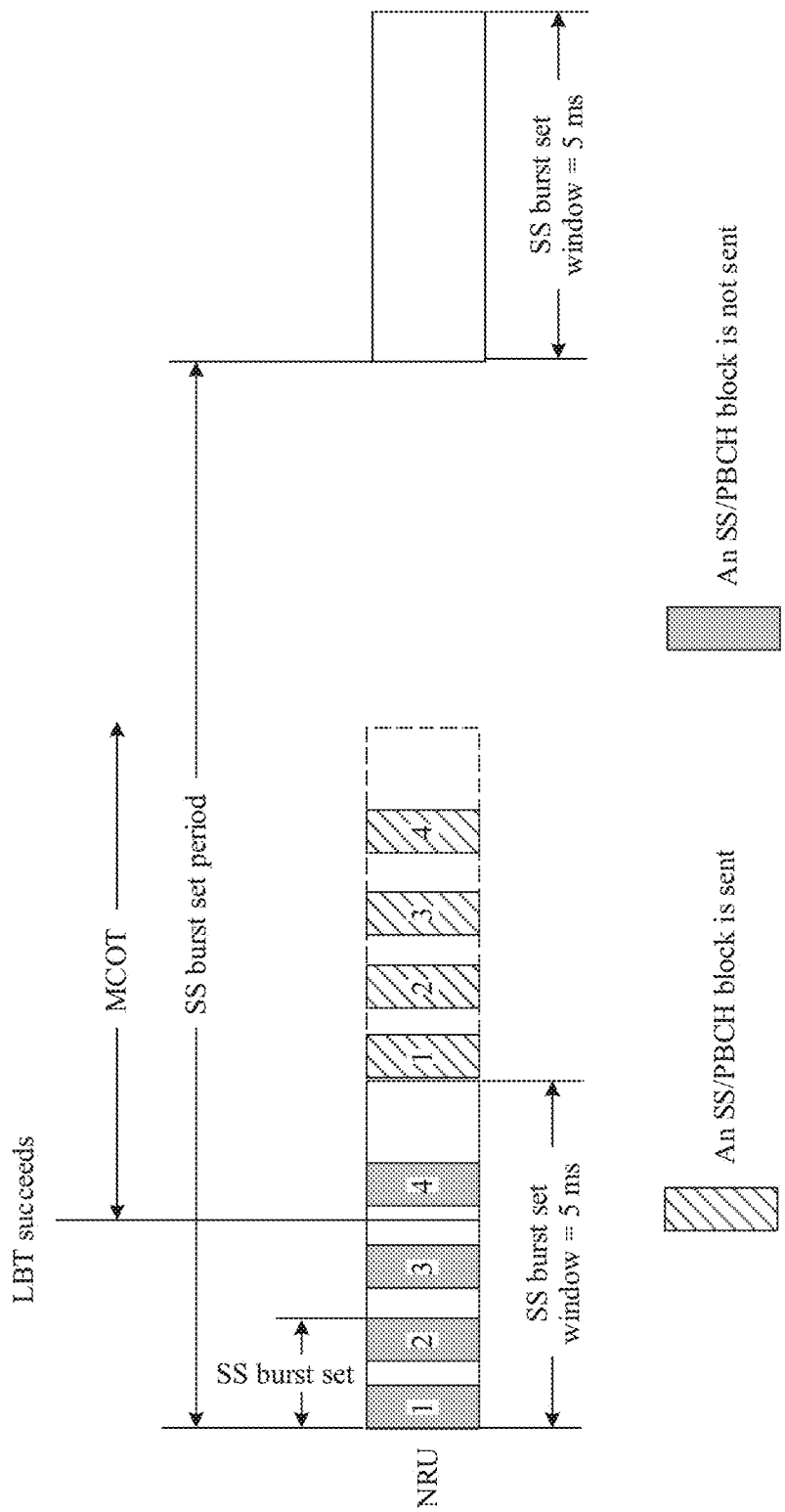

As shown in FIG. 11B, after LBT succeeds, the network device respectively sends the SS/PBCH block 1, the SS/PBCH block 2, the SS/PBCH block 3, and the SS/PBCH block 4 after a delay of 5 ms (that is, duration of the first SS burst set window) based on preset time positions, namely, the positions 1, 2, 3, and 4, respectively corresponding to the SS/PBCH block 1, the SS/PBCH block 2, the SS/PBCH block 3, and the SS/PBCH block 4 in the first SS burst set window. In other words, the network device may send the to-be-sent SS/PBCH block after a delay of the duration of the first SS burst set window based on the preset time position corresponding to the to-be-sent SS/PBCH block in the first SS burst set window. It can be learned that an SS burst set may be sent after being delayed by 5 ms as a whole. To be specific, all SS/PBCH blocks included in the SS burst set are also sent after being delayed by 5 ms.

In the manner 1, a first offset is the duration (that is, 5 ms) of the first SS burst set window, and represents a time offset between an actual time position and the preset time position of the SS/PBCH block.

Optionally, in the manner 1, half-frame indication information on a PBCH may be reused to indicate the first offset. For example, when a value of the half-frame indication is "1", it indicates that the first offset is 5 ms. The example is merely used to explain this application and shall not constitute a limitation.

Optionally, in the manner 1, the first offset may alternatively be indicated through one bit in a time index on the PBCH. In this case, a maximum quantity of SS/PBCH blocks that allow to be sent by a system is reduced from 64 to 32, because a 6-bit time index is originally used in NR to indicate the maximum quantity 64 of SS/PBCH blocks that may be sent. Not limited thereto, the first offset may be specifically indicated through another reserved bit on the PBCH.

In addition, after LBT succeeds, the network device may further send an RMSI CORESET. Specifically, the network device may send the RMSI CORESET corresponding to the SS/PBCH block after delaying the RMSI CORESET by a same time offset, to ensure that the SS/PBCH block and the RMSI CORESET corresponding to the SS/PBCH block are sent within a maximum channel occupancy time (MCOT). An actual sending time of the RMSI CORESET is related to an actual sending time of the SS/PBCH block corresponding to the RMSI CORESET. For example, the sending time of the RMSI CORESET satisfies the following formulas (3) and (4). To be specific, in a radio frame, an index S' of a starting slot of an RMSI CORESET corresponding to an SS/PBCH block is:

$$S'=\mathrm{mod}(\mathrm{offset1}+X^*n+f(i),N_{slot}) \quad (3)$$

$$f(i)=\mathrm{floor}(i^*M) \quad (4),\text{ where}$$

offset1 represents the first offset, i is a time index of the SS/PBCH block, $N_{slot}$ is a quantity of slots in the radio frame, n is equal to a subcarrier spacing of the RMSI CORESET/15 kHz, a value of X is any one in a set {0, 2, 5, 7}, a value of M is any one in a set {0.5, 1, 2}, and M represents a quantity of RMSI CORESETs included in one slot. Optionally, when M=0.5, the RMSI CORESET and the SS/PBCH block corresponding to the RMSI CORESET are located in a same slot, so that it can be ensured that the SS/PBCH block and the RMSI CORESET corresponding to the SS/PBCH block are sent in an MCOT.

In this application, the set {0, 2, 5, 7} may be referred to as a first set, and X may be one of a plurality of values included in the first set. The set {0.5, 1, 2} may be referred to as a second set, and M may be one of a plurality of values included in the second set. Not limited to the set {0, 2, 5, 7} defined in an NR standard, a value in the first set may further change in a future communications system. This change does not affect implementation of this application. Not limited to the set {0.5, 1, 2} defined in the NR standard, a value of the second set may further change in a future communications system. This change does not affect implementation of this application.

(2) Manner 2

Figure 12:
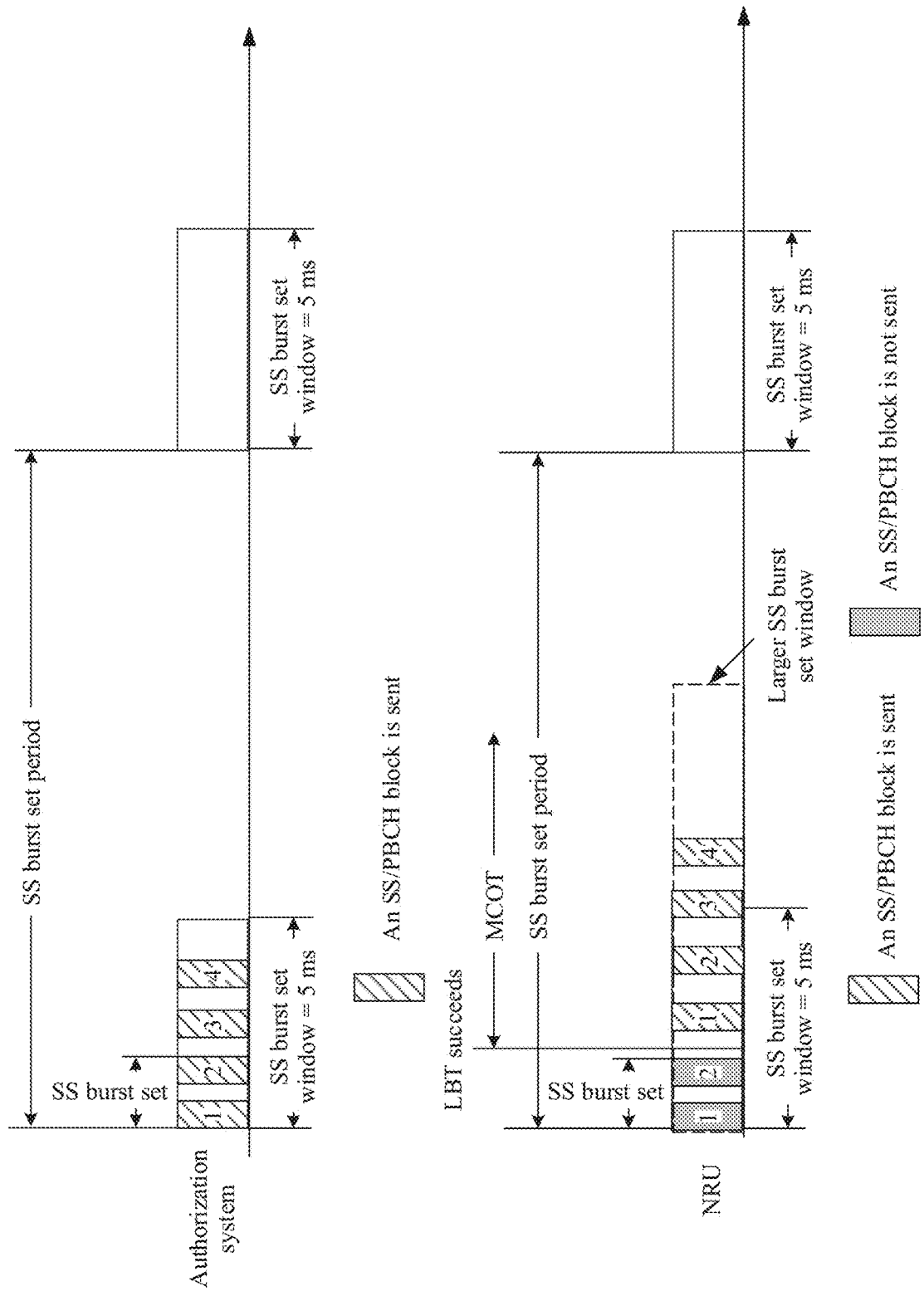
FIG. 12 is a schematic diagram of still another SS/PBCH block sending manner according to this application.

As shown in FIG. 12, a first SS burst set window is a first half of a radio frame. The network device may start to send an SS/PBCH block at any moment after LBT succeeds. Compared with the manner 1, a first offset used in the manner 2 may be less than 5 ms, and a sending manner is more flexible.

For example, it is assumed that a preset position mapping relationship of to-be-sent SS/PBCH blocks in the first SS burst set window is: Positions 1, 2, 3, and 4 respectively correspond to an SS/PBCH block 1, an SS/PBCH block 2, an SS/PBCH block 3, and an SS/PBCH block 4. In addition, the network device succeeds in LBT before the position 3. Therefore, the network device may start to send the SS/PBCH block 1, the SS/PBCH block 2, the SS/PBCH block 3, and the SS/PBCH block 4 at the position 3. An actual position mapping relationship may be: The SS/PBCH block 1 and the SS/PBCH block 2 are respectively sent at the positions 3 and 4 in the first SS burst set window, after the first SS burst set window ends, the remaining SS/PBCH block 3 and SS/PBCH block 4 are sent. The example is merely used to explain this application and shall not constitute a limitation. It can be learned that an SS burst set may be sent after being delayed by any period of time (≤5 ms) as a whole, without waiting for a next new SS burst set window. This is more flexible than the manner 1.

In the manner 2, a larger SS burst set window (as shown by a dashed box in FIG. 12) may be defined, and the larger SS burst set window does not exceed duration of the radio frame. In this way, in the larger SS burst set window, the network device may send the SS/PBCH block at any moment after LBT.

In addition, after LBT succeeds, the network device further sends an RMSI CORESET. Specifically, the network device may send the RMSI CORESET corresponding to the SS/PBCH block after delaying the RMSI CORESET by a same time offset, to ensure that the SS/PBCH block and the RMSI CORESET corresponding to the SS/PBCH block are sent within a maximum channel occupancy time (MCOT). An actual sending time of the RMSI CORESET is related to an actual sending time of the SS/PBCH block corresponding to the RMSI CORESET. For a manner of obtaining the RMSI CORESET, refer to the foregoing formulas (3) and (4). Details are not described herein again.

(3) Manner 3

Figure 13A:
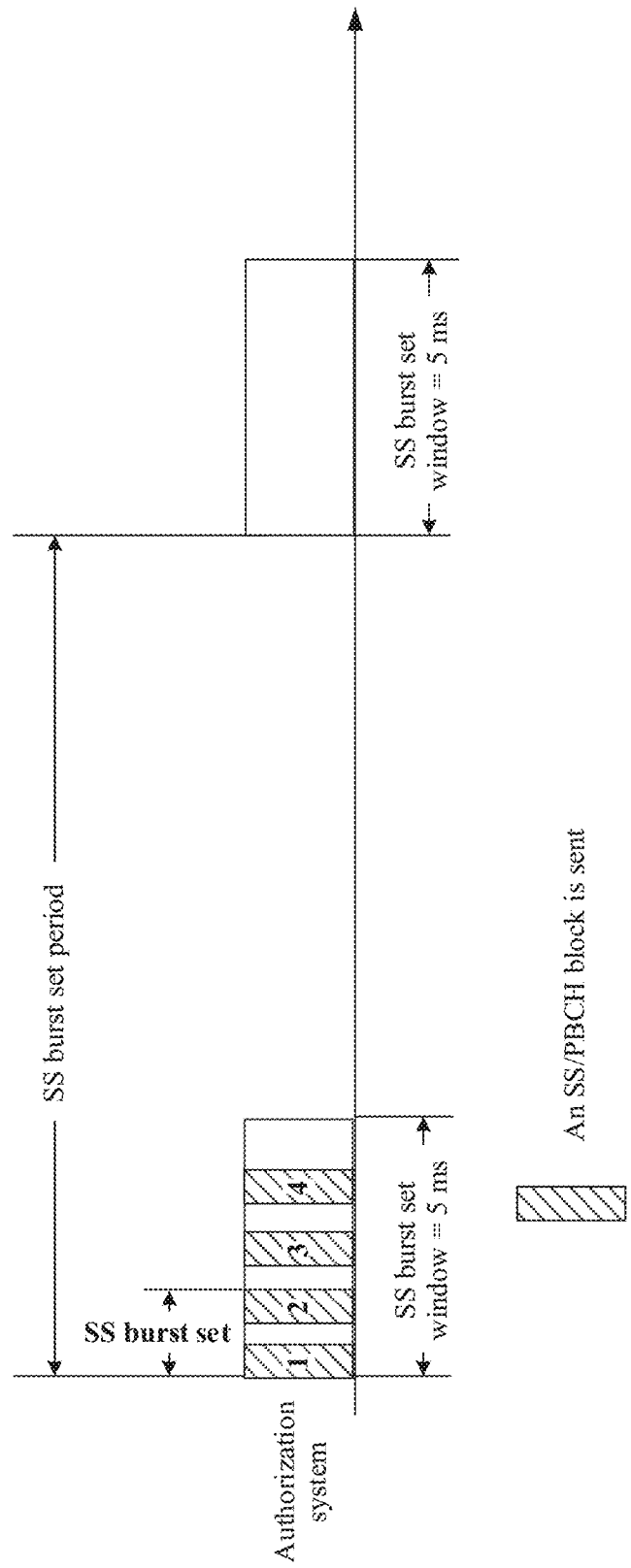
FIG. 13A and FIG. 13B are schematic diagrams of still another SS/PBCH block sending manner according to this application.

As shown in FIG. 13A, a first SS burst set window is a first half of a radio frame. A preset position mapping relationship of to-be-sent SS/PBCH blocks in the first SS burst set window is: Positions 1, 2, 3, and 4 respectively correspond to an SS/PBCH block 1, an SS/PBCH block 2, an SS/PBCH block 3, and an SS/PBCH block 4.

Figure 13B:
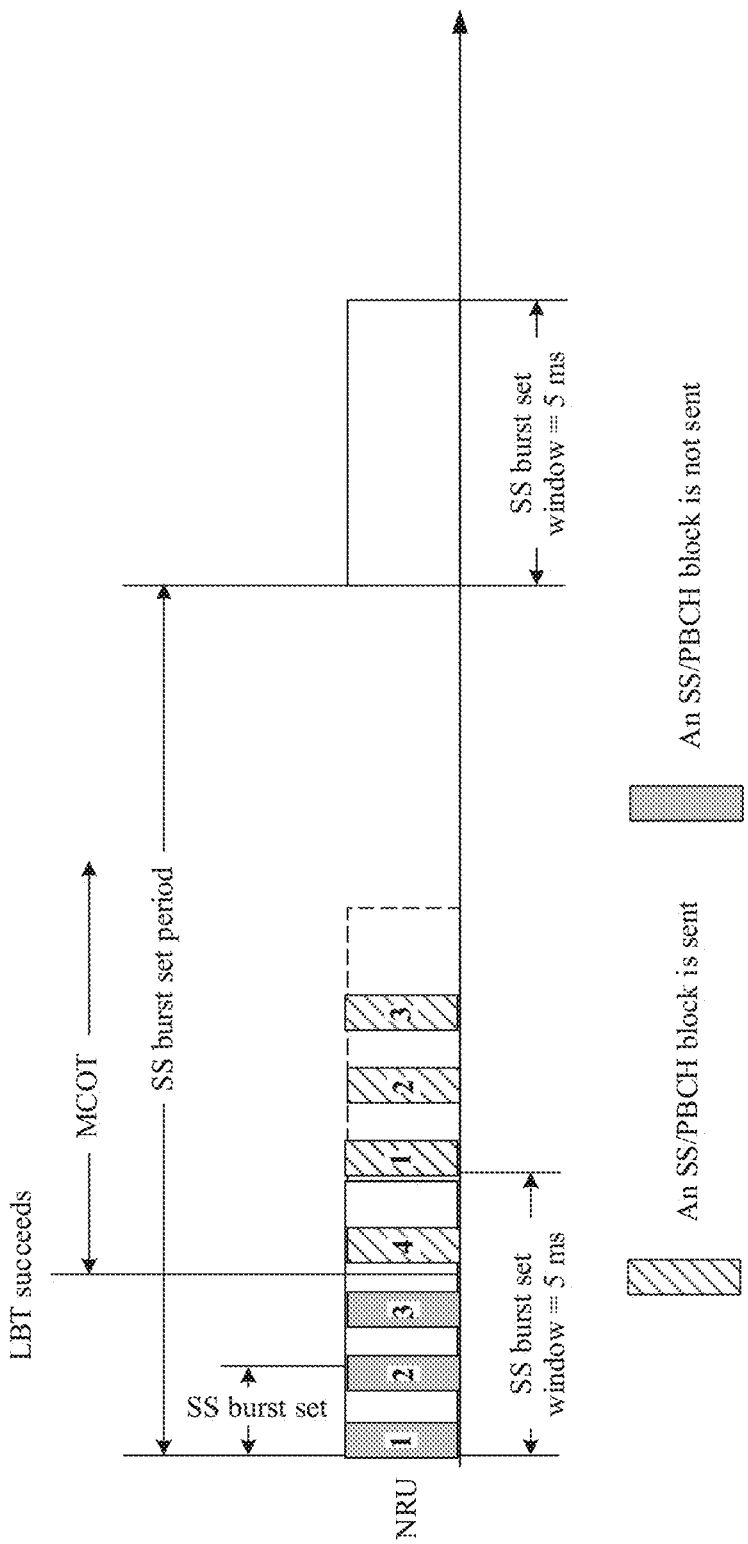

As shown in FIG. 13B, the network device succeeds in LBT before the position 4, that is, succeeds in LBT at a middle position of the first SS burst set window. The network device sends the SS/PBCH block 4 at the position 4 in the first SS burst set window, and a preset time position corresponding to the SS/PBCH block 4 in the first SS burst set window is the position 4. Then, the network device respectively sends the SS/PBCH block 1, the SS/PBCH block 2, and the SS/PBCH block 3 after a delay of 5 ms based on preset time positions, namely, the positions 1, 2, and 3, respectively corresponding to the SS/PBCH block 1, the SS/PBCH block 2, and the SS/PBCH block 3 in the first SS burst set window.

In other words, if a preset time position corresponding to the to-be-sent SS/PBCH block in the first SS burst set window is later than a time position at which LBT succeeds, the network device sends the SS/PBCH block at the preset time position corresponding to the SS/PBCH block. Otherwise, the network device sends the SS/PBCH block after a delay of duration of the first SS burst set window based on the preset time position corresponding to the SS/PBCH block in the first SS burst set window. It can be learned that some SS/PBCH blocks in an SS burst set may be sent at a corresponding preset time position, and the other SS/PBCH blocks in the SS burst set need to be sent after being delayed by 5 ms. Herein, an SS/PBCH block sent at the preset time position may be referred to as a first SS/PBCH block, and an SS/PBCH block that needs to be sent after being delayed by 5 ms may be referred to as a second SS/PBCH block.

In the manner 3, a first offset corresponds to some SS/PBCH blocks that need to be sent after being delayed, and represents a time offset between an actual time position and a preset time position of the SS/PBCH blocks. The first offset corresponding to the SS/PBCH blocks is the duration (that is, 5 ms) of the first SS burst set window.

Optionally, in the manner 3, half-frame indication information on a PBCH may be reused to indicate a first offset of the second SS/PBCH block. For example, when a value of the half-frame indication is "1", it indicates that the first offset is 5 ms. The example is merely used to explain this application and shall not constitute a limitation.

Optionally, in the manner 1, the first offset of the second SS/PBCH block may alternatively be indicated through one bit in a time index on the PBCH. In this case, a maximum quantity of SS/PBCH blocks that allow to be sent by a system is reduced from 64 to 32, because a 6-bit time index is originally used in NR to indicate the maximum quantity 64 of SS/PBCH blocks that may be sent. Not limited thereto, the first offset may be specifically indicated through another reserved bit on the PBCH.

In addition, after LBT succeeds, the network device further sends an RMSI CORESET.

Specifically, an offset between an actual time position and a preset time position of the second SS/PBCH block is duration (such as 5 ms) of an SS burst set window. The network device may send an RMSI CORESET corresponding to the second SS/PBCH block after delaying the RMSI CORESET by a same time offset, to ensure that the SS/PBCH block and the RMSI CORESET corresponding to the SS/PBCH block are sent within a maximum channel occupancy time (MCOT). A time position of the RMSI CORESET corresponding to the second SS/PBCH block is related to a time position of the SS/PBCH block corresponding to the RMSI CORESET. For a specific manner of obtaining the RMSI CORESET corresponding to the second SS/PBCH block, refer to the foregoing formulas (3) and (4). Details are not described herein again.

It may be understood that because no offset occurs on the first SS/PBCH block, an RMSI CORESET corresponding to the first SS/PBCH block does not need to be sent through an offset. For a specific manner of obtaining the RMSI CORESET corresponding to the first SS/PBCH block, refer to the foregoing formulas (1) and (2). Details are not described herein again.

(4) Manner 4

Figure 14A:
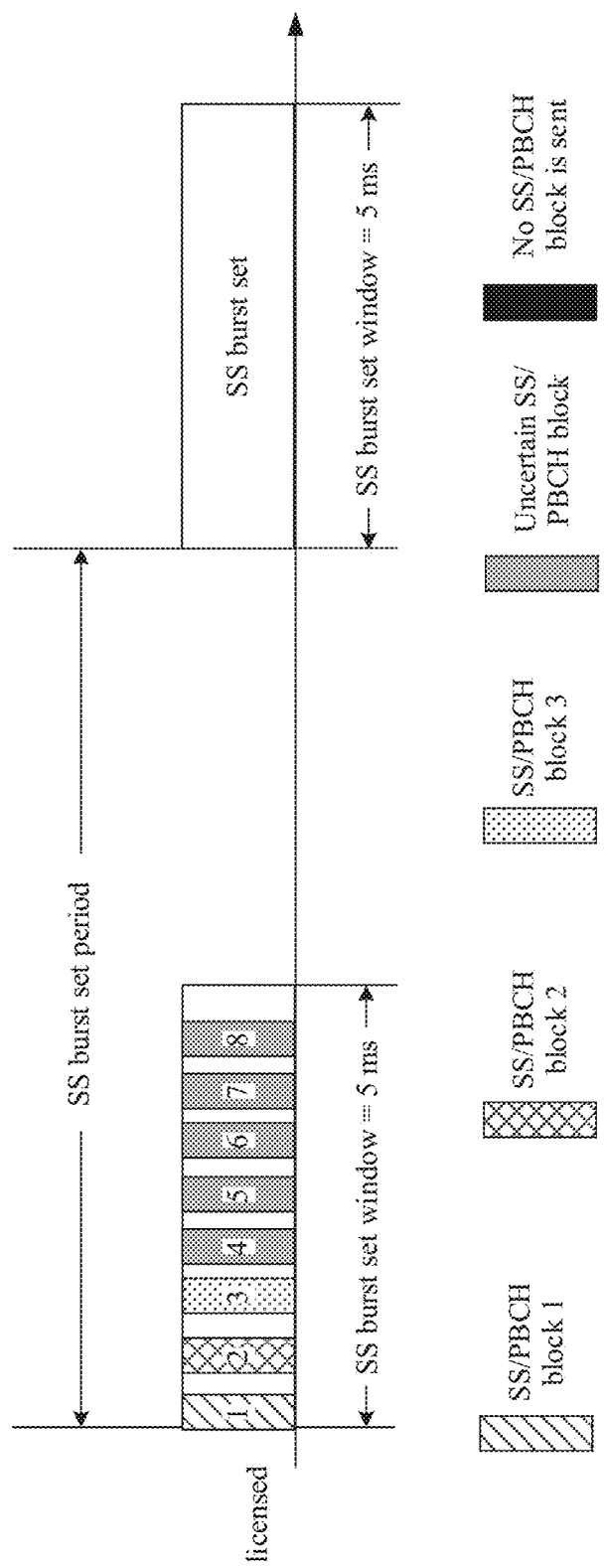
FIG. 14A to FIG. 14D are schematic diagrams of still another SS/PBCH block sending manner according to this application.

As shown in FIG. 14A, a first SS burst set window is a first half of a radio frame. The first SS burst set window includes eight sending positions, and an SS burst set includes three SS/PBCH blocks: an SS/PBCH block 1, an SS/PBCH block 2, and an SS/PBCH block 3. A preset position mapping relationship of to-be-sent SS/PBCH blocks in the first SS burst set window is: Positions 1, 2, and 3 respectively correspond to the SS/PBCH block 1, the SS/PBCH block 2, and the SS/PBCH block 3.

Figure 14B:
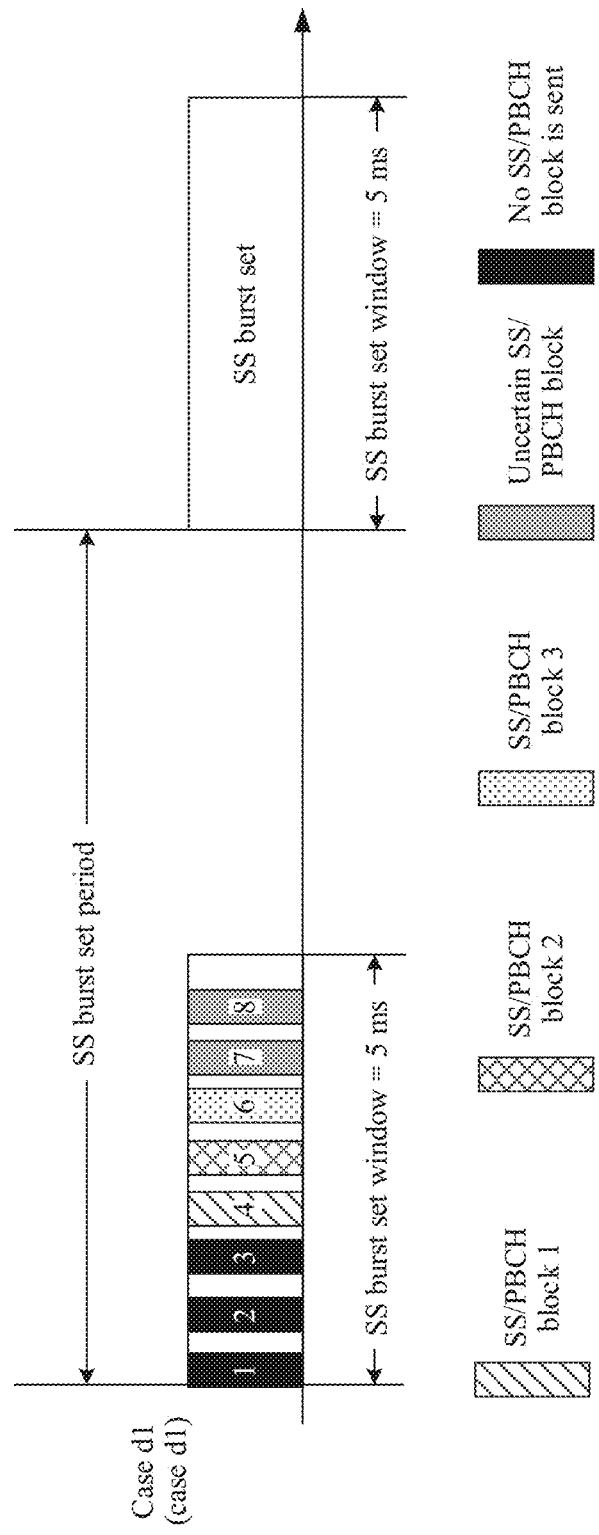

A possible case is a case d1 shown in FIG. 14B in which the network device succeeds in LBT before a position 4, and the first SS burst set window has five remaining sending positions after LBT succeeds. The network device may send the SS burst set (that is, the SS/PBCH block 1, the SS/PBCH block 2, and the SS/PBCH block 3) at the five remaining sending positions after LBT succeeds. An actual position mapping relationship may be: The SS/PBCH block 1, the SS/PBCH block 2, and the SS/PBCH block 3 are respectively sent at positions 4, 5, and 6 in the first SS burst set window.

Figure 14C:
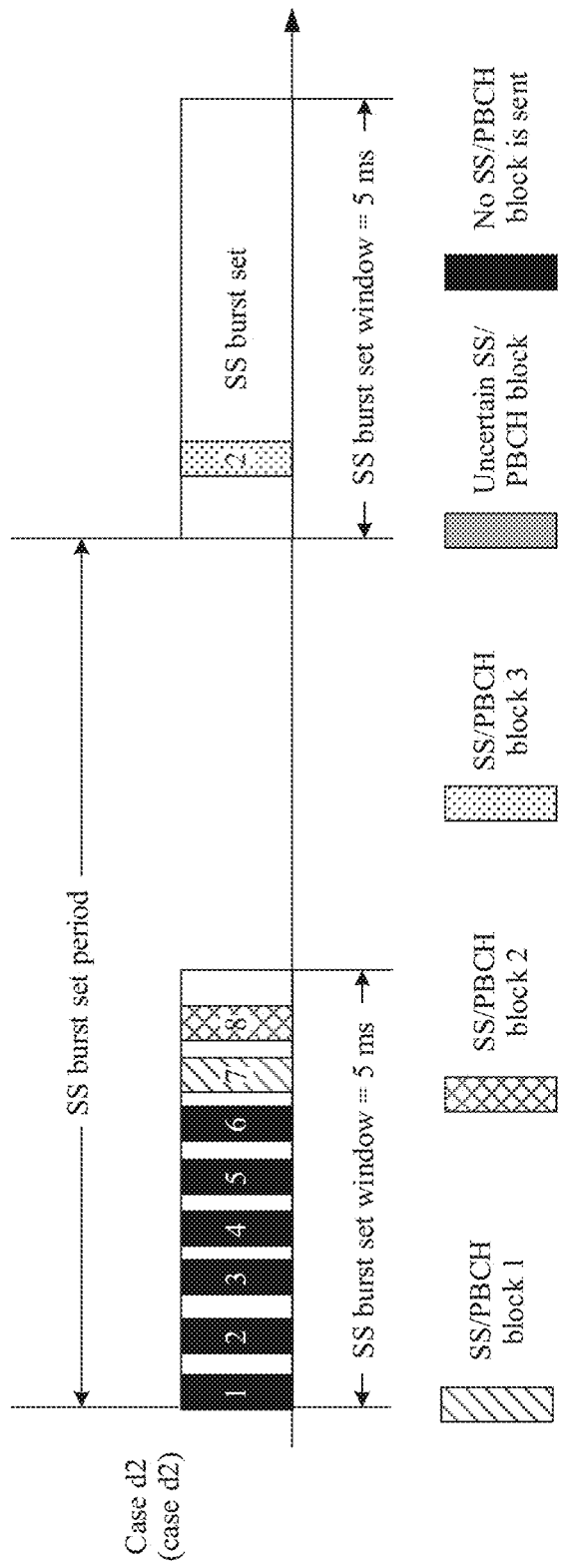

A possible case is a case d2 shown in FIG. 14C in which the network device succeeds in LBT before a position 7, and the first SS burst set window has two remaining sending positions after LBT succeeds. The two remaining sending positions are not enough for sending the SS burst set (that is, the SS/PBCH block 1, the SS/PBCH block 2, and the SS/PBCH block 3). The network device may send some SS/PBCH blocks (such as the SS/PBCH block 1 and the SS/PBCH block 2) in the SS burst set at the two remaining sending positions after LBT succeeds, and send a remaining SS/PBCH block (such as the SS/PBCH block 3) at a corresponding position (that is, a preset sending position corresponding to the SS/PBCH block 3) in an SS burst set window after one SS burst set period.

Figure 14D:
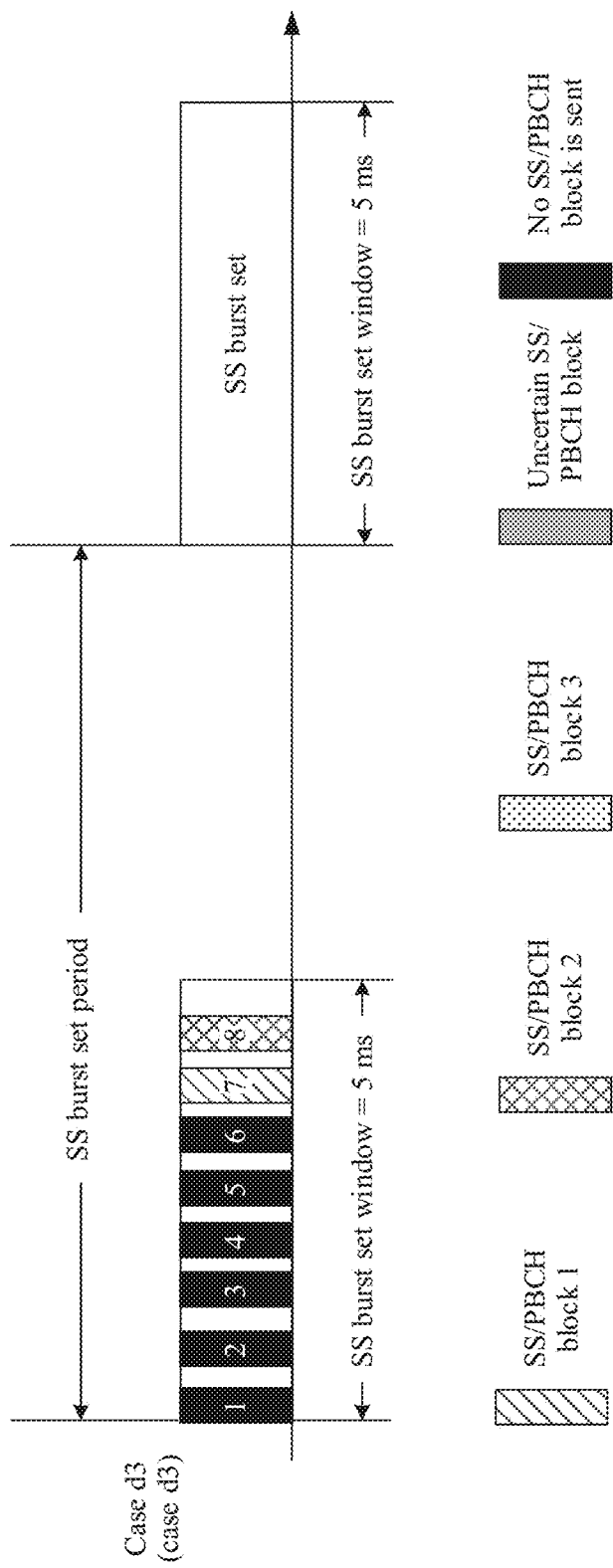

A possible case is a case d3 shown in FIG. 14D in which the network device succeeds in LBT before a position 7, and the first SS burst set window has two remaining sending positions after LBT succeeds. The two remaining sending positions are not enough for sending the SS burst set (that is, the SS/PBCH block 1, the SS/PBCH block 2, and the SS/PBCH block 3). The network device may send some SS/PBCH blocks (such as the SS/PBCH block 1 and the SS/PBCH block 2) in the SS burst set at the two remaining sending positions after LBT succeeds, and sending of a remaining SS/PBCH block is not delayed in a subsequent SS burst set window.

In addition, after LBT succeeds, the network device further sends an RMSI CORESET. The network device may send an RMSI CORESET corresponding to the SS/PBCH block after delaying the RMSI CORESET by a time offset that is the same as a first offset of an SS/PBCH block, to ensure that the SS/PBCH block and the RMSI CORESET corresponding to the SS/PBCH block are sent within a maximum channel occupancy time (MCOT). A time position of the RMSI CORESET corresponding to the SS/PBCH block is related to a time position of the SS/PBCH block corresponding to the RMSI CORESET. For a specific calculation method of an index S' of a starting slot of the RMSI CORESET corresponding to the SS/PBCH block, refer to the foregoing formulas (3) and (4). Details are not described herein again.

In Embodiment 2, indication information of the first offset may be carried in the SS/PBCH block, and may be specifically carried in at least one of the following: a PBCH, a PSS, an SSS, and a PBCH DMRS sequence in the SS/PBCH block. In this application, the indication information of the first offset may be referred to as first indication information.

(3) Embodiment 3

Figure 15:
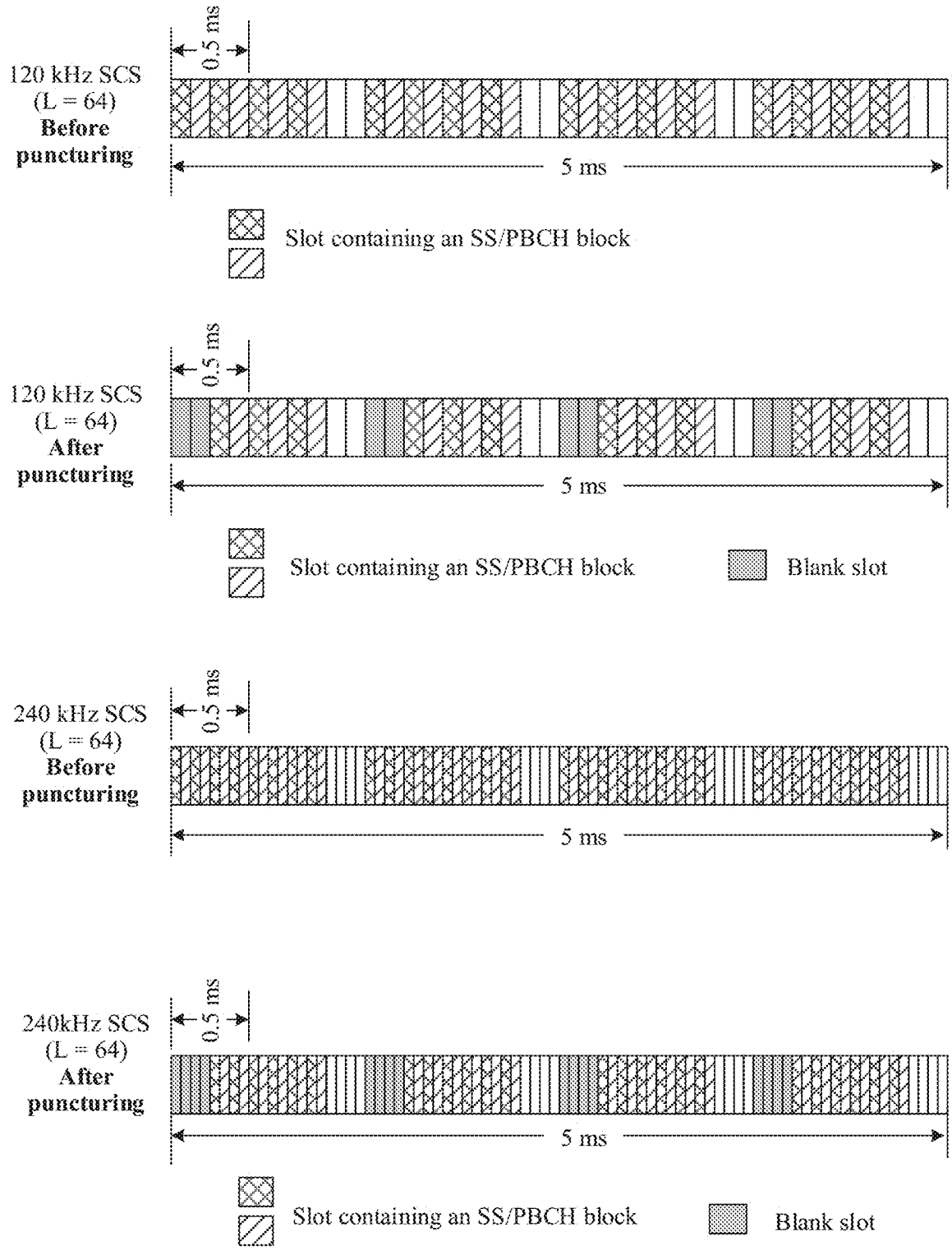
FIG. 15 is a schematic diagram of still another SS/PBCH block sending manner according to this application.

In this embodiment, a subcarrier spacing is 120/240 kHz. As shown in FIG. 15, in an SS burst set window of 5 ms, no SS/PBCH block is sent in one slot (or some slots). In this way, an uplink/downlink data delay increased due to sending of an SS/PBCH block can be avoided. In other words, transmission efficiency of uplink and downlink data can be improved by puncturing the SS burst set window. Because the SS/PBCH block is not sent in these slots, an RMSI CORESET corresponding to the SS/PBCH block cannot appear in these slots, to avoid occupying time-frequency resources allocated to uplink and downlink data.

In this embodiment, in consideration of a punctured slot and a correlation between an actual sending time of the RMSI CORESET and an actual sending time of the SS/PBCH block corresponding to the RMSI CORESET, the actual sending time of the RMSI CORESET satisfies the following formulas (5) and (6). To be specific, in a radio frame, an index S of a starting slot of an RMSI CORESET corresponding to an SS/PBCH block is:

$$S = \mathrm{mod}(\mathrm{floor}(i*7.5/k)*(k/60) + \mathrm{offset1} + X*n + f(i), N_{slot}) \quad (5)$$

$$f(i) = \mathrm{floor}(i*M) \quad (6), \text{ where}$$

k=120 kHz or 240 kHz, and represents a subcarrier spacing of the RMSI CORESET, offset1 represents a first offset, i represents a time index of the SS/PBCH block, $N_{slot}$ represents a quantity of slots in a radio frame, n is equal to the subcarrier spacing of the RMSI CORESET/15 kHz, a value of X is any one in a set {0, 2, 5, 7}, a value of M is any one in a set {0.5, 1, 2}, and M represents a quantity of RMSI CORESETs included in one slot.

A factor floor(i*7.5/k)*(k/60) is an offset introduced to ensure that the RMSI CORESET does not fall into a blank slot (that is, a slot in which the SS/PBCH block is not sent).

In this application, the set {0, 2, 5, 7} may be referred to as a first set, and X may be one of a plurality of values included in the first set. The set {0.5, 1, 2} may be referred to as a second set, and M may be one of a plurality of values included in the second set. Not limited to the set {0, 2, 5, 7} defined in an NR standard, a value in the first set may further change in a future communications system. This change does not affect implementation of this application. Not limited to the set {0.5, 1, 2} defined in the NR standard, a value of the second set may further change in a future communications system. This change does not affect implementation of this application.

It may be understood that Embodiment 3 may be implemented in combination with Embodiment 1 and Embodiment 2.

For example, in a case in which Embodiment 1 and Embodiment 3 are combined, offset1=0, and the subcarrier spacing is 120/240 kHz. It is assumed that eight preset time positions are configured in an SS burst set window of 5 ms, and a network device (such as a gNB) needs to send only two different SS/PBCH blocks (for example, corresponding to two beam directions). In this case, a preset position mapping relationship of to-be-sent SS/PBCH blocks in the SS burst set window may be: Positions 1, 3, 5, and 7 correspond to an SS/PBCH block 1, and positions 2, 4, 6, and 8 correspond to an SS/PBCH block 2. It is further assumed that the blank slot is the first slot (including the positions 1 and 2) in the SS burst set window. In a possible case, the network device (such as a gNB) succeeds in LBT before the position 1. In this case, the network device skips the positions 1 and 2, that is, does not send the SS/PBCH block 1 and the SS/PBCH block 2. The network device may send the SS/PBCH block 1 at the positions 3, 5, and 7, and may send the SS/PBCH block 2 at the positions 4, 6, and 8.

The example is merely used to explain this application and shall not constitute a limitation. Specifically, when Embodiment 3 and Embodiment 1/2 are combined, a manner of sending the SS/PBCH block complies with specific implementations in Embodiment 1/2. It should be noted that the blank slot is skipped. A difference is that offset1=0 in the formula (5) (because the SS/PBCH block is sent at a corresponding preset time position) when Embodiment 3 and Embodiment 1 are combined, while offset1≤5 ms in the formula (5) when Embodiment 2 and Embodiment 1 are combined.

(4) Embodiment 4

The formulas used to calculate the actual time position of the RMSI CORESET in Embodiment 1 and Embodiment 2 are applicable to a case in which an offset between the actual time position and the preset time position of the SS/PBCH block is less than 10 ms, to be specific, the actual sending time and the preset time position of the SS/PBCH block are located in a same radio frame. In this embodiment, when an offset between an actual time position and a preset time position of an SS/PBCH block is greater than 10 ms, that is, an actual sending time and the preset time position of the SS/PBCH block are in different radio frames, there is an offset between a radio frame in which the SS/PBCH block is actually located and a preset radio frame configured for the SS/PBCH block. The offset may be referred to as a third offset associated with the SS/PBCH block.

Figure 16A:
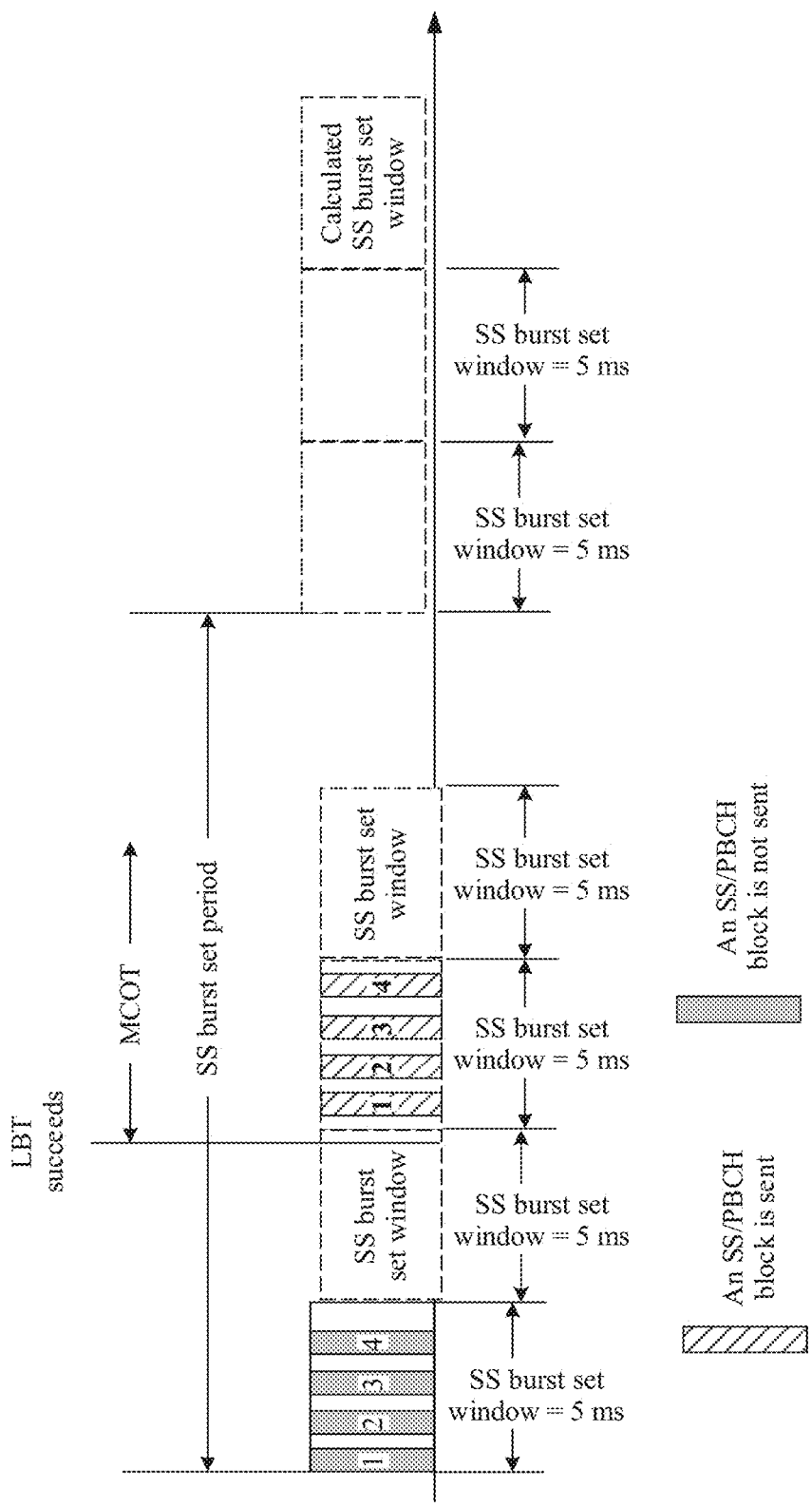
FIG. 16A and FIG. 16B are schematic diagrams of still another SS/PBCH block sending manner according to this application.
Figure 16B:
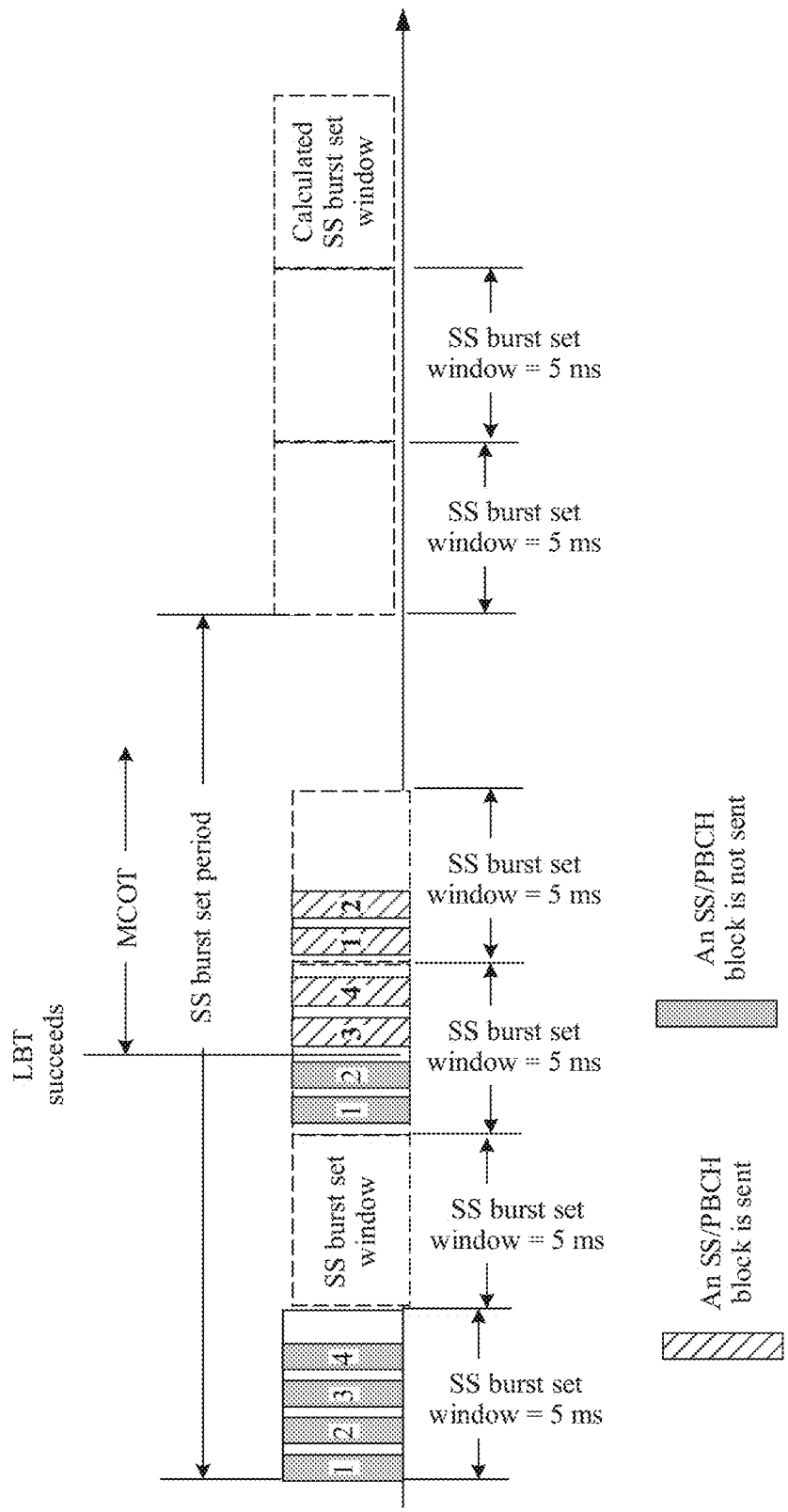

As shown in FIG. 16A and FIG. 16B, preset time positions corresponding to an SS/PBCH block 1, an SS/PBCH block 2, an SS/PBCH block 3, and an SS/PBCH block 4 are configured in an SS burst set window in a first half-frame of a preset radio frame. The preset time positions corresponding to the SS/PBCH block 1, the SS/PBCH block 2, the SS/PBCH block 3, and the SS/PBCH block 4 may also be configured in an SS burst set window corresponding to a first half-frame of a next radio frame. Due to impact of LBT, the offset between the actual time position and the preset time position of the SS/PBCH block may be greater than 10 ms.

In a case shown in FIG. 16A, a network device succeeds in LBT at a time position close to an end time of the preset radio frame. In this case, the SS/PBCH block 1, the SS/PBCH block 2, the SS/PBCH block 3, and the SS/PBCH block 4 may be correspondingly sent at the preset time positions in the next radio frame. In a case shown in FIG. 16B, the network device succeeds in LBT in the next radio frame close to the preset radio frame. In this case, in the next radio frame, refer to the manner 3 (as shown in FIG. 13A and FIG. 13B) in Embodiment 2 to send the SS/PBCH block 1, the SS/PBCH block 2, the SS/PBCH block 3, and the SS/PBCH block 4.

In the example cases shown in FIG. 16A and FIG. 16B, the network device needs to notify a terminal device of the third offset, to prevent the terminal from monitoring an SS/PBCH block/RMSI CORESET in an incorrect time window (such as a "calculated SS burst set window" in FIG.

16A and FIG. 16B) based on an SS burst set sending period indicated in an RMSI PDSCH.

In this embodiment, the third offset is a difference between an index of a radio frame in which the SS/PBCH block is located when being sent and an index of a preset radio frame configured for the SS/PBCH block. Specifically, the third offset may be represented by a difference between an SFN of a radio frame in which the SS/PBCH block is actually located and a system frame number (SFN) of a preset radio frame corresponding to the SS/PBCH block.

In the example cases shown FIG. 16A and FIG. 16B, a time position of the RMSI CORESET may be determined by a time offset (that is, a first offset) and the third offset of the SS/PBCH block in the radio frame, and the RMSI CORESET satisfies the following formulas (7) and (8). To be specific, in a radio frame, an index S of a starting slot of an RMSI CORESET corresponding to an SS/PBCH block is:

$$S = \mathrm{mod}(\mathrm{offset2}*N_{slot} + \mathrm{offset1} + X*n + f(i), N_{slot}) \quad (7)$$

$$f(i) = \mathrm{floor}(i*M) \quad (8),$$ where offset2 represents the third offset, offset1 represents the first offset, i represents a time index of the SS/PBCH block, $N_{slot}$ represents a quantity of slots of RMSI in the radio frame, n is equal to a subcarrier spacing of the RMSI CORESET/15 kHz, a value of X is any one in a set $\{0, 2, 5, 7\}$, a value of M is any one in a set $\{0.5, 1, 2\}$, and M represents a quantity of RMSI CORESETs included in one slot.

In this application, the set $\{0, 2, 5, 7\}$ may be referred to as a first set, and X may be one of a plurality of values included in the first set. The set $\{0.5, 1, 2\}$ may be referred to as a second set, and M may be one of a plurality of values included in the second set. Not limited to the set $\{0, 2, 5, 7\}$ defined in an NR standard, a value in the first set may further change in a future communications system. This change does not affect implementation of this application. Not limited to the set $\{0.5, 1, 2\}$ defined in the NR standard, a value of the second set may further change in a future communications system. This change does not affect implementation of this application.

In Embodiment 4, indication information of the third offset may be carried in at least one of the following: RRC signaling (such as a message 4 in a random access process), the RMSI CORESET, or a PBCH, a PSS/SSS, or a PBCH DMRS sequence in the SS/PBCH block.

It may be understood that when the offset between the actual time position and the preset time position of the SS/PBCH block is greater than 10 ms, the network device notifies the terminal of the third offset, so that the terminal can correctly detect the SS/PBCH block/RMSI CORESET and the RMSI PDSCH.

It may be understood that Embodiment 4 may be implemented in combination with Embodiment 2 and Embodiment 3. To be specific, in a new radio frame after LBT succeeds, the SS/PBCH block may be sent according to the manners in Embodiment 2 and Embodiment 3, but a formula for calculating an actual time position of the RMSI CORESET needs to be updated to the formula (7).

Based on a requirement such as radio resource management (RRM) (such as mobility management and neighboring cell measurement), the network device configures a communication resource for UE, to monitor a reference signal (RS) of a neighboring cell and/or a local cell. The reference signal may be a channel state information-reference signal (CSI-RS), an SSB, or a discovery reference signal (DRS) including an SSB.

An embodiment of this application provides a reference signal sending method. The method includes the following several steps.

A network device performs channel listening. Specifically, the network device performs channel listening on a resource that can be used to send a reference signal. The resource that can be used to send a reference signal includes a first resource and a second resource.

The network device sends the reference signal at a second resource position. A result of performing channel listening by the network device is that the network device does not obtain a channel on the first resource but obtains a channel on the second resource. Therefore, the network device does not send the reference signal on the first resource, but sends the reference signal on the second resource based on the result of channel listening.

The resource that can be used to send the reference signal may be a plurality of time units. Each time unit may be one or more symbols. The reference signal may be a CSI-RS, an SSB, or a DRS.

A channel listening manner may be an LBT manner. If the network device fails in LBT on the first resource, the network device cannot send the reference signal on the first resource. In this case, the network device needs to send the reference signal on another resource (such as the second resource) on which LBT succeeds.

When detecting the reference signal, a terminal does not learn that the network device fails in LBT, and sends the reference signal on another resource. Therefore, the network device needs to send indication information to the terminal. The terminal learns of, based on the indication information, a resource position at which the reference signal is sent.

An embodiment of this application provides an indication information transmission method. The method includes the following several steps.

A network device sends indication information to a terminal.

Optionally, the indication information carries information about a quantity of to-be-sent reference signals. In other words, the network device notifies the terminal of the information about the quantity of to-be-sent reference signals, or the network device notifies the terminal of information about a quantity of reference signals actually sent by the network device.

Optionally, the indication information carries index information of the to-be-sent reference signal. In other words, the network device notifies the terminal of relative position information of the to-be-sent reference signal, or the network device notifies the terminal of information about a position at which a reference signal needs to be detected. The index information may be an SSB index.

The indication information may be carried on a DMRS, a PSS, or an SSS in an SSB. In other words, the information about the quantity of to-be-sent reference signals and/or the index information of the to-be-sent reference signal may be carried in the DMRS or a PSS/SSS sequence.

After receiving the indication information, the terminal may learn of the position at which the reference signal needs to be detected.

Further, the network device sends a notification message to the terminal. The notification message carries information about a quantity of resources that may be used to send the reference signal.

The notification message may be RMSI or RRC signaling.

It should be understood that the quantity of to-be-sent reference signals and the quantity of resources that may be used to send the reference signal are quantities in a sending period. The sending period may be equivalent to a sending period of the SSB. For a method in a plurality of sending periods, only the foregoing method needs to be repeated, and details are not described herein again.

After receiving the notification message, the terminal may learn of the position at which the reference signal needs to be detected in a sending period.

In addition, the terminal may be a terminal in a local cell, or may be a terminal in a neighboring cell.

A quantity of to-be-sent SSBs (in each period) is set to X, and a quantity of resources used to send the SSBs (in each period) is set to Y. The following further describes the embodiments of this application by using an example in which X is 4 and Y is 8.

Figure 18:
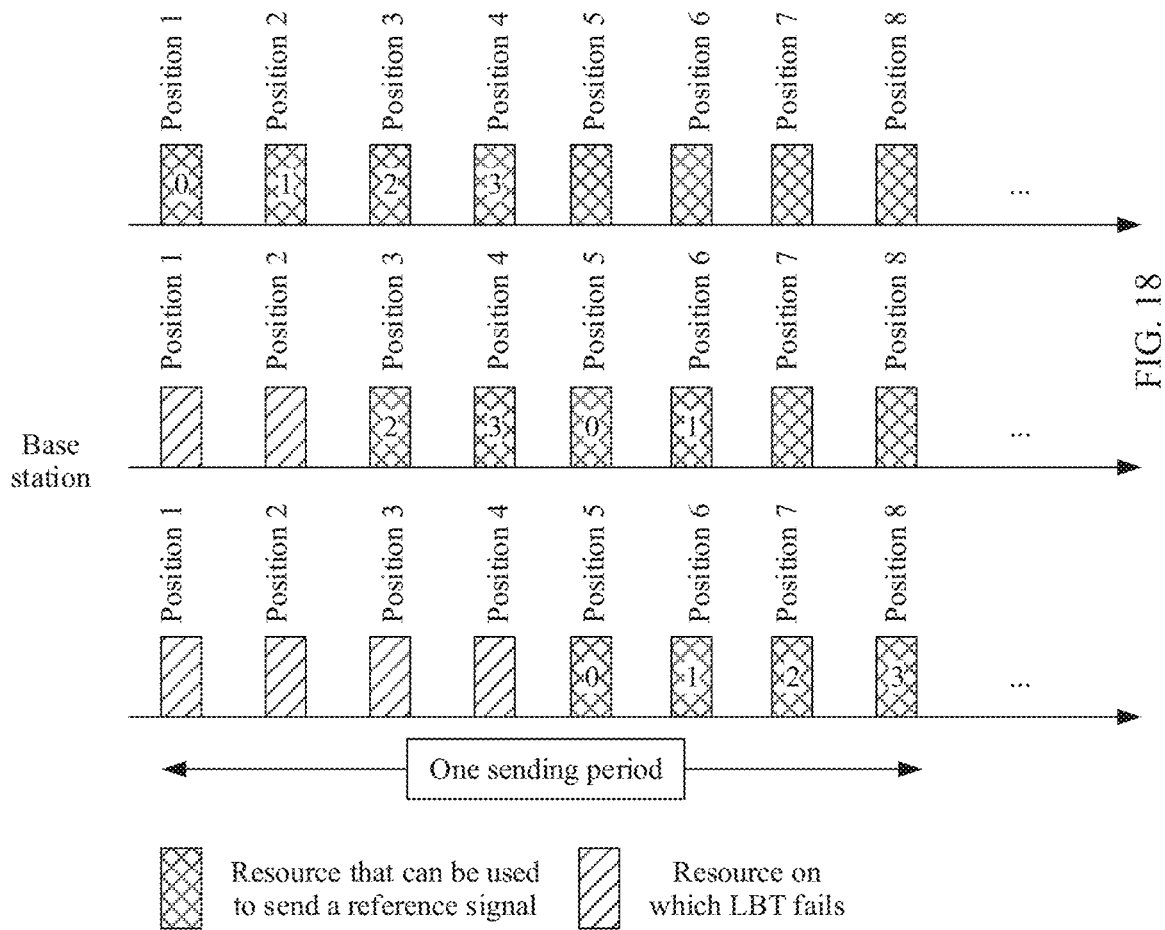
FIG. 18 is a schematic diagram of an SSB sending method.

FIG. 18 is a schematic diagram of an SSB sending method. It can be learned from FIG. 18 that a position at which a network device actually sends an SSB may be affected by LBT, and an actual sending position may be different each time. For example, an SSB 0 is configured to be sent at a position 0, and may also be sent at a position 4 when being affected by LBT.

The foregoing manner of sending the SSB is not friendly to a terminal that performs RRM measurement because the measurement terminal cannot learn of a specific position at which a to-be-measured SSB is sent this time (or in a current sending period). Therefore, related indication information needs to be introduced to the SSB. In addition, because the terminal only needs to detect reference signal received energy/quality (such as RSRP) of the SSB, the terminal does not expect to detect a PBCH of the SSB to obtain sending information of the SSB, thereby saving energy of UE. In this case, the network device may carry a quantity of sent SSBs in a PBCH DMRS or PSS/SSS sequence. The terminal may learn of, through the indication information, a possible sending position of the terminal that is to perform measurement this time.

For example, it is set that the network device continuously sends M SSBs each time, and the network device configures K possible positions (candidate position) at which the SSBs are sent. When the network device configures the terminal to detect the SSB at a resource with an index L (for example, an SSB index is L), the terminal needs to sequentially attempt to detect the SSB at positions with SSB sending position sequence numbers L, M+L-1, 2M+L-1, . . . , and N*M+X-1. N=⌊K/M⌋. After detecting a preconfigured SSB at one of the foregoing positions, the terminal does not need to continue to detect a possible sending position of a remaining SSB.

For example, in FIG. 18, if the terminal detects last time that the SSB 0 in a local cell is sent at the position 0, and learns, through indication information carried in a PBCH DMRS/PSS/SSS, that the quantity of sent SSBs in the local cell is 4 (that is, X). When a maximum quantity, configured by the network device, of positions at which the SSB is sent is 8, in this measurement process, the terminal attempts to measure the SSB at the position 0 and a position 4.

When the maximum quantity, configured by the network device, of positions at which the SSB is sent is 12, the terminal attempts to measure the SSB at the position 0/4/8. The terminal may be notified, through RMSI or RRC signaling, of the maximum quantity (that is, Y), configured by the network device, of positions (candidate position) that may be used to send the SSB or the maximum quantity may be directly specified in a standard. A value of Y may vary with a carrier frequency.

When the terminal measures the SSB for the first time, because the terminal does not obtain SSB quantity information sent by the network device, the terminal attempts to detect the SSB at every X positions after an SSB sending position is configured, until the SSB is detected. X may be specified in the standard, for example, X is 4 shown in FIG. 18, and certainly, X may alternatively be specified as 2 in the standard. Alternatively, the network device broadcasts X in system information, or separately configures X for the terminal. After obtaining the SSB quantity information sent by the network device, the terminal only needs to detect the SSB at a particular position (for example, every X positions) when measuring the SSB next time. There is a QCL relationship between SSBs sent/received at the particular positions (or a set including the particular positions).

As shown in FIG. 18, the network device sends four SSBs in total. The network device needs to use two bits to indicate a relative position of the SSB. For example, for one of the four SSBs, two bits needs to be used to indicate an index of the SSB. 00 may be used to indicate an index 0 of the first SSB, 01 may be used to indicate an index 1 of the second SSB, and the like. In addition, each SSB may be sent at two potential positions, and one bit is needed to indicate an actual sending position. Further, two bits are needed to indicate a quantity (for example, 1, 2, or 4) of SSBs sent by the network device. When it is further limited that the network device sends only 1/4 or 2/4 SSBs during each transmission, only one bit is needed for the indication. In conclusion, four or five bits are needed in total to indicate SSB sending information. One or two bits used to indicate a quantity of sent SSBs are carried in the PBCH DMRS. Two or one bit used to indicate the index of the SSB may also be carried in the PBCH DMRS. When there are not enough bits in the PBCH DMRS to carry the information, remaining bits may be carried in a corresponding PBCH payload. For example, currently, the PBCH DMRS may carry 3-bit information, and remaining one or two SSB indication bits may be carried on a PBCH. Alternatively, a quantity of bits of the PBCH DMRS is extended to meet a requirement for carrying both X and Y. For example, when the PBCH DMRS may carry 4/5-bit information, both an original 3-bit SSB indication index and a newly added 1/2-bit SSB sending quantity indication may be carried on the PBCH.

When the network device sends eight SSBs in total, three bits need to be used to indicate X. When a quantity of SSB sending positions is 16, each SSB may be sent at two potential positions, and one bit is needed to indicate an actual sending position. In addition, two bits are needed to indicate the quantity (1/2/4/8) of SSBs sent by the network device. When a quantity of SSBs transmitted by the network device each time is further limited, only one bit is needed for the indication (for example, the network device sends only 2/8, 4/8, or 1/8 SSBs). In conclusion, five or six bits are needed in total to indicate the SSB sending information. One/two bits used to indicate the quantity of sent SSBs are carried in the PBCH DMRS, and two/one bit used to indicate the SSB may also be carried in the PBCH DMRS. Two/three remaining SSB indication bits may be carried on the PBCH.

This embodiment of this application is applicable to a procedure in which the terminal measures a CSI-RS/SSB/DRS of a local cell or a neighboring cell.

For related features in this embodiment of this application, refer to the foregoing embodiments or the following embodiments. Therefore, repeated parts are not described again. In addition, a network device or a terminal (or a related module, chip, system, computer program, or storage medium) in the following apparatus embodiments or system embodiments may also be configured to perform the method provided in the embodiments of this application.

A discovery reference signal (DRS) may be used by UE in a local cell to perform time synchronization and obtain system basic information, and may be used by UE in another cell to perform radio resource management (RRM).

An embodiment of this application provides a DRS transmission method.

The method includes the following several steps.

A network device performs channel listening. Specifically, the network device performs channel listening on a resource that can be used to send a DRS. The resource that can be used to send the DRS includes a first resource and a second resource.

The network device sends the reference signal at a second resource position. A result of performing channel listening by the network device is that the network device does not obtain a channel on the first resource but obtains a channel on the second resource. Therefore, the network device does not send the DRS on the first resource, but sends the DRS on the second resource based on the result of channel listening.

The resource that can be used to send the reference signal may be a plurality of time units. Each time unit may be one or more symbols. The reference signal may include an SSB, an RMSI CORESET/PDSCH, and another signal/channel.

A channel listening manner may be an LBT manner. If the network device fails in LBT on the first resource, the network device cannot send the DRS on the first resource. In this case, the network device needs to send the DRS on another resource (such as the second resource) on which LBT succeeds.

When detecting the DRS, a terminal does not learn that the network device fails in LBT, and sends the reference signal on another resource. Therefore, the network device needs to send indication information to the terminal. The terminal learns of, based on the indication information, an actual resource position (such as a system frame number/subframe number/symbol sequence number) at which the DRS is sent, to perform RRM measurement or time synchronization, and further obtains system information to access a cell.

An embodiment of this application provides an indication information transmission method. The method includes the following several steps.

A network device sends a DRS.

Optionally, the network device sends indication information. The indication information may be carried in the DRS.

Optionally, the indication information is used to indicate an offset between a position at which the network device actually sends the DRS and a preset position at which the network device sends the DRS. The indication information may be a DRS offset value index, for example, a wrap around index. A granularity of the offset indicated by the indication information may be specified in a standard or configured by the network device (for example, configured via a PBCH). The granularity may be 1/2/4/8 DRS units.

Optionally, the indication information carries SSB QCL (quasi co-located) index/relation information in a to-be-sent DRS. In other words, the network device sends the SSB QCL index (such as an SSB QCL relationship index or an SSB index) in the to-be-sent DRS to a terminal. In other words, the network device notifies the terminal of the SSB QCL relationship index in the to-be-sent DRS. An SSB may also be written as an SS/PBCH block.

Optionally, the indication information carries duration of each DRS unit in the to-be-sent DRS. The DRS unit includes one or more SSBs, and may further include RMSI, paging, other system information (OSI), and another possible channel/signal that have a QCL (quasi co-located) relationship with the SSB. The duration of the DRS unit may be four symbols, seven symbols, 14 symbols, 21 symbols, 28 symbols, or the like. In other words, the network device notifies the terminal of minimum unit duration/a minimum time offset granularity (DRS unit) of each DRS unit in the to-be-sent DRS.

The indication information may be carried in a DMRS or a PBCH payload in the SSB. In other words, at least one of the SSB QCL relationship index or SSB index, the wrap around index, and DRS minimum sending unit duration information (DRS unit) of the to-be-sent DRS may be carried by using the PBCH DMRS or the PBCH. Any two or three of the SSB QCL relationship index or SSB index, the wrap around index, and the DRS unit duration indication may be jointly encoded for indication, thereby reducing system indication overheads.

It should be understood that a quantity of to-be-sent reference signals and a quantity of resources that may be used to send the reference signals are quantities in a sending period. The sending period may be equivalent to a sending period of the DRS. For a method in a plurality of sending periods, only the foregoing method needs to be repeated, and details are not described herein again.

In addition, the terminal may be a terminal in a local cell, or may be a terminal in a neighboring cell.

The terminal receives the indication information. The terminal performs RRM measurement based on the indication information. Optionally, the terminal performs synchronization based on the indication information. For example, the terminal determines a system frame number, a subframe number, and/or an OFDM symbol sequence number.

Another terminal (such as a terminal in another cell) may perform RRM measurement by blindly detecting a PBCH DMRS.

A maximum quantity of SSBs that are allowed to be sent (in each period) is set to X, and a quantity of resources used to send the SSBs (or DRS units) (in each period) is set to Y.

Figure 19:
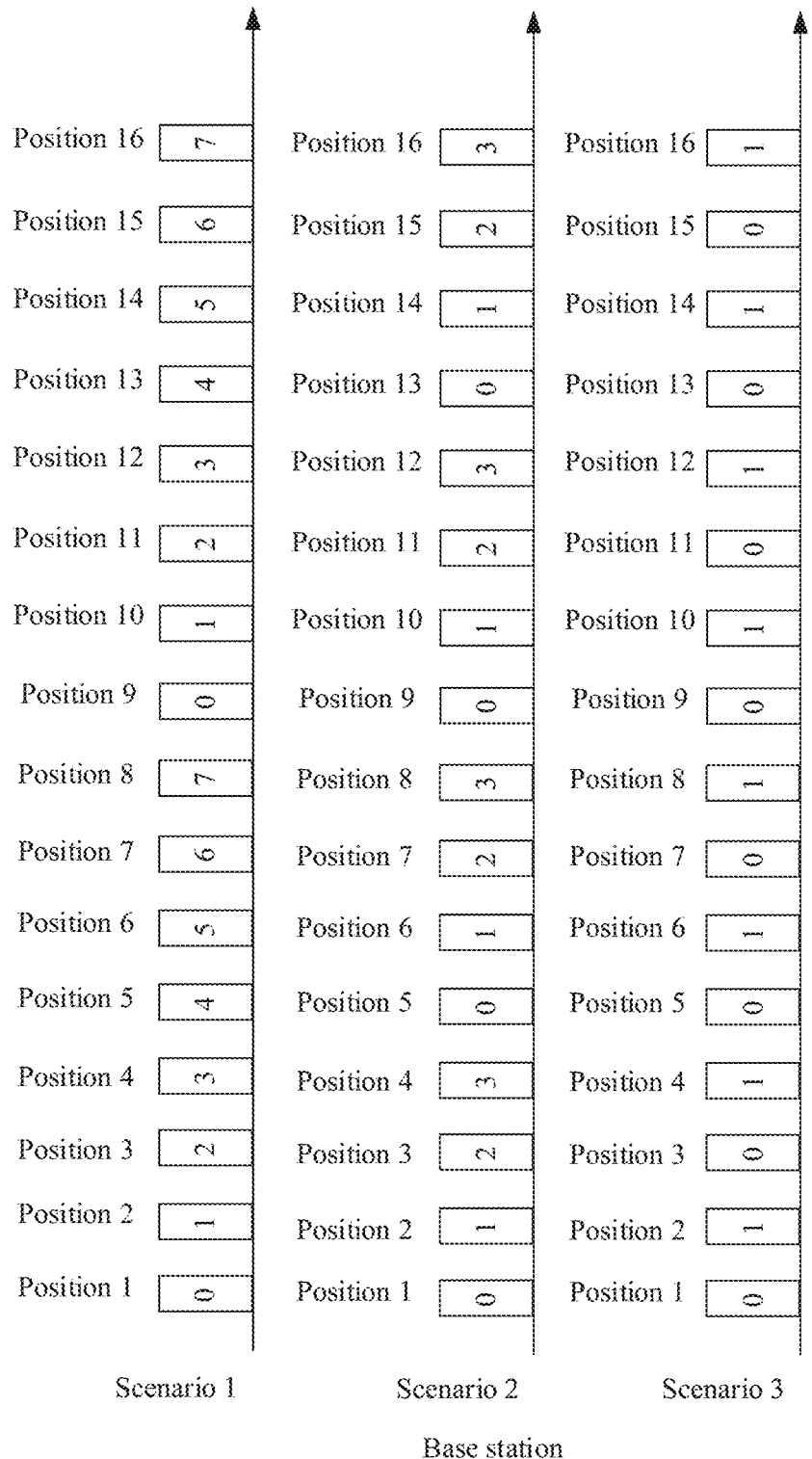
FIG. 19 is a schematic diagram of a DRS sending method.

FIG. 19 is a schematic diagram of a DRS sending method. An actual sending position of an SSB may be determined through an SSB QCL relationship index (or an SSB index) and a wrap around index. For example, when Y=16, a scenario 1 provides a correspondence between the SSB QCL relationship index or the SSB index and an SSB sending position (candidate position) when a maximum of eight SSBs are sent. In other words, each SSB may be sent at a maximum of two preset positions. For example, an SSB 0 may be sent by a network at a position 1 or a position 9 based on an LBT result. Because the maximum quantity of sent SSBs is 8, 3-bit information is needed to indicate the SSB QCL relationship or SSB index. In addition, because each SSB corresponds to two possible sending positions, additional 1-bit wrap around information is needed to indicate a specific sending position of the SSB. In conclusion, four bits in total are needed to indicate SSB QCL relationship or SSB index information. An existing NR PBCH DMRS may carry information of a total of three bits. Therefore, the SSB QCL relationship or SSB index information may be preferentially carried in the PBCH DMRS. An advantage is that UE performing RRM measurement only needs to parse the DMRS to obtain the SSB QCL relationship or SSB index, to find an SSB that needs to be monitored by the UE. This avoids extra energy consumption caused by frequent parsing of a PBCH payload. Because UE in a local cell needs to perform time synchronization, in addition to parsing a 3-bit SSB index in the DMRS, the UE further needs to additionally parse the PBCH payload to obtain a wrap around indication to obtain the actual sending position of the SSB. In this way, accurate time synchronization of the local cell is achieved. When information that can be carried in the PBCH DMRS is of more than three bits, the wrap around indication may also be carried in the PBCH DMRS.

A scenario 2 provides a correspondence between the SSB QCL relationship or SSB index and an SSB sending position (candidate position) when a maximum of four SSBs are sent. In other words, each SSB may be sent at a maximum of four preset positions. For example, an SSB 0 may be sent by a network at a position 1, a position 5, a position 9, or a position 13 based on an LBT result. Because the maximum quantity of sent SSBs is 4, 2-bit information is needed to indicate the SSB QCL relationship or SSB index. In addition, because each SSB corresponds to four possible sending positions, additional 2-bit wrap around information is needed to indicate a specific sending position of the SSB. In conclusion, four bits are needed in total to indicate SSB sending information. An existing NR PBCH DMRS may carry information of a total of three bits. Therefore, SSB QCL relationship or SSB index information may be preferentially carried in the PBCH DMRS. An advantage is that UE performing RRM measurement only needs to parse the DMRS to obtain the SSB index, to find an SSB that needs to be monitored by the UE. This avoids extra energy consumption caused by frequent parsing of a PBCH payload. Because UE in a local cell needs to perform time synchronization, in addition to parsing a 2-bit SSB index in the PBCH DMRS, the UE further needs to additionally parse the PBCH payload to obtain a wrap around indication, to obtain an actual sending position of the SSB (one bit may be carried in the PBCH DMRS, and one remaining bit needs to be carried in the PBCH payload, or both bits are carried in the PBCH payload). In this way, accurate time synchronization of the local cell is achieved. When bit information that can be carried in the DMRS is of more than three bits, the wrap around indication may also be completely carried in the PBCH DMRS. In another possible implementation, the PBCH DMRS carries only SSB QCL relationship or SSB index indication information. For example, when a DRS includes four SSBs, only two bits are needed to indicate the information. In this case, remaining 1-bit information of the PBCH DMRS is not used to indicate the wrap around information, but is set as a reserved bit. Wrap around related information and DRS unit duration indication information are carried in the PBCH payload.

A scenario 3 provides a correspondence between the SSB QCL relationship or SSB index and an SSB sending position (candidate position) when a maximum of two SSBs are sent. In other words, each SSB may be sent at a maximum of eight preset positions. For example, an SSB 0 may be sent by a network at a position 1/3/5/7/9/11 or a position 13 based on an LBT result. Because the maximum quantity of sent SSBs is 2, 1-bit information is needed to indicate the SSB QCL relationship or SSB index. In addition, because each SSB corresponds to eight possible sending positions, additional 3-bit wrap around information is needed to indicate a specific sending position of the SSB. In conclusion, four bits are needed in total to indicate SSB sending information. An existing NR PBCH DMRS may carry information of a total of three bits. Therefore, SSB QCL relationship or SSB index information may be preferentially carried in the PBCH DMRS. An advantage is that UE performing RRM measurement only needs to parse the DMRS to obtain the SSB index, to find an SSB that needs to be monitored by the UE. This avoids extra energy consumption caused by frequent parsing of a PBCH payload. Because UE in a local cell needs to perform time synchronization, in addition to parsing a 1-bit SSB QCL relationship or SSB index in the DMRS, the UE further needs to additionally parse the PBCH payload to obtain a wrap around indication, to obtain an actual sending position of the SSB (two bits may be carried in the PBCH DMRS, and one remaining bit needs to be carried in the PBCH payload, or both bits are carried in the PBCH payload). In this way, accurate time synchronization of the local cell is achieved. When bit information that can be carried in the DMRS is of more than three bits, the wrap around indication may also be completely carried in the PBCH DMRS. In another possible implementation, the PBCH DMRS carries only SSB QCL relationship or SSB index indication information. For example, when the DRS includes two SSBs, only one bit is needed to indicate the information. In this case, remaining 2-bit information of the PBCH DMRS is not used to indicate the wrap around information, but is set as a reserved bit. Wrap around related information and DRS unit duration indication information are carried in the PBCH payload.

It can be learned from the foregoing scenarios 1, 2, and 3 that, when Y (for example, Y=16) is determined, SSB index indications and wrap around indications corresponding to different values of X (X=2/4/8) need a same total quantity of bits (such as four bits). Optionally, in the DRS, it may be considered that the foregoing two pieces of information are used for joint indication, and a quantity of needed bits is the same as a quantity of SSB candidate positions configured by a system. For example, the quantity of needed bits is $\square \log_2 Y\square$. For example, in the foregoing example, 4-bit information may be used to indicate the SSB index/SSB QCL index and the wrap around information.

In addition to the SSB, each DRS unit of the DRS may further include an RMSI CORESET/PDSCH, OSI, paging, a CSI-RS, and another signal that have a QCL relationship. Therefore, time-frequency resources needed by DRS units in the DRS may be different. For example, if only seven symbols are needed to separately send the SSB and the RMSI, two SSBs may be sent in each 14-symbol slot. For example, if the SSB, the RMSI, and the OSI/paging are jointly sent, only one SSB can be sent in each 14-symbol slot. After obtaining the SSB index carried in the DMRS or on the PBCH, the UE further needs to obtain DRS minimum sending unit duration information (DRS unit) to achieve accurate time synchronization. In addition, DRS unit duration may further correspond to a time domain resource required for sending one SSB (one SSB candidate position). For example, it is provided in a standard that one SSB candidate position lasts for seven symbols. One DRS unit lasts for seven symbols when corresponding to one SSB resource, and lasts for 14 symbols when corresponding to two SSB resources. When it is provided in a standard that one needed SSB candidate position lasts for 14 symbols, one DRS unit lasts for 14 symbols when corresponding to one SSB resource, and lasts for 28 symbols when corresponding to two SSB resources.

Figure 20:
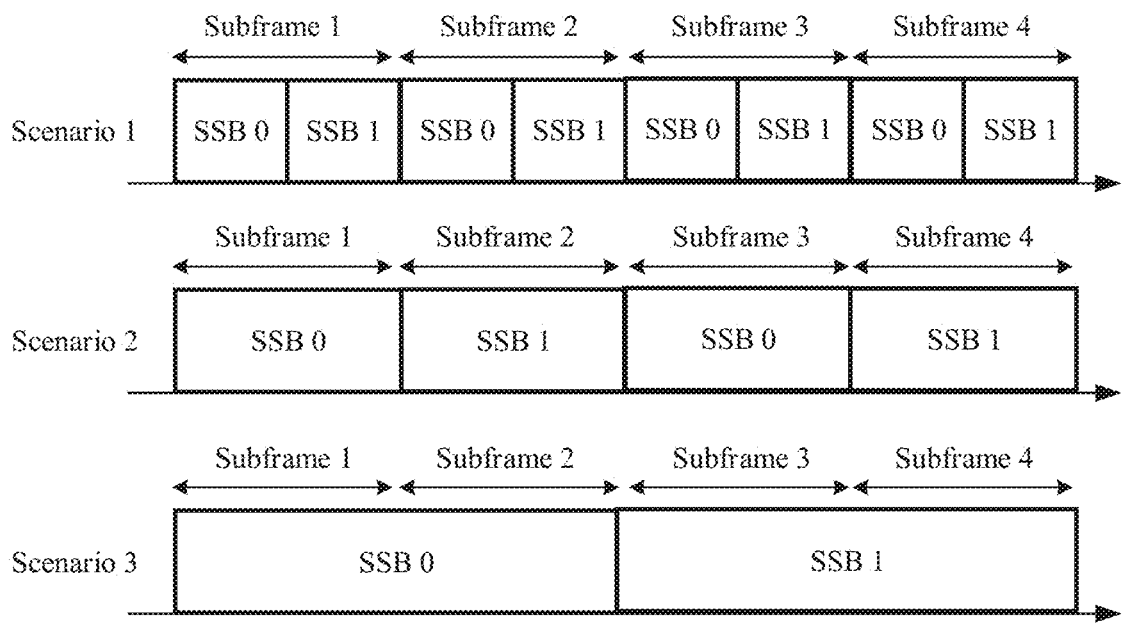
FIG. 20 is a schematic diagram of a plurality of SSBs.

FIG. 20 is a schematic diagram of a plurality of SSBs. As shown in FIG. 20, when UE obtains an SSB index 1 and wrap around index 1, when SSB minimum sending unit duration is seven symbols, an actual sending position of an SSB is a first half (the first seven symbols) of a subframe 2. When the SSB minimum sending unit duration is 14 symbols, the actual sending position of the SSB is a subframe 3 (occupying all 14 symbols). When the SSB minimum sending unit durations is 28 symbols, the actual sending position of the SSB is a subframe 5 and a subframe 6 (occupying all 28 symbols). SSB minimum sending unit duration information (DRS unit) is carried on a PBCH or in a DMRS. When the DRS unit is carried in the DMRS, UE that performs RRM may obtain an SSB time offset, that is, duration of each SSB. For example, the UE needs to detect, on every 7, 14, or 28 symbols, whether an SSB configured and measured by the UE is sent. When the DRS unit is carried in a PBCH payload, if the UE that performs RRM does not parse a PBCH payload, the UE that performs RRM can only blindly detect, based on a minimum SSB time offset granularity, whether a configured and measured SSB is sent, for example, perform detection once every seven symbols.

A quantity of actually sent DRS units and a wrap around index may be jointly encoded and transmitted on the PBCH. For example, it is assumed that a maximum quantity of DRS unit positions (DRS unit candidate position) is Y=16, and a maximum quantity of DRS units (number of transmitted DRS units in one period) that are allowed to be sent is 8. One DRS unit or an SSB sending offset indication field corresponding to the DRS unit may be defined, as shown in the following table.

| Index | Scenario |
| --- | --- |
| 0 to 15 | A quantity of actually sent DRS units is 1 Wrap around indexes 0 to 15 |
| 16 to 23 | A quantity of actually sent DRS units is 2 Wrap around indexes 0 to 7 |
| 24 to 28 | A quantity of actually sent DRS units is 3 Wrap around indexes 0 to 4 |
| 29 to 32 | A quantity of actually sent DRS units is 4 Wrap around indexes 0 to 3 |
| 33 to 35 | A quantity of actually sent DRS units is 5 Wrap around indexes 0 to 2 |
| 36 to 37 | A quantity of actually sent DRS units is 6 Wrap around indexes 0 and 1 |
| 38 to 39 | A quantity of actually sent DRS units is 7 Wrap around indexes 0 and 1 |
| 40 to 41 | A quantity of actually sent DRS units is 8 Wrap around indexes 0 and 1 |

Compared with independent indication that needs seven bits, joint indication needs only six bits.

A quantity of actually sent DRS units may be further reduced. For example, only 1, 2, 4, and 8 are allowed to further reduce a quantity of indication bits, as shown in the following table:

| Index | Scenario |
| --- | --- |
| 0 to 15 | A quantity of actually sent DRS units is 1 Wrap around indexes 0 to 15 |
| 16 to 23 | A quantity of actually sent DRS units is 2 Wrap around indexes 0 to 7 |
| 24 to 27 | A quantity of actually sent DRS units is 4 Wrap around indexes 0 to 3 |
| 28 to 29 | A quantity of actually sent DRS units is 8 Wrap around indexes 0 and 1 |

Compared with independent indication that needs seven bits, wrap around/DRS unit joint indication needs only five bits when a quantity of actually sent DRS units is limited to 1/2/48, thereby further reducing system indication overheads.

When the quantity of sent DRS units is further limited, system indication overheads can be further reduced. A method is the same as that in the above, and details are not described herein again.

A maximum candidate position quantity (Y) of a DRS sent by the network device and a maximum quantity (X) of sent SSBs may be directly fixed/provided by a standard based on a carrier frequency, or may be flexibly configured by a gNB and indicated on a PBCH or in RMSI. In this case, values of X and Y may be jointly indicated. When two bits are used for indication, a possible indication method is shown in the following table.

| Indication bit (a bit corresponding to the foregoing indication information) | X | Y |
| --- | --- | --- |
| 00 | 1 | 4 |
| 01 | 2 | 4 |
| 10 | 2 | 8 |
| 11 | 4 | 8 |

When a quantity of SSBs that are actually to be sent is less than a maximum quantity of SSBs that are allowed to be sent, the actual sending position of the SSB may be determined through the SSB QCL relationship index (or the SSB index), the wrap around index, and the quantity of SSBs that are actually to be sent.

Figure 21:
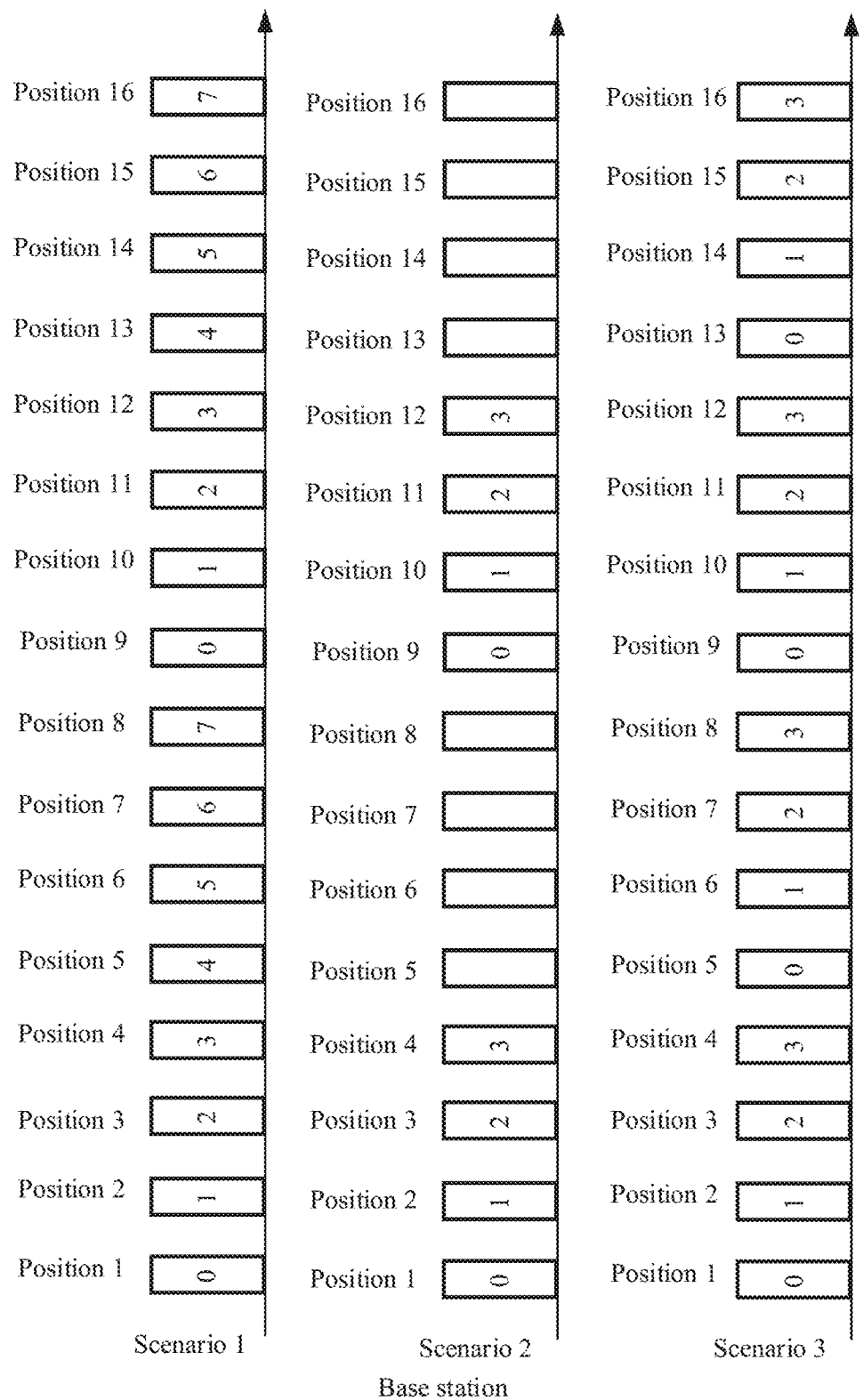
FIG. 21 is a schematic diagram of a DRS sending method.

FIG. 21 is a schematic diagram of a DRS sending method. For example, when Y=16, a scenario 1 provides a correspondence between an SSB index and an SSB sending position (candidate position) when a maximum quantity of SSBs that are allowed to be sent is 8 but a quantity of SSBs actually sent by a network device is 4.

As shown in a scenario 2, each SSB may be sent at a maximum of two preset positions. For example, an SSB 0 may be sent by a network at a position 1 or a position 9 based on an LBT result. In this case, the SSB cannot be sent at positions 5 to 8 and 13 to 16. In this scenario, an SSB index indication and a wrap around indication are the same as those in the method shown in FIG. 19, and details are not described herein again.

As shown in a scenario 3, each SSB may be sent at a maximum of four preset positions. For example, an SSB 0 may be sent by a network at a position 1, 6, or 10, or a position 13 based on an LBT result. In this case, two bits are needed to indicate the SSB index, and one bit is needed to indicate an actual SSB sending manner of a gNB (the scenario 2 or the scenario 3). When there are more possible sending scenarios, more bits are needed for indication. The foregoing 3-bit information may be carried in a PBCH DMRS. Therefore, UE that performs RRM may learn of all possible sending positions (sending patterns) of a to-be-detected SSB. However, UE in a local cell may achieve accurate time synchronization through the foregoing information and wrap around indication information (one bit or two bits) on a PBCH. When the indication information (the SSB index+a specific scenario indication) cannot be completely carried in the PBCH DMRS, some/all of the indication information is carried in a PBCH payload.

For related features in this embodiment of this application, refer to the foregoing embodiments or the following embodiments. Therefore, repeated parts are not described again. In addition, a network device or a terminal (or a related module, chip, system, computer program, or storage medium) in the following apparatus embodiments or system embodiments may also be configured to perform the method provided in the embodiments of this application.

Figure 17:
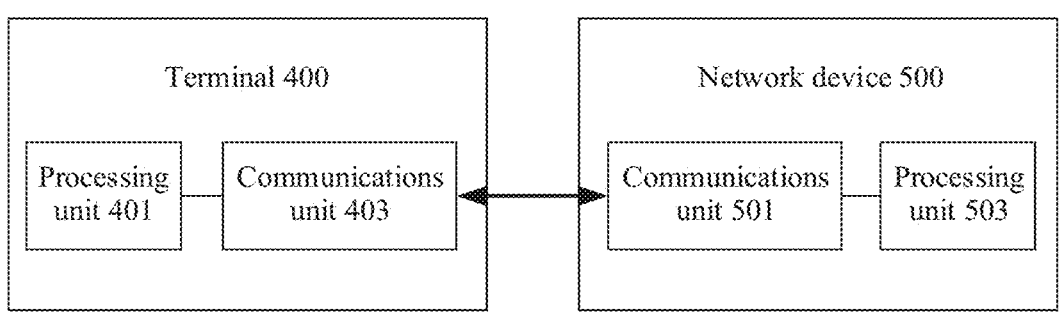
FIG. 17 is a function block diagram of a wireless communications system, a terminal, and a network device according to this application.

FIG. 17 shows a wireless communications system 10 according to an embodiment of this application, and a network device 500 and a terminal 400 in the wireless communications system 10. The network device 500 may be the network device in the foregoing method embodiment, and the terminal 400 may be the terminal in the foregoing method embodiment.

As shown in FIG. 17, the network device 500 may include a communications unit 501 and a processing unit 503.

The processing unit 503 may be configured to generate indication information of a time-frequency resource position of an RMSI PDSCH carried in an SS/PBCH block and an RMSI CORESET, and system information that is carried in the RMSI PDSCH and that is used to indicate a resource configuration of a PRACH.

The communications unit 501 may be configured to send the SS/PBCH block, the RMSI CORESET, and the RMSI PDSCH to the terminal 400.

In addition, the processing unit 503 and the communications unit 501 may be further configured to perform an LBT procedure. For details about the LBT procedure, refer to related regulations in 3GPP Release R13. Details are not described herein again.

As shown in FIG. 17, the terminal 400 may include a processing unit 401 and a communications unit 403.

The communications unit 403 may be configured to receive the SS/PBCH block sent by the network device 500. Correspondingly, the processing unit 401 may be configured to parse a PBCH in the SS/PBCH block to obtain information about a resource position of the RMSI CORESET.

The communications unit 403 may be further configured to receive and demodulate the RMSI CORESET at the resource position of the RMSI CORESET. Correspondingly, the processing unit 401 may be further configured to parse indication information carried in the RMSI CORESET, to determine the time-frequency resource position of the RMSI PDSCH.

The communications unit 403 may be further configured to receive and demodulate the RMSI PDSCH at the time-frequency resource position of the RMSI PDSCH. Correspondingly, the processing unit 401 may be further configured to parse the RMSI PDSCH to obtain the system information carried in the RMSI PDSCH, and finally obtain resource configuration information of the PRACH. The resource configuration information of the PRACH is used by the terminal to perform a subsequent initial access procedure.

In addition, the processing unit 401 and the communications unit 403 may be further configured to perform a random access process. For the random access process, refer to a chapter about initial access in 3GPP 38.213. Details are not described herein again.

Due to impact of LBT, the SS/PBCH block may not be sent at a preset time position (as shown in FIG. 4) defined in an NR standard. Therefore, this application provides two main solutions to resolve a problem of sending the SS/PBCH block and the RMSI CORESET. The following mainly describes specific implementations of the network device 500 and the terminal 400 in the two main solutions.

(1) As stated in the foregoing solution 1, with reference to a preset time position in an SS burst set window defined in the NR standard, in an NRU system, a plurality of preset time positions may be configured in the SS burst set window for to-be-sent SS/PBCH blocks. In this way, a probability that the SS/PBCH block is successfully sent at the preset time position can be increased.

In the solution 1, an actual time position at which the communications unit 501 in the network device 500 sends the SS/PBCH block is the preset time position corresponding to the SS/PBCH block in the SS burst set window. Specifically, the actual time position at which the communications unit 501 in the network device 500 sends the SS/PBCH block is a time position that is in the plurality of preset time positions corresponding to the SS/PBCH block and that is later than a preset time position at which LBT succeeds. Herein, the SS/PBCH block may be any to-be-sent SS/PBCH block. Correspondingly, an actual time position at which the communications unit 403 in the terminal 400 receives the SS/PBCH block is the preset time position corresponding to the SS/PBCH block in the SS burst set window.

Optionally, the plurality of preset time positions corresponding to the to-be-sent SS/PBCH block may periodically appear in the SS burst set window. The communications unit 501 may be configured to notify the terminal of a period in which the plurality of preset time positions corresponding to the SS/PBCH block repeatedly appear in the SS burst set window. Correspondingly, the communications unit 403 in the terminal 400 may be configured to receive indication information of the period, and determine, based on the period, preset time positions that are in the SS burst set window and that correspond to a same SS/PBCH block.

Optionally, the to-be-sent SS/PBCH block may appear in Q adjacent SS burst set windows for a same quantity of times. In this way, it can be ensured that the SS/PBCH blocks appear with a same probability. The communications unit 501 may be further configured to notify the terminal of Q. Correspondingly, the communications unit 403 in the terminal 400 may be configured to receive indication information of Q, and determine, based on Q and the period, preset time positions that are in the Q SS burst set windows and that correspond to a same SS/PBCH block.

It should be understood that an actual sending time of the RMSI CORESET is related to an actual sending time of an SS/PBCH block corresponding to the RMSI CORESET. In the solution 1, the processing unit 403 in the terminal 400 may be specifically configured to determine the actual sending time of the RMSI CORESET by using the foregoing formulas (1) and (2).

In the solution 1, to notify the terminal 400 of the position mapping relationship of the to-be-sent SS/PBCH blocks in the SS burst set window, the communications unit 501 in the network device 500 may be configured to carry the position mapping relationship of the to-be-sent SS/PBCH blocks in the SS burst set window in at least one of the following: the RMSI CORESET, the RMSI PDSCH, RRC signaling (such as a message 4 in a random access process), or a PBCH in the SS/PBCH block. Correspondingly, the communications unit 403 in the terminal 400 may be configured to receive, in at least one of these messages, indication information of the position mapping relationship of the to-be-sent SS/PBCH blocks in the SS burst set window.

Specifically. 16 bits that are in the RMSI PDSCH indicated by the RMSI CORESET and that are used to indicate an actual sending status of the SS/PBCH block may be reused. The 16 bits may be referred to as a first bit sequence.

In a possible manner, the first bit sequence may include a first part and a second part. The first part indicates a quantity of SS/PBCH blocks actually sent by the network device, and the second part indicates a group in which the SS/PBCH blocks actually sent by the network device are located. For details, refer to related content in Embodiment 1. Details are not described herein again.

In another possible manner, the first bit sequence may include a third part and a fourth part, each bit in the fourth part indicates whether J consecutive SS/PBCH blocks are sent, the third part indicates a value of J, J is obtained from one of $2^K$ values, K<L, L represents a sequence length of the first bit sequence, K represents a sequence length of the third part, and J, K, and L are all positive integers. For details, refer to related content in Embodiment 1. Details are not described herein again.

(2) As stated in the foregoing solution 2, in an NRU system, due to impact of LBT, the SS/PBCH block may not be sent at a preset time position (as shown in FIG. 4) defined in the NR standard. The network device 500 needs to notify the terminal 400 of a time offset (that is, a first offset) between an actual time position and the preset time position of the SS/PBCH block. In addition, the network device 500 may send the RMSI CORESET corresponding to the SS/PBCH block after delaying the RMSI CORESET by a same time offset, to ensure that the SS/PBCH block and the RMSI CORESET corresponding to the SS/PBCH block are sent within a maximum channel occupancy time (MCOT).

Herein, the SS burst set window including the preset time position is located in a first half-frame of a radio frame, and may be referred to as a first SS burst set window.

In a possible manner, the communications unit 501 in the network device 500 may be specifically configured to send the SS/PBCH block after a delay of a first offset based on the preset time position corresponding to the to-be-sent SS/PBCH block in the first SS burst set window. Specifically, refer to the manner 1 and the manner 2 in Embodiment 2. Correspondingly, the communications unit 403 in the terminal 400 may be specifically configured to receive the SS/PBCH block after a delay of the first offset based on the preset time position corresponding to the to-be-sent SS/PBCH block in the first SS burst set window.

In another possible manner, the communications unit 501 in the network device 500 may be specifically configured to: if the preset time position corresponding to the to-be-sent SS/PBCH block in the first SS burst set window is later than a time position at which LBT succeeds, send the SS/PBCH block at the preset time position corresponding to the SS/PBCH block; and if the preset time position corresponding to the to-be-sent SS/PBCH block in the first SS burst set window is not later than a time position at which LBT succeeds, send the SS/PBCH block after a delay of the first offset based on the preset time position corresponding to the SS/PBCH block. Correspondingly, the communications unit 403 in the terminal 400 may be specifically configured to: if the preset time position corresponding to the to-be-sent SS/PBCH block in the first SS burst set window is later than the time position at which LBT succeeds, receive the SS/PBCH block at the preset time position corresponding to the SS/PBCH block; and if the preset time position corresponding to the to-be-sent SS/PBCH block in the first SS burst set window is not later than the time position at which LBT succeeds, receive the SS/PBCH block after a delay of the first offset based on the preset time position corresponding to the SS/PBCH block.

In a solution 2, the communications unit 501 is further specifically configured to notify the terminal 400 of the first offset, that is, send, to the terminal 400, first indication information used to indicate the first offset. Correspondingly, the communications unit 403 in the terminal 400 may be configured to receive the first indication information, to learn of the first offset. The processing unit 401 in the terminal 400 may be configured to determine, based on the first offset, an actual time position corresponding to the SS/PBCH block.

Specifically, the first indication information may be carried in at least one of the following: a PBCH, a PSS, an SSS, and a PBCH DMRS sequence in the SS/PBCH block. Optionally, when the first offset is equal to duration of a first synchronization signal burst set window, the first indication information may be half-frame indication information carried on a PBCH in the SS/PBCH block. Optionally, when the first offset is equal to the duration of the first synchronization signal burst set window, the first indication information may be a bit carried on a PBCH in the SS/PBCH block.

It should be understood that an actual sending time of the RMSI CORESET is related to an actual sending time of an SS/PBCH block corresponding to the RMSI CORESET. In the solution 2, the processing unit 403 in the terminal 400 may be specifically configured to determine the actual sending time of the RMSI CORESET by using the foregoing formulas (3) and (4).

In a possible case, the actual sending time and the preset time position of the SS/PBCH block are in different radio frames. There is an offset between a radio frame in which the SS/PBCH block is actually located and a preset radio frame configured for the SS/PBCH block, and the offset may be referred to as a third offset of the SS/PBCH block.

In this possible case, the communications unit 501 is further specifically configured to notify the terminal 400 of the third offset, that is, send, to the terminal 400, second indication information used to indicate the third offset. Correspondingly, the communications unit 403 in the terminal 400 may be further configured to receive the second indication information, to learn of the third offset. The processing unit 401 in the terminal 400 may be further configured to determine, on the premise of learning of the first offset and with reference to the third offset, an actual time position corresponding to the SS/PBCH block. Specifically, the processing unit 403 in the terminal 400 may be specifically configured to determine the actual sending time of the RMSI CORESET by using the foregoing formulas (7) and (8).

With reference to the solution 1 or the solution 2, in a possible case, the first synchronization signal burst set window includes a first slot (that is, a blank slot), and the first slot does not carry the SS/PBCH block. Regarding this, the processing unit 403 in the terminal 400 may be specifically configured to determine the actual sending time of the RMSI CORESET by using the foregoing formulas (5) and (6).

It may be understood that for specific implementations of the functional units included in the network device 500 and the terminal 400, refer to the foregoing embodiments. Details are not described herein again.

In addition, an embodiment of the present invention further provides a wireless communications system. The wireless communications system may be the wireless communications system 100 shown in FIG. 2, or the wireless communications system 10 shown in FIG. 17, and may include a network device and a terminal. The terminal may be the terminal in the foregoing embodiments, and the network device may be the network device in the foregoing embodiments. Specifically, the terminal may be the terminal 300 shown in FIG. 7, and the network device may be the network device 400 shown in FIG. 8. The terminal may alternatively be the terminal 400 shown in FIG. 17, and the network device may alternatively be the network device 500 shown in FIG. 17. For specific implementations of the network and the terminal, refer to the foregoing embodiments. Details are not described herein again.

Using the network device shown in FIG. 8 as an example, the network device processor 401 is configured to control the transmitter 407 to perform sending in unlicensed and/or licensed frequency bands, and control the receiver 409 to perform receiving in the unlicensed and/or licensed frequency bands. The transmitter 407 is configured to support the network device in performing a process of transmitting data and/or signaling. The receiver 409 is configured to support the network device in performing a process of receiving data and/or signaling. The memory 405 is configured to store program code and data of the network device.

Specifically, the transmitter 407 may be configured to send an SS/PBCH block, an RMSI CORESET, and an RMSI PDSCH. In a manner, the transmitter 407 may be specifically configured to send the SS/PBCH block after LBT succeeds. An actual time position at which the SS/PBCH block is sent is a preset time position corresponding to the SS/PBCH block in an SS burst set window Specifically, the actual time position at which the SS/PBCH block is sent is a time position that is in a plurality of preset time positions corresponding to the SS/PBCH block and that is later than a preset time position at which LBT succeeds. In another manner, due to impact of LBT, the transmitter 407 may not send the SS/PBCH block at a preset time position (as shown in FIG. 4) defined in an NR standard. The transmitter 407 may send the SS/PBCH block after a delay of a first offset based on a preset time position corresponding to a to-be-sent SS/PBCH block in a first SS burst set window. Alternatively, the transmitter 407 may send, if the preset time position corresponding to the to-be-sent SS/PBCH block in the first SS burst set window is later than a time position at which LBT succeeds, the SS/PBCH block at the preset time position corresponding to the SS/PBCH block; otherwise, send the SS/PBCH block after a delay of the first offset based on the preset time position corresponding to the SS/PBCH block. In addition, to indicate a time offset (which may be referred to as the first offset) between an actual time position of the SS/PBCH block in a radio frame and the preset time position corresponding to the SS/PBCH block, the transmitter 407 may be further configured to send first indication information.

Specifically, the receiver 409 may be configured to receive uplink data that is sent by the terminal on a detected idle frequency domain resource.

For a specific implementation of each component in the network device, refer to the foregoing method embodiments. Details are not described herein again.

Using the terminal shown in FIG. 7 as an example, the terminal processor 304 is configured to invoke an instruction stored in the memory 312 to control the transmitter 306 to perform sending in unlicensed and/or licensed frequency bands and control the receiver 308 to perform receiving in the unlicensed and/or licensed frequency bands. The transmitter 306 is configured to support the terminal in performing a process of transmitting data and/or signaling. The receiver 308 is configured to support the terminal in performing a process of receiving data and/or signaling. The memory 312 is configured to store program code and data of the terminal.

Specifically, the receiver 308 may be configured to receive the SS/PBCH block, the RMSI CORESET, and the RMSI PDSCH that are sent by the network device. In a manner, the receiver 308 may be specifically configured to receive the SS/PBCH block at the preset time position corresponding to the to-be-sent SS/PBCH block in the SS burst set window. Specifically, the actual time position at which the SS/PBCH block is received is a preset time position that is in the plurality of preset time positions corresponding to the SS/PBCH block and that is later than the preset time position at which the network device succeeds in LBT. In another manner, the receiver 308 may be specifically configured to receive the SS/PBCH block after a delay of the first offset based on the preset time position corresponding to the to-be-sent SS/PBCH block in the first SS burst set window. Alternatively, the receiver 308 may be specifically configured to: if the preset time position corresponding to the to-be-sent SS/PBCH block in the first SS burst set window is later than the time position at which LBT succeeds, receive the SS/PBCH block at the preset time position corresponding to the SS/PBCH block; otherwise, receive the SS/PBCH block after a delay of the first offset based on the preset time position corresponding to the SS/PBCH block. In addition, to learn of the time offset (which may be referred to as the first offset) between the actual time position of the SS/PBCH block in the radio frame and the preset time position corresponding to the SS/PBCH block, the receiver 308 may be further configured to receive the first indication information.

Specifically, the transmitter 306 may be configured to send uplink data on a detected idle frequency domain resource.

For a specific implementation of each component in the terminal, refer to the foregoing method embodiments. Details are not described herein again.

Methods or algorithm steps described in combination with the content disclosed in the embodiments of the present invention may be implemented by hardware, or may be implemented by a processor by executing a software instruction. The software instruction may include a corresponding software module. The software module may be stored in a RAM, a flash memory, a ROM, an erasable programmable read only memory (EPROM), an electrically erasable programmable read-only memory (EEPROM), a register, a hard disk, a removable hard disk, a compact disc read-only memory (CD-ROM), or any other form of storage medium well-known in the art. A storage medium used as an example is coupled to the processor, so that the processor can read information from the storage medium or write information into the storage medium. Certainly, the storage medium may be a component of the processor. The processor and the storage medium may be located in the ASIC. In addition, the ASIC may be located in a transceiver or a relay device. Certainly, the processor and the storage medium may exist in the radio access network device or the terminal device as discrete assemblies.

A person skilled in the art should be aware that in the foregoing one or more examples, functions described in the embodiments of the present invention may be implemented by hardware, software, firmware, or any combination thereof. When the present invention is implemented by software, the functions may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a general-purpose or special-purpose computer.

In the foregoing specific implementations, the objectives, technical solutions, and beneficial effects of the embodiments of the present invention are further described in detail. It should be understood that the foregoing descriptions are merely specific implementations of the embodiments of the present invention, but are not intended to limit the protection scope of the embodiments of present invention. Any modification, equivalent replacement, or improvement made based on technical solutions of the embodiments of the present invention shall fall within the protection scope of the embodiments of the present invention.

What is claimed is:

1. A signal transmission method, comprising:
receiving, by a terminal device, a plurality of synchronization signal/physical broadcast channel (SS/PBCH) blocks in a burst set window, wherein the burst set window comprises a plurality of candidate positions that are used to transmit the plurality of SS/PBCH blocks; and
determining, by the terminal device, that two or more SS/PBCH blocks received at two or more positions of the plurality of candidate positions in the burst set window are quasi co-located (QCL) with each other, wherein the two or more SS/PBCH blocks received at the two or more positions in the burst set window correspond to a same SS/PBCH block, and a duration of the burst set window is 5 ms.

2. The method according to claim 1, further comprising:
receiving, by the terminal device, indication information, wherein the indication information is used to indicate an interval between two adjacent positions of the two or more positions.

3. The method according to claim 2, wherein the interval between the two adjacent positions is 2, 4, or 8.

4. The method according to claim 2, wherein the indication information is carried in at least one of a remaining minimum system information (RMSI) control resource set (CORESET), an RMSI physical downlink shared channel (PDSCH), radio resource control (RRC) signaling, or a broadcast channel.

5. The method according to claim 1, further comprising:
receiving, by the terminal device, quantity information of the plurality of candidate positions; and
determining the two or more positions based on the quantity information.

6. The method according to claim 1, further comprising:
obtaining, by the terminal device, QCL-related information from a demodulation reference signal (DMRS) in the plurality of SS/PBCH blocks.

7. The method according to claim 1, wherein the two or more SS/PBCH blocks includes a first SS/PBCH block and a second SS/PBCH block, and the first SS/PBCH block and the second SS/PBCH block has a QCL relationship.

8. A signal transmission method, comprising:
sending, by a network device, a plurality of synchronization signal/physical broadcast channel (SS/PBCH) blocks in a burst set window, wherein the burst set window comprise a plurality of candidate positions that are used to transmit the plurality of SS/PBCH blocks, and wherein two or more SS/PBCH blocks sent at two or more positions of the plurality of candidate positions in the burst set window are quasi co-located (QCL) with each other and correspond to a same SS/PBCH block, and a duration of the burst set window is 5 ms.

9. The method according to claim 8, further comprising:
sending, by the network device, indication information, wherein the indication information is used to indicate an interval between two adjacent positions of the two or more positions.

10. The method according to claim 9, wherein the interval between the two adjacent positions is 2, 4, or 8.

11. The method according to claim 9, wherein the indication information is carried in at least one of a remaining minimum system information (RMSI) control resource set (CORESET), an RMSI physical downlink shared channel (PDSCH), radio resource control (RRC) signaling, or a broadcast channel.

12. A terminal device, comprising a memory, and at least one processor and a receiver that are coupled to the memory, wherein:
the receiver is configured to receive a plurality of synchronization signal/physical broadcast channel (SS/PBCH) blocks in a burst set window, wherein the burst set window comprise a plurality of candidate positions that are used to transmit the plurality of SS/PBCH blocks; and
the memory stores programming instructions for execution by the at least one processor to determine that two or more SS/PBCH blocks received at two or more positions of the plurality of candidate positions in the burst set window are quasi co-located (QCL) with each other, wherein the two or more SS/PBCH blocks received at the two or more positions in the burst set window correspond to a same SS/PBCH block, and a duration of the burst set window is 5 ms.

13. The device according to claim 12, wherein the receiver is further configured to receive indication information, wherein the indication information is used to indicate an interval between two adjacent positions of the two or more positions.

14. The device according to claim 13, wherein the interval between the two adjacent positions is 2, 4, or 8.

15. The device according to claim 13, wherein the indication information is carried in at least one of a remaining minimum system information (RMSI) control resource set (CORESET), an RMSI physical downlink shared channel (PDSCH), radio resource control (RRC) signaling, or a broadcast channel.

16. The device according to claim 12, wherein:
the receiver is further configured to receive quantity information of the plurality of candidate positions; and
the at least one processor is further configured to determine the two or more positions based on the quantity information.

17. The device according to claim 12, wherein the at least one processor is further configured to obtain QCL-related information from a demodulation reference signal (DMRS) in the plurality of SS/PBCH blocks.

18. A network device, comprising a memory, and at least one processor and a transmitter that are coupled to the memory, wherein:
the transmitter is configured to send a plurality of synchronization signal/physical broadcast channel (SS/PBCH) blocks in a burst set window, wherein the burst set window comprise a plurality of candidate positions that are used to transmit the plurality of SS/PBCH blocks, and wherein two or more SS/PBCH blocks sent at two or more positions of the plurality of candidate positions in the burst set window are quasi co-located (QCL) with each other and correspond to a same SS/PBCH block, and a duration of the burst set window is 5 ms.

19. The device according to claim 18, wherein the transmitter is configured to send indication information, wherein the indication information is used to indicate an interval between two adjacent positions of the two or more positions.

20. The device according to claim 19, wherein the interval between the two adjacent positions is 2, 4, or 8.

21. A non-transitory computer-readable storage medium comprising instructions which, when executed by one or more processors, cause the one or more processors to perform operations comprising:

receiving a plurality of synchronization signal/physical broadcast channel (SS/PBCH) blocks in a burst set window, wherein the burst set window comprise a plurality of candidate positions that are used to transmit the plurality of SS/PBCH blocks; and determining that two or more SS/PBCH blocks received at two or more positions of the plurality of candidate positions in the burst set window are quasi co-located (QCL) with each other, wherein the two or more SS/PBCH blocks received at the two or more positions in the burst set window correspond to a same SS/PBCH block, and a duration of the burst set window is 5 ms.

* * * * *